(12) United States Patent
Ford et al.

(10) Patent No.: US 9,860,443 B2
(45) Date of Patent: Jan. 2, 2018

(54) MONOCENTRIC LENS DESIGNS AND ASSOCIATED IMAGING SYSTEMS HAVING WIDE FIELD OF VIEW AND HIGH RESOLUTION

(71) Applicant: The Regents of the University of California, Oakland, CA (US)

(72) Inventors: Joseph E. Ford, Solana Beach, CA (US); Ilya Agurok, San Diego, CA (US); Igor Stamenov, La Jolla, CA (US)

(73) Assignee: The Regents of the University of California, Oakland, CA (US)

(*) Notice: Subject to any disclaimer, the term of this patent is extended or adjusted under 35 U.S.C. 154(b) by 0 days.

(21) Appl. No.: 14/423,097

(22) PCT Filed: Aug. 20, 2013

(86) PCT No.: PCT/US2013/055892
§ 371 (c)(1),
(2) Date: Feb. 20, 2015

(87) PCT Pub. No.: WO2014/074202
PCT Pub. Date: May 15, 2014

(65) Prior Publication Data
US 2015/0207990 A1    Jul. 23, 2015

Related U.S. Application Data

(60) Provisional application No. 61/691,234, filed on Aug. 20, 2012.

(51) Int. Cl.
*H04N 5/232*    (2006.01)
*H04N 5/225*    (2006.01)
(Continued)

(52) U.S. Cl.
CPC ......... *H04N 5/23238* (2013.01); *G02B 6/255* (2013.01); *G02B 9/02* (2013.01);
(Continued)

(58) Field of Classification Search
CPC .. H04N 5/23238; H04N 5/2254; G02B 13/06; G02B 13/16; G02B 17/061; G02B 9/02; G02B 6/255; G02B 27/0025
See application file for complete search history.

(56) References Cited

U.S. PATENT DOCUMENTS

| 4,184,749 A | 1/1980 | Grossman |
| 4,323,925 A * | 4/1982 | Abell ...................... G01J 1/04 250/216 |

(Continued)

FOREIGN PATENT DOCUMENTS

| JP | 2003-302602 A | 10/2003 |
| KR | 10-2008-0001258 A | 1/2008 |

*Primary Examiner* — Luong T Nguyen
(74) *Attorney, Agent, or Firm* — Perkins Coie LLP

(57) ABSTRACT

Methods, systems, and devices are disclosed for capturing and forming large high quality images using monocentric optical imaging. In one aspect, an optical imaging system includes an optical imaging module that collects light to form an image on an imaging surface, one or more imaging sensors each including an array of optical detectors located away from the imaging surface to receive light representing the image initially formed on the imaging surface and to convert the received light into detector signals, and optical waveguides coupled between the imaging surface and the one or more imaging sensors to receive light from the imaging surface and configured to selectively deliver a desired portion of the received light to the one or more imaging sensors while suppressing undesired stray light from reaching the one or more imaging sensors so that the optical waveguides effectuate an optical aperture stop with a limited angle range for receiving light by the one or more imaging sensors.

10 Claims, 38 Drawing Sheets

(51) Int. Cl.
  *G02B 9/02* (2006.01)
  *G02B 13/06* (2006.01)
  *G02B 6/255* (2006.01)
  *G03B 37/00* (2006.01)

(52) U.S. Cl.
  CPC ............ *G02B 13/06* (2013.01); *G03B 37/00* (2013.01); *H04N 5/2254* (2013.01)

(56) References Cited

U.S. PATENT DOCUMENTS

| | | | | |
|---|---|---|---|---|
| 4,807,954 A * | 2/1989 | Oyamada | ............... | G02B 6/262 385/33 |
| 5,004,328 A * | 4/1991 | Suzuki | ................. | G02B 3/00 348/E5.027 |
| 5,012,081 A * | 4/1991 | Jungwirth | ............. | G01S 3/7867 250/203.6 |
| 5,159,455 A * | 10/1992 | Cox | ....................... | G02B 13/16 250/208.1 |
| 5,696,865 A * | 12/1997 | Beeson | ................ | G02B 6/0281 385/124 |
| 5,738,798 A * | 4/1998 | Leonard | ................. | G02B 6/305 216/24 |
| 8,488,257 B2 * | 7/2013 | Stark | ...................... | G02B 13/06 348/36 |
| 9,329,365 B2 * | 5/2016 | Mrozek | ................ | G02B 13/06 |
| 2004/0184704 A1 * | 9/2004 | Bakir | ................. | G02B 6/12002 385/14 |
| 2004/0212882 A1 | 10/2004 | Liang et al. | | |
| 2010/0200736 A1 * | 8/2010 | Laycock | .................. | G02B 6/06 250/227.2 |
| 2011/0211106 A1 * | 9/2011 | Marks | .................... | G02B 13/06 348/340 |

\* cited by examiner

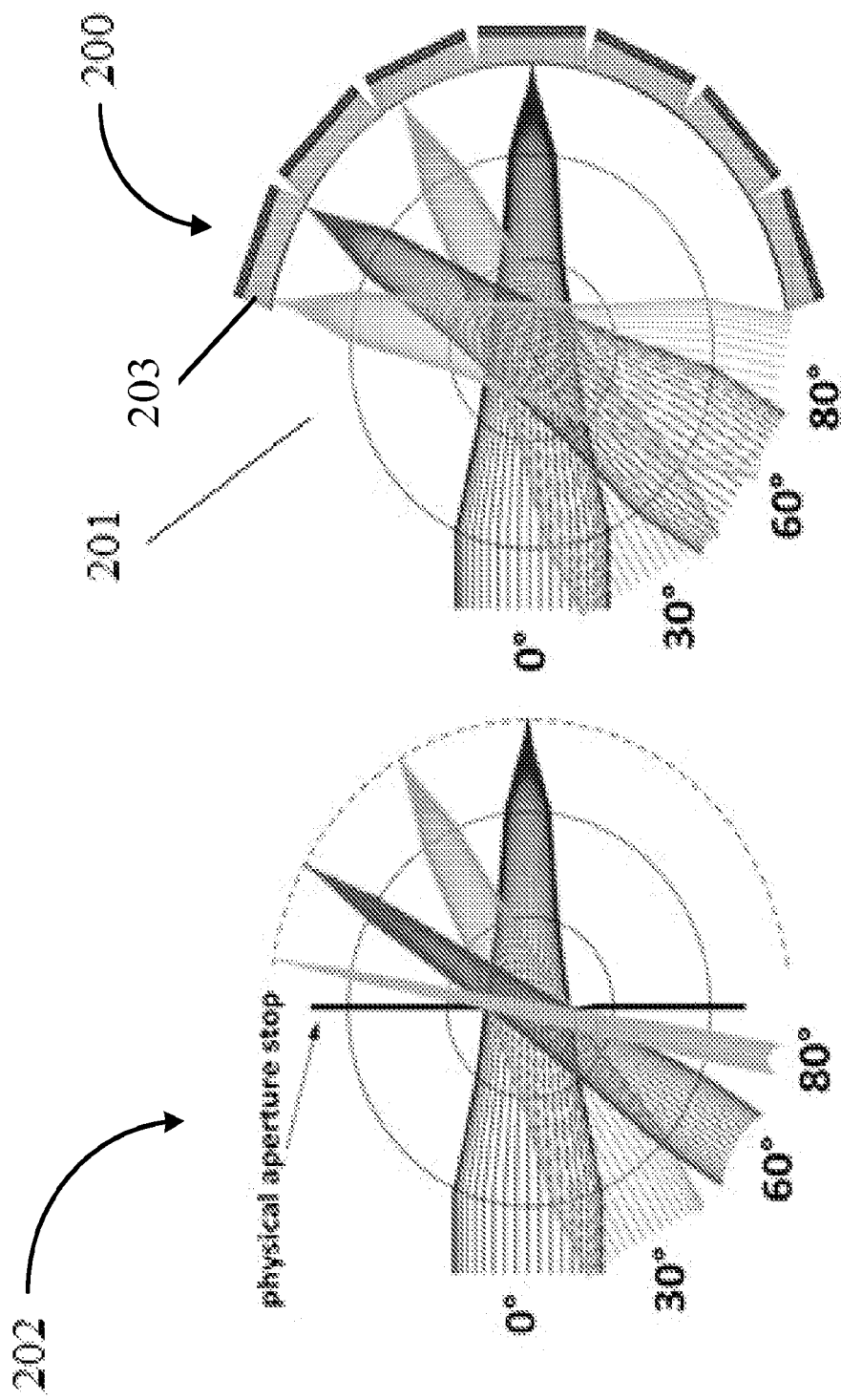

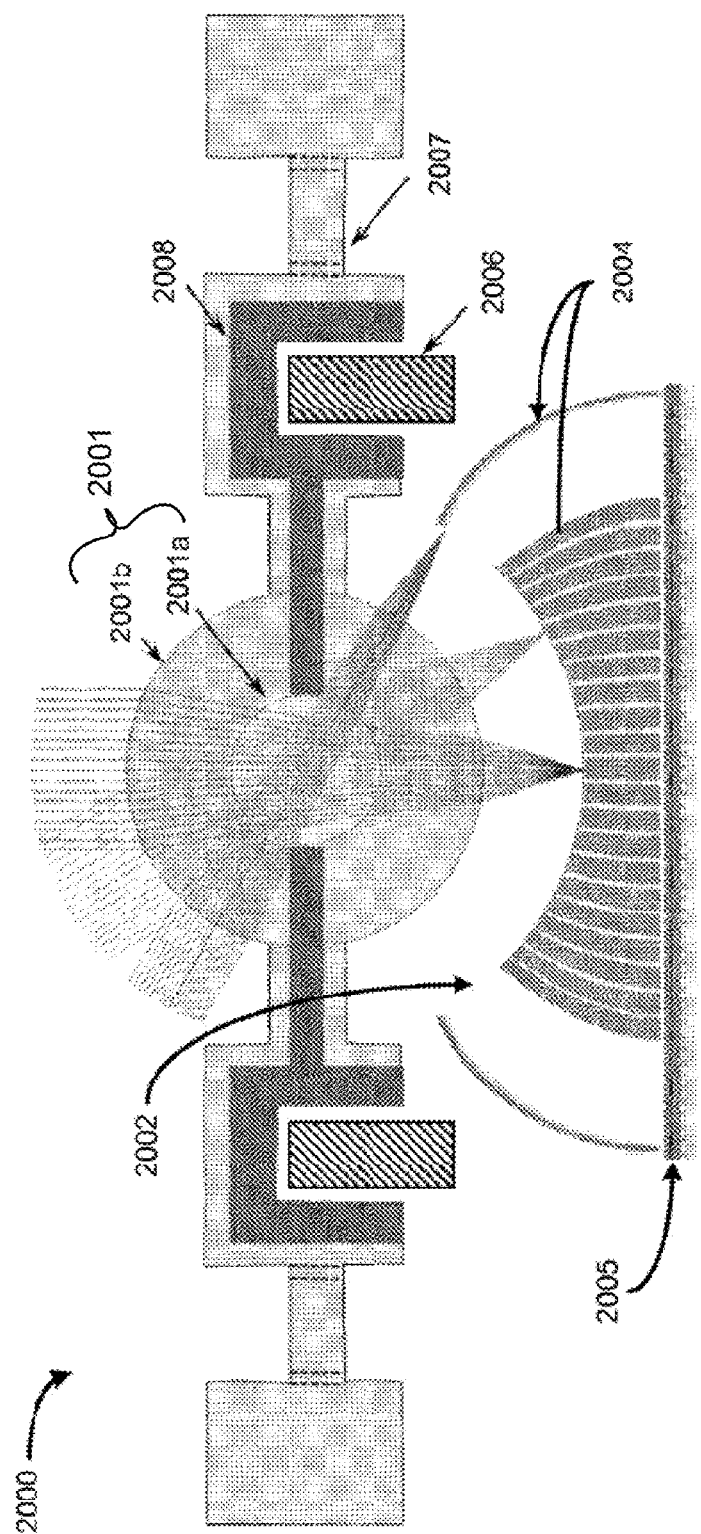

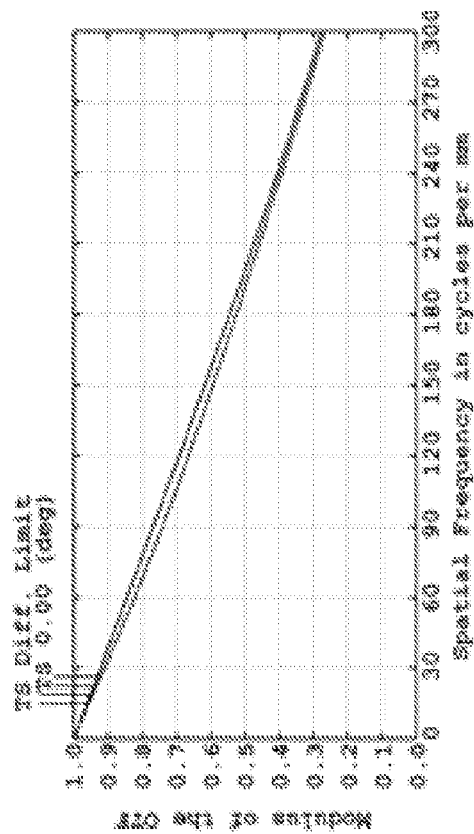
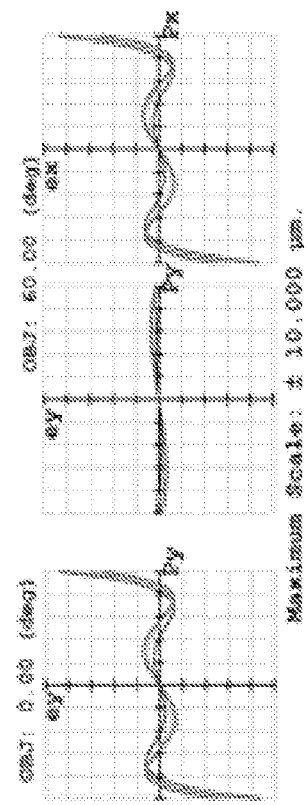
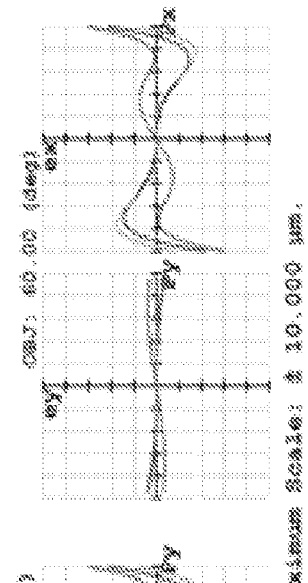
FIG. 26A
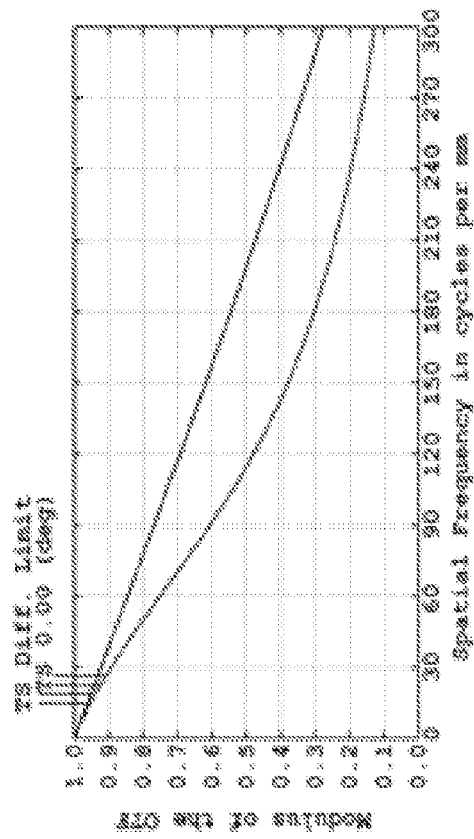
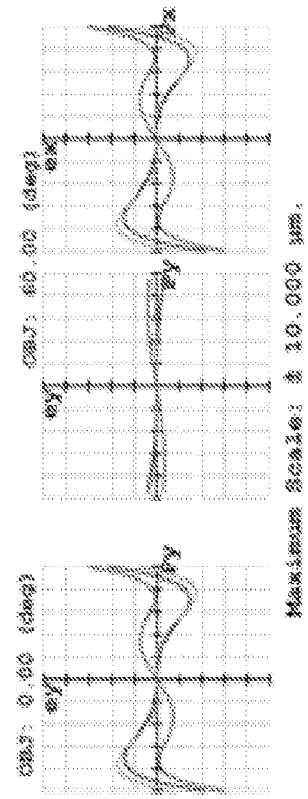
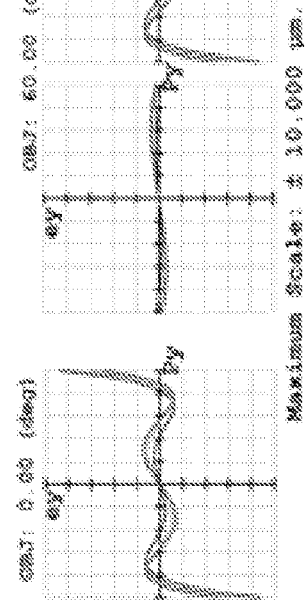
FIG. 26B

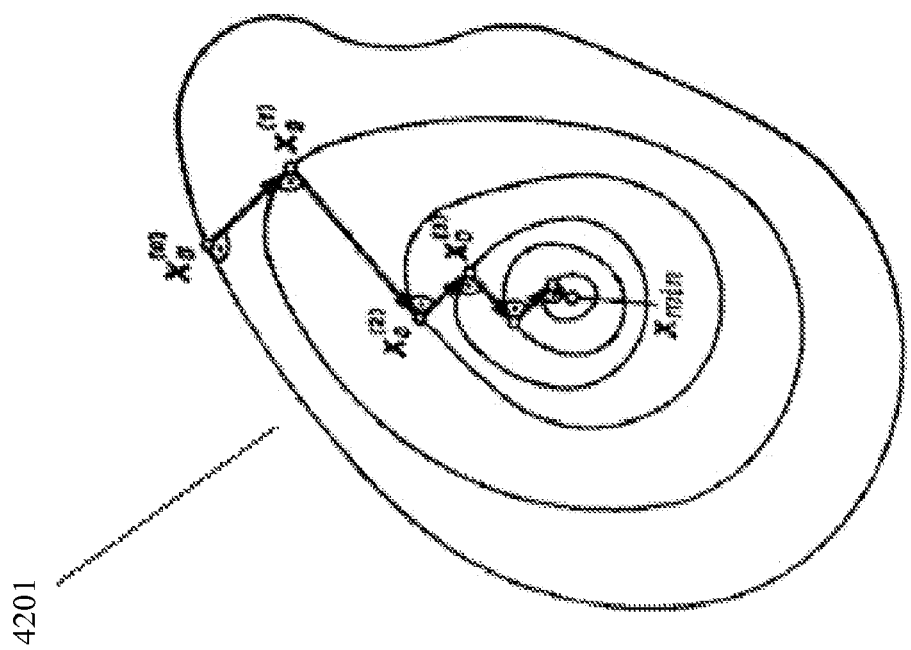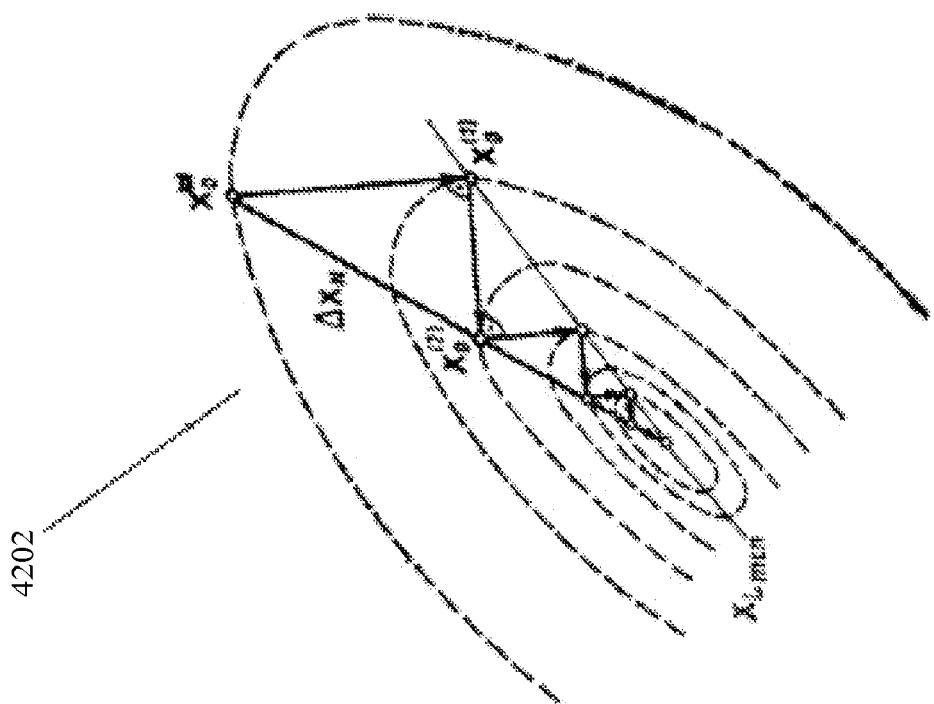
FIG. 39

MONOCENTRIC LENS DESIGNS AND ASSOCIATED IMAGING SYSTEMS HAVING WIDE FIELD OF VIEW AND HIGH RESOLUTION

CROSS REFERENCE TO RELATED APPLICATIONS

This application is a 35 USC §371 National Stage application of International Application No. PCT/US2013/055892 filed Aug. 20, 2013, which further claims the benefit of priority of U.S. Provisional Patent Application No. 61/691,234, entitled "MONOCENTRIC LENS DESIGNS AND ASSOCIATED IMAGING SYSTEMS HAVING WIDE FIELD OF VIEW AND HIGH RESOLUTION", filed on Aug. 21, 2012. The entire content of the aforementioned patent applications are incorporated by reference as part of the disclosure of this application.

STATEMENT REGARDING FEDERALLY SPONSORED RESEARCH OR DEVELOPMENT

This invention was made with government support under W911NF-11-C-0210 awarded by the Army. The government has certain rights in the invention.

TECHNICAL FIELD

This patent document relates to imaging optics including optical lenses, and related imaging systems, devices, methods and materials.

BACKGROUND

Imagers that require the combination of wide field of view, high angular resolution and large light collection present difficult challenges in optical system design. For example, geometric lens aberrations increase with aperture diameter, numerical aperture and field of view, and scale linearly with focal length. This means that for a sufficiently short focal length, it is possible to find near diffraction-limited wide angle lens designs, including lenses mass-produced for cellphone imagers. However, obtaining high angular resolution (for a fixed sensor pixel pitch) requires a long focal length for magnification, as well as a large numerical aperture to maintain resolution and image brightness. This combination is difficult to provide over a wide angle range. Conventional lens designs for longer focal length wide-angle lenses represent a tradeoff between competing factors of light collection, volume, and angular resolution. For example, conventional reverse-telephoto and "fisheye" lenses provide extremely limited light collection compared to their large clear aperture and overall volume. However, the problem can go beyond the lens itself. For example, solving this lens design only leads to a secondary design constraint, in that the total resolution of such wide angle lenses may easily exceed 100 Megapixels. This is beyond the current spatial resolution and communications bandwidth of a single cost-effective sensor, e.g., especially for video output at 30 frames per second or more.

SUMMARY

Methods, systems, and devices are disclosed for capturing and forming large high quality images using monocentric optical imaging.

In one aspect, an optical imaging system includes a monocentric optical imaging module including one or more optical elements having concentric surfaces to collect light and form an image on a curved image surface, one or more optical waveguide bundles each comprising a plurality of optical waveguides that are optically coupled to the monocentric optical imaging module at different locations to receive different portions of the collected light at the curved image surface, respectively, each optical waveguide being configured to have a tapered waveguide core of a cross section that varies along the optical waveguide to select desired collected light rays to pass through the optical waveguide while rejecting undesired collected light rays from being transmitted to an output facet of the optical waveguide, and one or more imaging sensors to receive output light from the one or more optical waveguide bundles and to detect the received output light, the one or more imaging sensors configured to produce a representation of the image on the curved image surface of the monocentric optical imaging module.

In another aspect, an optical imaging system includes a monocentric optical imaging module including one or more optical elements having concentric surfaces to collect light and form an image on a curved image surface, one or more optical waveguide bundles each comprising a plurality of optical waveguides that are optically coupled to the monocentric optical imaging module at different locations to receive different portions of the collected light at the curved image surface, respectively, in which each optical waveguide bundle includes an input optical waveguide bundle facet to receive light from the curved image surface and an output optical waveguide facet to output light, one or more imaging sensors to receive light from the one or more optical waveguide bundles and to detect the received light, the one or more imaging sensors configured to produce a representation of the image on the curved image surface of the monocentric optical imaging module, and a textured surface structure over the input optical waveguide facet associated with optical waveguides of each optical waveguide bundle to enhance optical coupling from the curved imaging surface into the optical waveguides.

In another aspect, an optical imaging system includes an optical imaging module that collects light to form an image on an imaging surface, one or more imaging sensors each including an array of optical detectors located away from the imaging surface to receive light representing the image initially formed on the imaging surface and to convert the received light into detector signals, and optical waveguides coupled between the imaging surface and the one or more imaging sensors to receive light from the imaging surface and configured to selectively deliver a desired portion of the received light to the one or more imaging sensors while suppressing undesired stray light from reaching the one or more imaging sensors so that the optical waveguides effectuate an optical aperture stop with a limited angle range for receiving light by the one or more imaging sensors.

In another aspect, an optical imaging system includes a monocentric optical imaging module including one or more optical elements having concentric surfaces and a curved imaging surface, the monocentric optical imaging module configured to collect light to form an image on the curved imaging surface, one or more imaging sensors each including an array of optical detectors located away from the curved imaging surface to receive light from the imaging surface and to convert the received light into detector signals, and an actuator coupled to the one or more optical elements having concentric surfaces and configured to adjust an axial translation position of the one or more optical elements having concentric surfaces relative to the curved imaging surface, along an optical axis from the one or more optical elements having concentric surfaces to the curved imaging surface, to change focusing of an object in a first object plane onto the same curved imaging surface to focusing of an object in a second, separate object plane onto the curved imaging surface, in which the first and second object planes are at different axial locations from each other.

In another aspect, a method for optical imaging using a monocentric optical imaging module includes operating a monocentric optical imaging module including one or more optical elements having concentric surfaces to collect light from a scene at a first object plane to be imaged and to form an image of the first object plane on a curved image surface which is part of a spherical surface that is concentric with the one or more optical elements having concentric surfaces, and, without adjusting a position or curvature of the curved image surface, adjusting an axial translation position of the monocentric optical imaging module to change focusing of an object on the first object plane onto the curved imaging surface to focusing of an object on a second object plane onto the curved imaging surface, in which the second object plane is parallel to the first object plane but is at a different axial location from the first object plane.

In another aspect, a method for optical imaging includes operating an optical imaging module to collect light to form an image on an imaging surface, using one or more imaging sensors each including an array of optical detectors located away from the imaging surface to receive light representing the image formed on the imaging surface and to convert the received light into detector signals, and using optical waveguides coupled between the imaging surface and the one or more imaging sensors to receive light from the imaging surface of the optical imaging module to select a desired portion of the received light to reach the one or more imaging sensors while suppressing undesired stray light from reaching the one or more imaging sensors so that the optical waveguides effectuate an optical aperture stop with a limited angle range for receiving light by the one or more imaging sensors.

In another aspect, a method for optical imaging includes operating an optical imaging module to collect light and to form an image on an imaging surface, coupling optical waveguides to the imaging surface to receive light of the image formed by the optical imaging module and deliver received light to one or more imaging sensors located away from the imaging surface, and providing a textured surface structure near or at the imaging surface to enhance optical coupling of light into input facets of the optical waveguides.

In another aspect, a method for fabricating a monocon-centric optical imaging system includes forming a flat slab of having fibers being parallel to one another and perpen-dicular to the flat slab surfaces, bonding the flat slab onto a flat surface of a wafer to form a bonded structure, processing an exposed surface of the flat slab bonded onto the wafer to form spherical surface depressions at different locations, and engaging monocentric optical imaging modules to the spherical surface depressions, respectively, so that each spherical surface depression serves as a curved imaging surface for forming images by a corresponding monocentric optical imaging module.

In another aspect, an optical imaging system includes a substrate, a flat slab bonded over the substrate, the flat slab having fibers being parallel to one another and perpendicular to the flat slab surfaces and configured to include spherical surface depressions at different locations on top of the flat slab, and monocentric optical imaging modules engaged to the spherical surface depressions, respectively, so that each spherical surface depression serves as a curved imaging surface for forming images by a corresponding monocentric optical imaging module.

In another aspect, an optical imaging system includes a monocentric optical imaging module having concentric optical surfaces that collect light in a photographic visible spectrum to form an image on a curved imaging surface that is concentric with the concentric optical surfaces of the monocentric optical imaging module, in which the monocentric optical imaging module includes an inner glass ball lens of a sphere having a low index and an outer glass lens element of a high index glass, one or more imaging sensors each including an array of optical detectors located away from the imaging surface to receive light representing the image initially formed on the curved imaging surface and to convert the received light into detector signals, and optical waveguides coupled between the imaging surface and the one or more imaging sensors to receive light from the curved imaging surface and deliver the received light to the one or more imaging sensors.

In another aspect, a method for designing a monocentric optical imaging module having concentric optical surfaces that collect light to form an image on a curved imaging surface that is concentric with the concentric optical surfaces of the monocentric optical imaging module, in which the monocentric optical imaging module includes an inner glass ball lens of a sphere having a low index and an outer glass lens element of a high index glass, in which the method includes: determining surface radii of the inner glass ball and outer glass lens element to minimize 3rd order Seidel spherical and axial chromatic aberrations for combinations of glass materials for the inner glass ball and outer glass lens element; optimizing lens prescriptions of the inner glass ball and outer glass lens element via ray tracing of multiple ray heights for a central wavelength within the photographic visible spectrum to generate lens design candidates based on the combinations of glass materials for the inner glass ball and outer glass lens element; computing a polychromatic mean RMS wavefront deformation to generate a ranked list of lens design candidates for the combinations of glass materials for the inner glass ball and outer glass lens element; and confirming the ranked order by comparing polychromatic diffraction modulation transfer function (MTF) curves of the lens design candidates.

In another aspect, an optical imaging system includes a monocentric optical imaging module having concentric optical surfaces that collect light in a photographic visible spectrum to form an image on a curved imaging surface that is concentric with the concentric optical surfaces of the monocentric optical imaging module, in which the monocentric optical imaging module includes an inner glass ball lens of a sphere having a low refractive index of K-GFK68, K-GFK60 or S-FPM2 and three outer glass lens elements of higher refractive indices; one or more imaging sensors each including an array of optical detectors located away from the imaging surface to receive light representing the image initially formed on the curved imaging surface and to convert the received light into detector signals; and optical waveguides coupled between the imaging surface and the one or more imaging sensors to receive light from the curved imaging surface and deliver the received light to the one or more imaging sensors.

In another aspect, an optical imaging system includes a monocentric optical imaging module having concentric optical surfaces that collect light in a water transmission spectrum band from 0.38 to 0.55 micrometers to form an image on a curved imaging surface that is concentric with the concentric optical surfaces of the monocentric optical imaging module, in which the monocentric optical imaging module includes an inner glass ball lens of a sphere having a low refractive index and three outer glass lens elements of higher refractive indices, one or more imaging sensors each including an array of optical detectors located away from the imaging surface to receive light representing the image initially formed on the curved imaging surface and to convert the received light into detector signals, and optical waveguides coupled between the imaging surface and the one or more imaging sensors to receive light from the curved imaging surface and deliver the received light to the one or more imaging sensors.

In another aspect, an optical imaging system includes a monocentric optical imaging module having concentric optical surfaces that collect light in a transmission spectrum band from infrared 0.9 to 1.5 microns to form an image on a curved imaging surface that is concentric with the concentric optical surfaces of the monocentric optical imaging module, in which the monocentric optical imaging module includes an inner glass ball lens of a sphere having a low refractive index and three outer glass lens elements of higher refractive indices; one or more imaging sensors each including an array of optical detectors located away from the imaging surface to receive light representing the image initially formed on the curved imaging surface and to convert the received light into detector signals; and optical waveguides coupled between the imaging surface and the one or more imaging sensors to receive light from the curved imaging surface and deliver the received light to the one or more imaging sensors.

In another aspect, a method for designing a monocentric optical imaging module having concentric optical surfaces that collect light to form an image on a curved imaging surface that is concentric with the concentric optical surfaces of the monocentric optical imaging module, in which the monocentric optical imaging module includes an inner glass ball lens of a sphere having a low index and three outer glass lens elements of higher refractive indices, in which the method includes: determining surface radii of the inner glass ball and three outer glass lens elements for combinations of glass materials for the inner glass ball and the three outer glass lens elements to minimize monochromatic and chromatic aberrations; the local optimization method will come somewhere inside the thin pancake shaped area of low criterion value solutions, then at a second step optimization search will follow over the main ravine of the cost function which direction was determined from the minimal absolute Eigen vector of the Hesse matrix at the initial minimum cost function point and locating with number of local optimizations the points over this ravine inside pancake shaped area of low value of cost function; then, at a third step, locating minimums over secondary ravines originated from the primary ravine of cost function with the same method of traveling over directions of secondary eigen vectors of the points over primary ravine with the local optimizations from these points. By investigating the pancake area of low cost function value with the square net of ravines the method reliably located the area of lowers cost function value and find location absolute minimum for each particular glasses combination.

The subject matter described in this patent document can be implemented in specific ways that provide one or more of the following features. For example, in some exemplary embodiments, the present technology includes compact high resolution imager systems and devices operating in visible, NIR, SWIR, MWIR, and LWIR spectrum bands to capture and form images with high pixels count (e.g., more than 60 Megapixels) and be able to operate at a rapid frame rate (e.g., 30 frames per second or better). For example, the real-time readout ability can be achieved by using the multi-scale architecture with a number of synchronously operating receivers each of them having a moderate pixels count in the range of 5 Megapixels. The imaging optics can include several types of substantially monocentric or semi-monocentric lenses, which have been designed with a unique systematic approach to achieve the optimum F# and image quality considering operating waveband requirements. For example, the image is formed at the intermediate spherical image surface and delivered to the number of receivers by fiber bundles or tapers. With the use of high numerical aperture high resolution fiber bundles, the conventional physical aperture stop at the center of a monocentric (MC) lens provides light filtering. For example, in the exemplary case of observation of a flat Lambertian object, the reduction of image illumination can be configured to be proportional to the $1/\cos 3(\alpha)$, where a is the field angle. The power three is constructed from cosine reduction of input aperture due to the pupil projection on the direction of the fields and cosine in power two reduction of the brightness of the source due to the cosine reduction of the projection of emitting area and reduction of the intensity of the source. For example, in the exemplary case of general landscape imaging, the reduction of image illumination can be as low as $1/\cos(\alpha)$ just due to the reduction of the entrance pupil size at the field points. If an exemplary monocentric imager operates with light filtering providing by the exemplary tapered fiber configuration, the entrance pupil may not contract over the field, and for the case of general landscape observation, there may be no image illumination reduction at all. This is a beneficial advantage of the exemplary monocentric imagers with a "virtual" aperture stop, e.g., as compared to conventional imagers. For example, the disclosed monocentric lenses can be used in several exemplary applications including compact super-resolution omnidirectional photonic masts, persistent super-resolution surveillance cameras, high light collection underwater imagers, wearable direct bullet impact warning systems, compact foveated unmanned aerial vehicles that can be capable of real-time downloads with high resolution images, e.g., by using restricted band communication channel and others.

These and other aspects and their implementations are described in greater detail in the drawings, the description and the claims.

BRIEF DESCRIPTION OF THE DRAWINGS

FIGS. 2A and 2B show diagrams depicting monocentric lens imaging with a physical aperture stop at the center of the objective lens, and a "virtual" stop accomplished by limiting the numerical aperture of the image transfer which, as drawn, are non-imaging optical fibers.

FIG. 20B shows a schematic diagram of an exemplary monocentric micro-scale imager device capable of focusing using an axial translation motion.

FIGS. 26A and 26B show exemplary data plots depicting modulation transfer function (MTF) and ray aberrations performance comparisons of exemplary imaging systems of the disclosed technology.

FIG. 39 shows a data plot showing typical trajectories of exemplary optimization methods.

DETAILED DESCRIPTION

Monocentric lenses can be used to form imaging devices or systems for various imaging applications, including panoramic high-resolution imagers, where the spherical image surface is directly detected by curved image sensors or optically transferred onto multiple conventional flat focal planes.

Wide-angle imaging based on monocentric lenses can be achieved by using hemispherical or spherical optical surfaces which share a single center of curvature. This symmetry yields zero coma or astigmatism over a hemispherical image surface, and on that surface provides a field of view limited only by vignetting from the central aperture stop. The challenge of using a curved image surface limited the practical application of this type of lens, but there has been a resurgence of interest in monocentric lens imaging. In some systems, an omnidirectional imager uses a spherical ball lens contained within a spherical detector shell. In another system, for example, a monocentric lens is used as the objective in a multi-scale imager system, where overlapping regions of the spherical image surface are relayed onto conventional image sensors, and where the mosaic of sub-images can be digitally processed to form a single aggregate image. In a similar example, a system includes a closely related configuration using a glass ball and single element relay lenses, recording and digitally combining overlapping images from multiple adjacent (e.g., five adjacent) image sensors.

Monocentric lenses and spherical image formation provides favorable scaling to long focal lengths, and have been shown capable of two orders of magnitude higher space-bandwidth product (e.g., number of resolvable spots) than conventional flat field systems of the same physical volume. For example, in early monocentric lens cameras, the usable field of view was limited by the vignetting and diffraction from the central lens aperture, as well as the ability of recording media to conform to a spherical image surface. However, the system aperture stop need not be located in the monocentric lens. For example, an exemplary design of a multi-scale monocentric lens can include locating the aperture stop within the secondary (relay) imagers can enable uniform relative illumination and resolution over the full field. Such exemplary designs maintain F/2.4 light collection with near-diffraction limited resolution over a 120° field of view. For example, with 1.4 micron pitch sensors, this can yield an aggregate resolution of 2.4 Gigapixels.

Figure 1A:
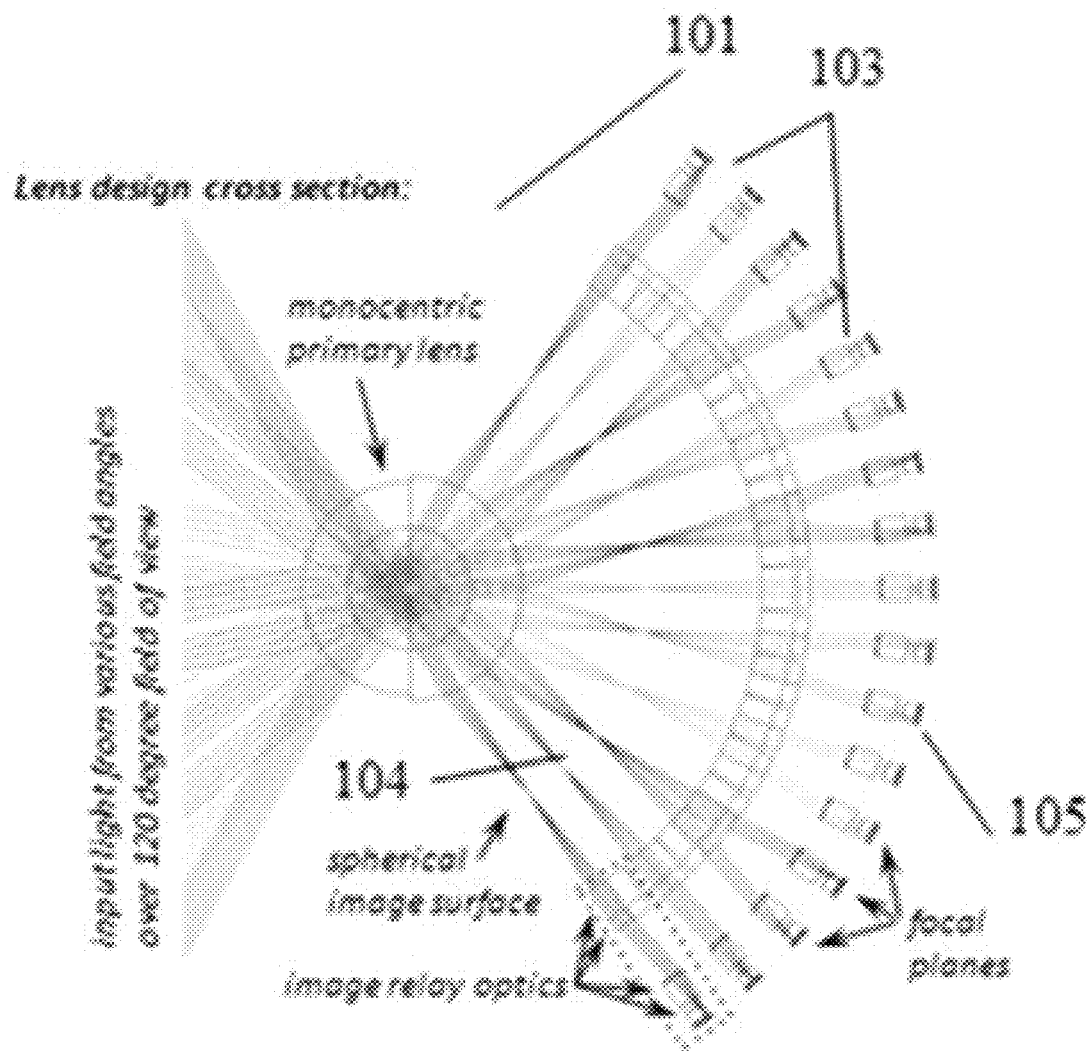
FIG. 1A shows an optical layout diagram of an exemplary Gigapixel monocentric imaging system.

An example of a Gigapixel monocentric imaging system is shown in cross-sectional optical layout diagram of FIG. 1A, which shows a monocentric multi-scale imager 101 that integrates a 2-dimensional mosaic of sub-images. The monocentric imager 101 includes a monocentric primary lens system 101a that inputs light from various field angles, e.g., over 120° field of view (FOV). The monocentric primary lens system 101a transfers the light to be received by a spherical image surface 104, from which the light is relayed via image relay optics 103 to individual focal planes which can include a plurality of imaging sensors 105, e.g., CMOS sensors or other imaging sensors, e.g., including but not limited to flat CCD, FPA receivers, or others. Some other examples of monocentric lens imaging systems are provided in U.S. patent application 13/437,907, entitled "MONOCENTRIC IMAGING," filed Apr. 2, 2012, of which the entire contents are incorporated by reference for all purposes as part of the disclosure of this patent document.

Figure 1B:
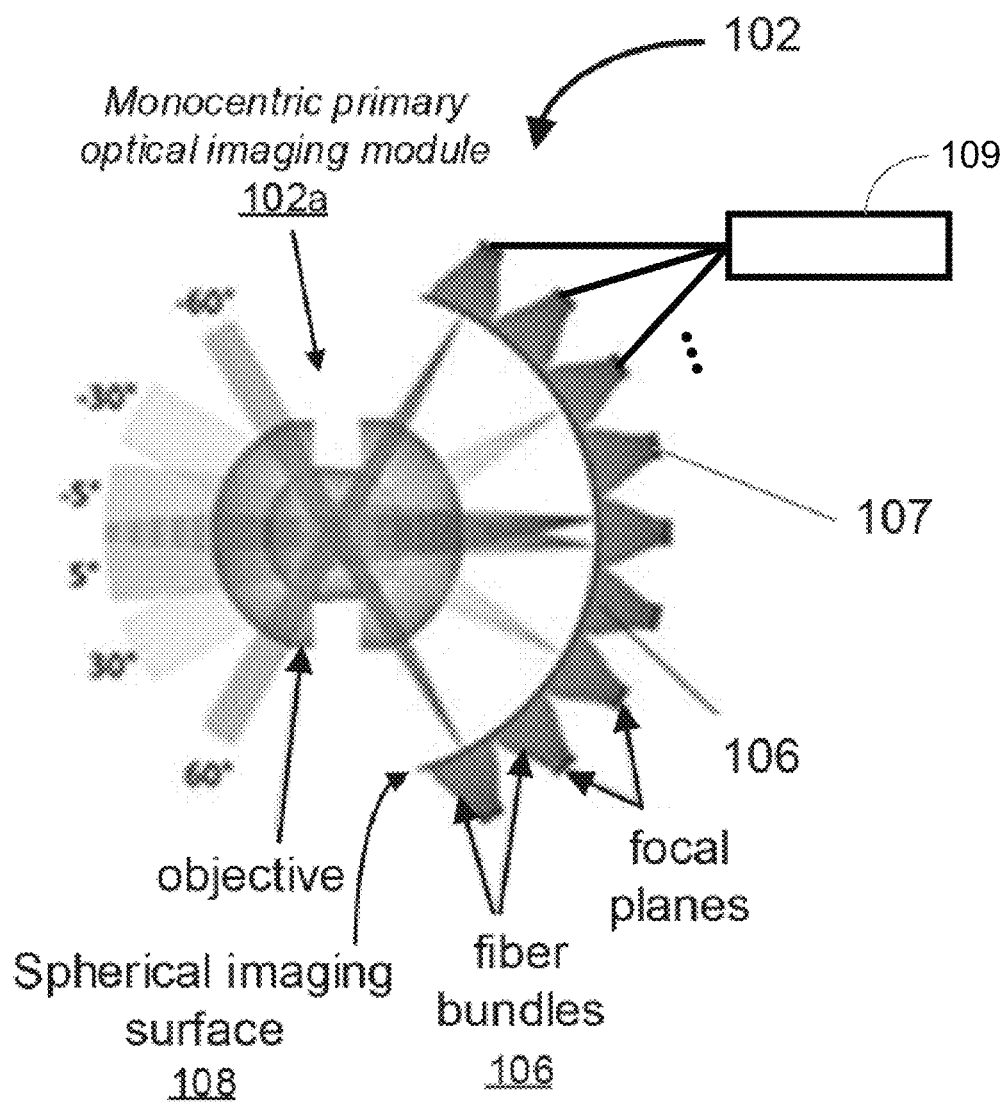
FIG. 1B shows an optical layout diagram of an exemplary multi-scale monocentric-based imaging system with primary and secondary optics modules for delivery of intermediate images to an array of receivers using an waveguide optical fiber delivery system.

FIG. 1B shows a monocentric imaging system for imaging wide and uniform fields by using optical waveguides. The monocentric imaging system 102 includes a monocentric primary optical imaging module 102a to collect light from various field angles, e.g., over 120° FOV. In this example, instead of relay optics, the monocentric imaging system 102 includes a spherical image surface 108 to transfer the collected light to planar image sensors 107 using one or more multimode fiber bundles 106. For example, the image sensors 107 can include CMOS-based image sensors or other imaging sensors, e.g., including but not limited to flat CCD, FPA receivers, among others. For example, fused fiber faceplates can be configured with high spatial resolutions and light collection (e.g., 2.5 microns between fiber cores, and numerical aperture of 1), and can be configured as straight or tapered. For example, straight fiber bundles can project sufficiently far to allow space for the packaging of exemplary CMOS image sensors 107. Alternatively, for example, the multimode optical fiber bundles 106 can be configured as tapered optical fiber bundles, e.g., which can provide 3:1 demagnification used in the relay optics, as shown in FIG. 1B. The monocentric imaging system 102 includes a microprocessor 109 coupled to the imaging sensors 107 to combine individual images from the imaging sensors 107 into a single composite image representing the image on the spherical image surface 108.

In some examples, fiber bundles may introduce artifacts from multiple sampling of the image, which can be mitigated through post-detection image processing. In addition, the edges between adjacent fiber bundles can introduce "seams" in the collected image, whose width depends on the accuracy of fiber bundle fabrication and assembly. These seams can also be mitigated through post-detection image processing. Beneficially, for example, waveguide transfer can reduce overall physical footprint and significantly increase light collection. In addition, the waveguide transfer can improve light collection efficiency over relay imaging. In some multi-scale optics structures, for example, light from a particular direction (field angle) which is close to the intersection of thee adjacent sets of relay optics must be divided between the three apertures, reducing optical energy and diffraction limited spatial resolution, while the waveguide can transfer all light energy from each field angle to a single sensor.

Disclosed are techniques, systems, and devices for imaging and waveguide-based transfer of the spherical image surface formed by the monocentric lens onto planar image sensors, such that the system input aperture and resolution are substantially independent of input angle. Also described in this patent document is an aberration analysis that demonstrates that wide-field monocentric lenses can be focused by purely axial translation, e.g., enabling applications of autofocusing and all in focus imaging techniques. The patent document also presents a systematic design process to identify the best designs for two glass symmetric monocentric lenses and four glass semi-monocentric lenses. Exemplary implementations of the disclosed systematic design approach are presented herein showing number of exemplary designs, e.g., F/1.7, 12 mm focal length imagers with up to 160° field of view, as well as super compact 3 mm focal length imagers, which compares favorably in size and performance to conventional wide-angle imagers. For example, a number of imager embodiments for visible, near infrared (NIR), short-wave infrared (SWIR), mid-wave infrared (MWIR), and long wave (LWIR) operations are given, and a number of specific monocentric (MC) lens applications are described. Additionally, for example, a number of applications such as omnidirectional super-resolution photonic mast, compact high resolution cell phone cameras, foveated aerial unmanned vehicle imager, among others, are also disclosed.

I. Monocentric Multi-scale Imager's Architecture and Principals of Operation

Practical implementation of high quality, high-resolution imaging devices can be challenging. For example, some challenges can be attributed at least in part to the expense associated with manufacturing extremely large area image sensors. For example, a large synaptic telescope, with a 3.2 Gigapixel focal plane, which uses 189, 4K by 4K, 10-µm pixel charge-coupled devices (CCDs), with a 9.6-degree field of view over a 640-mm planar image plane, is estimated to occupy 8 cubic meters and cost around $105 Million. For example, another challenge can be associated with aberration scaling of large image plane lenses. That is, lens aberrations scale with size such that a lens system (e.g., a Cooke triplet) that is diffraction limited at, for example, a focal length of 10 mm can fail when configured to operate at a focal length of 100 mm due to aberrations.

One approach for producing very high-resolution (e.g., Gigapixel) imagers is to utilize a multiple macro-camera array configuration, where a mosaic image can be acquired by a large number of independent cameras. In particular, such a macro-camera array can be arranged to include n independent diffraction limited cameras, each having a focal plane with S pixels. Each camera can be constructed as part of a cylindrical package, where the diameter of the cylinder is the input aperture of the camera, and each camera can produce an independent sample image of the object field. In such a macro-camera array, to acquire high resolution images, the field of view of each independent camera should have minimal overlap with the neighboring cameras. In order to enable capturing higher resolution images using such a macro camera system, the focal lengths of the independent cameras must be increased, resulting in an increased physical volume, weights and the overall cost of the camera array. These costs become prohibitive for practical implementation of very high resolution imagers (e.g., where images in the range of several Gigapixels are needed).

To reduce the cost and size associated with macro-camera arrays, some systems utilize a "multi-scale" lens design that includes a common primary optics section followed by a multiple secondary section. In such multi-scale systems, the primary optics can be curved to minimize aberrations, and the secondary lenses can each be designed to correct the off-axis aberration of the primary lens at an associated field angle. The multi-scale imagers often produce segmented image planes with overlapping images that can be digitally processed and stitched together to produce a single large image. Such a segmented image plane, however, does not require a massive flat focal plane array and, therefore, facilitates the construction of high-resolution imagers with a smaller size. In addition, such multi-scale configurations provide better scaling of aberrations for low F-number Gigapixel imagers.

Nevertheless, practical implementation of such multi-scale imagers is still challenging since the manufacture of free-form (non-rotationally symmetric) aspheric components associated with the secondary optics is not trivial. Further, the lenses in the secondary section (i.e., free-form optical components with no axis of symmetry) must be individually fabricated and positioned with high degree of accuracy in a 3-dimensional space to correct the associated aberration associated with each field angle. As such, each of the image planes may be oriented at a different scale or angle. These and other shortcomings of the multi-scale lens design make it difficult to produce a cost effective imaging system that can be physically scaled to Gigapixel resolution.

The disclosed embodiments relate to methods, devices and systems that can produce extremely high-resolution images while utilizing optical components that can be manufactured and implemented feasibly within a compact imaging system. Such imaging systems can be produced at least in-part by utilizing a primary optics section that is configured to produce the same off-axis aberrations for all field angles. The primary optics section, which provides a common aperture, is radially symmetric and constitutes a monocentric lens. That is, the primary optics section comprises one or more surfaces adapted to form a symmetrical arrangement around a common point of origin. It should be noted that the term lens is used in this document to include a single lens (or a simple lens), as well as a compound lens that includes more than one optical element. In some embodiments, the monocentric lens is comprised of one or more spherical or hemispherical sections with a common center of curvature. Such a monocentric configuration provides a curved image plane and produces identical or nearly identical aberrations at each field angle. It should be noted that the terms spherical and hemispherical are used to convey surfaces or sections that are substantially spherical or hemispherical. For example, the geometry of such surfaces or sections may deviate from a perfect sphere or hemisphere due to manufacturing limitations. Because in such architecture aberrations over the field do not change, the secondary optics can be identical all over the field which significantly reduce the overall cost of the imager.

The high-resolution imagers of the disclosed embodiments also include a secondary optics section that is configured to correct residual on-axis aberrations of the monocentric primary optics section that is identical or nearly identical at each field angle. Since the aberrations are on-axis, the secondary optics section can be constructed using rotationally symmetric components (e.g., aspheres) rather than freeform optics used in other multi-scale designs. The use of rotationally symmetric aspheres in the secondary optics section allows using convenient fabrication processes such as some well-established commercial fabrication processes, and facilitates construction of imagers using simple alignment techniques.

The monocentric multi-scale imager 101 includes substantially identical secondary optics components 103, as shown in FIG. 1A. While such secondary optics include substantially identical objectives, it is still very expensive to implement. The monocentric lenses are able to form high quality image by themselves. For example, as shown in the exemplary embodiment of the multi-scale monocentric imaging system 102 of FIG. 1B, the images can be delivered from the sperical image surface 108 to a number of imaging sensors 107, e.g., CMOS sensors, via low cost optical fiber bundles 106, e.g., which can be configured as tapered optical fiber waveguides. This can significantly reduce the overall cost of the system.

II. Monocentric Lens with Fibers Image Delivery System

In one aspect, an optical imaging system includes a monocentric optical imaging module including one or more optical elements having concentric surfaces to collect light and form an image on a curved image surface, one or more optical waveguide bundles each comprising a plurality of optical waveguides that are optically coupled to the monocentric optical imaging module at different locations to receive different portions of the collected light at the curved image surface, respectively, each optical waveguide being configured to have a tapered waveguide core of a cross section that varies along the optical waveguide to select desired collected light rays to pass through the optical waveguide while rejecting undesired collected light rays from being transmitted to an output facet of the optical waveguide, and one or more imaging sensors to receive output light from the one or more optical waveguide bundles and to detect the received output light, the one or more imaging sensors configured to produce a representation of the image on the curved image surface of the monocentric optical imaging module.

Implementations of the optical imaging system can optionally include one or more of the following exemplary features. For example, each optical waveguide can include a waveguide section having a cross section in the tapered waveguide core to decrease along a direction directed from the curved image surface to a corresponding imaging sensor. For example, each optical waveguide can include a waveguide section having a cross section in the tapered waveguide core to first decrease along a direction directed from the curved image surface to a corresponding imaging sensor and then to increase along the direction directed from the curved image surface to the corresponding imaging sensor. For example, the optical waveguides in each optical waveguide bundle can be bent at different bending angles, respectively, at the curved image surface of the monocentric optical imaging module. In some implementations, the optical imaging system can further include a textured surface structure over input facets of the optical waveguides of each optical waveguide bundle to enhance optical coupling into the optical waveguides. For example, the textured surface structure can include refractive micro prisms. For example, the textured surface structure can include a diffraction grating layer. For example, the textured surface structure can include a locally spatially-varying optically patterned layer. For example, the textured surface structure can include a locally spatially varying optically patterned reflective layer. For example, the textured surface structure can include a locally spatially varying optically patterned refractive layer. For example, the textured surface structure can include a locally spatially varying optically patterned diffractive layer. For example, each optical waveguide bundle can be configured to have a tapered exterior profile between the monocentric optical imaging module and the one or more imaging sensors. For example, the optical waveguides in each optical waveguide bundle can be configured as optical fibers. For example, the imaging sensors can be planar imaging sensors. For example, each imaging sensor can include a planar array of optical detectors. In some implementations, for example, the monocentric optical imaging module can include a ball lens element formed of a substantially spherical volume of an isotropic material. In some implementations, for example, the monocentric optical imaging module can include a ball lens element having a first refractive index, and a lens element having a spherical surface formed outside the ball lens element to be concentric with the ball lens element and having a second refractive index. In some implementations, for example, the monocentric optical imaging module can include a ball lens element formed of a solid sphere having a first refractive index, a first lens element having a first spherical surface formed outside the ball lens element to be concentric with the ball lens element and having a second refractive index, and a second lens element having a second spherical surface formed outside the ball lens element to be concentric with the ball lens element, the second lens element having a third refractive index. For example, the first lens element can be a hemispherical shell located relative to the ball lens element to receive input light, and the second lens element can be a hemispherical shell located relative to the ball lens element to output light towards the curved image surface and the array of the optical waveguide bundles. In some implementations, for example, the optical imaging system can include a meniscus concentric lens element separated from the ball lens and formed of a material having a fourth refractive index to chromatic correction of the image at the curved image surface. For example, the monocentric optical imaging module can include an optical aperture stop that transmits a restricted portion of light incident on the monocentric imaging module at small incident angles to pass through the monocentric optical imaging module while blocking light at large incident angles, a ball lens element formed of a solid sphere having a first refractive index, a first lens element having a first spherical surface formed outside the ball lens element to be concentric with the ball lens element and having a second refractive index, and a second lens element having a second spherical surface formed outside the ball lens element to be concentric with the ball lens element, the second lens element having a third refractive index. For example, the monocentric optical imaging module includes two or more lenses having concentric spherical surfaces. In some implementations, for example, the optical imaging system can include an array of the optical waveguide bundles coupled to the curved imaging surface of the monocentric imaging module at different locations, each optical waveguide bundle of the array capturing a part of the image on the curved imaging surface and different optical waveguide bundles capturing different parts of the image on the curved imaging surface, respectively, an array of the imaging sensors respectively coupled to the different optical waveguide bundles, one imaging sensor per optical waveguide bundle, and a signal processing unit coupled to the imaging sensors to combine individual images from the array of imaging sensors into a single composite image representing the image on the curved imaging surface of the monocentric imaging module. For example, the signal processing unit can be configured to reduce image blurring caused by optical crosstalk of the guided light between adjacent optical waveguides bundles. For example, waveguide input sides of adjacent optical waveguide bundles are disposed with a minimal spacing so that the image formed on the curved image surface is conducted in nearly contiguous regions on to the array of the imaging sensors. In some implementations, for example, the optical imaging system can further include a lens focusing actuator coupled to the monocentric optical imaging module to adjust an axial translation position of the one or more optical elements having concentric surfaces relative to the curved image surface and the one or more optical waveguide bundles to control focusing of the monocentric optical imaging module at the curved image surface. For example, the lens focusing actuator can include a voice coil actuator. In some examples, the monocentric optical imaging module can include two optical elements having complementary phases to form an Alvarez lens for close focusing operations.

In another aspect, an optical imaging system includes a monocentric optical imaging module including one or more optical elements having concentric surfaces to collect light and form an image on a curved image surface, one or more optical waveguide bundles each comprising a plurality of optical waveguides that are optically coupled to the monocentric optical imaging module at different locations to receive different portions of the collected light at the curved image surface, respectively, in which each optical waveguide bundle includes an input optical waveguide bundle facet to receive light from the curved image surface and an output optical waveguide facet to output light, one or more imaging sensors to receive light from the one or more optical waveguide bundles and to detect the received light, the one or more imaging sensors configured to produce a representation of the image on the curved image surface of the monocentric optical imaging module, and a textured surface structure over the input optical waveguide facet associated with optical waveguides of each optical waveguide bundle to enhance optical coupling from the curved imaging surface into the optical waveguides.

Implementations of the optical imaging system can optionally include one or more of the following exemplary features. For example, the optical waveguides in each optical waveguide bundle can include first optical waveguide portions that are bent at different bending angles, respectively, at the curved image surface of the monocentric optical imaging module. For example, the textured surface structure can include a layer of micro prisms. For example, the textured surface structure can include a diffraction grating layer. For example, the textured surface structure can include a locally spatially varying optically patterned layer. For example, the textured surface structure can include a locally spatially varying optically patterned reflective layer. For example, the textured surface structure can include a locally spatially varying optically patterned refractive layer. For example, the textured surface structure can include a locally spatially varying optically patterned diffractive layer. For example, each optical waveguide bundle can be configured to have a tapered exterior profile between the monocentric optical imaging module and a corresponding imaging sensor. For example, each optical waveguide can include a waveguide section having a cross section in the tapered waveguide core to decrease along a direction directed from the curved image surface to the one or more imaging sensors. For example, each optical waveguide can include a waveguide section having a cross section in the tapered waveguide core to first decrease along a direction directed from the curved image surface to a corresponding imaging sensor and then to increase along the direction directed from the curved image surface to the corresponding imaging sensor. In some implementations, for example, the monocentric optical imaging module can include a ball lens element formed of a solid sphere having a first refractive index, and a lens element having a spherical surface formed outside the ball lens element to be concentric with the ball lens element and having a second refractive index. In some implementations, for example, the monocentric optical imaging module can include a ball lens element formed of a solid sphere having a first refractive index, a first lens element having a first spherical surface formed outside the ball lens element to be concentric with the ball lens element and having a second refractive index, and a second lens element having a second spherical surface formed outside the ball lens element to be concentric with the ball lens element, the second lens element having a third refractive index. For example, the first lens element can be one half spherical shell located relative to the ball lens element to receive input light, and the second lens element can be one half spherical shell located relative to the ball lens element to output light towards the curved image surface and the array of the optical waveguide bundles. In some implementations, for example, the optical imaging system can further include a spherical lens element formed of a material having a fourth refractive index to provide the curved image surface. In some examples, the monocentric optical imaging module can include an optical aperture stop that transmits a restricted portion of light incident on the monocentric imaging module at small incident angles to pass through the monocentric optical imaging module while blocking light at large incident angles. In some examples, the monocentric optical imaging module can include an optical aperture stop that transmits a restricted portion of light incident on the monocentric imaging module at small incident angles to pass through the monocentric optical imaging module while blocking light at large incident angles, a ball lens element formed of a solid sphere having a first refractive index, a first lens element having a first spherical surface formed outside the ball lens element to be concentric with the ball lens element and having a second refractive index, and a second lens element having a second spherical surface formed outside the ball lens element to be concentric with the ball lens element, the second lens element having a third refractive index. In some examples, the monocentric optical imaging module can include two or more lenses having concentric spherical surfaces. In some implementations, for example, the optical imaging system can include an array of the optical waveguide bundles coupled to the curved imaging surface of the monocentric imaging module at different locations, each optical waveguide bundle of the array capturing a part of the image on the curved imaging surface and different optical waveguide bundles capturing different parts of the image on the curved imaging surface, respectively, an array of the imaging sensors respectively coupled to the different optical waveguide bundles, one imaging sensor per optical waveguide bundle, and a signal processing unit coupled to the imaging sensors to combine individual images from the array of imaging sensors into a single composite image representing the image on the curved imaging surface of the monocentric imaging module. For example, the signal processing unit can be configured to reduce image blurring caused by optical crosstalk of the guided light between adjacent optical waveguide bundles. For example, waveguide input sides of adjacent optical waveguide bundles can be disposed with a minimal spacing so that the image formed on the curved image surface is conducted in nearly contiguous regions on to the array of the imaging sensors. In some implementations, for example, the optical imaging system can further include a lens focusing actuator coupled to the monocentric optical imaging module to adjust an axial translation position of the one or more optical elements having concentric surfaces relative to the curved image surface and the one or more optical waveguide bundles to control focusing of the monocentric optical imaging module at the curved image surface. For example, the lens focusing actuator can include a voice coil actuator. In some examples, the monocentric optical imaging module can include two optical elements that are operable to move relative to each other to provide an adjustable phase profile for compensation of an aberration of the monocentric optical imaging module.

In another aspect, an optical imaging system includes an optical imaging module that collects light to form an image on an imaging surface, one or more imaging sensors each including an array of optical detectors located away from the imaging surface to receive light representing the image initially formed on the imaging surface and to convert the received light into detector signals, and optical waveguides coupled between the imaging surface and the one or more imaging sensors to receive light from the imaging surface and configured to selectively deliver a desired portion of the received light to the one or more imaging sensors while suppressing undesired stray light from reaching the one or more imaging sensors so that the optical waveguides effectuate an optical aperture stop with a limited angle range for receiving light by the one or more imaging sensors.

Implementations of the optical imaging system can optionally include one or more of the following exemplary features. For example, each of the optical waveguides can include a tapered waveguide section to select the desired portion of the received light while suppressing the undesired stray light. For example, the optical imaging module can include a monocentric optical imaging module having concentric optical surfaces and the imaging surface is a curved imaging surface that is concentric with the concentric optical surfaces of the monocentric optical imaging module. In some implementations, for example, the optical imaging system can further include a lens focusing actuator coupled to the monocentric optical imaging module to adjust an axial translation position of at least one optical element inside the monocentric optical imaging module relative to the curved imaging surface to control focusing of the monocentric optical imaging module at the curved imaging surface. In some implementations, for example, the optical imaging system can further include a textured surface structure over input facets of the optical waveguides to enhance optical coupling from the imaging surface into the optical waveguides. For example, the textured surface structure can be optically reflective. For example, the textured surface structure can be optically refractive. For example, the textured surface structure can be optically diffractive. In some examples, the monocentric optical imaging module having concentric optical surfaces can include two optical elements that are operable to move relative to each other to provide an adjustable phase profile for compensation of an aberration of the monocentric optical imaging module.

In another aspect, a method for optical imaging includes operating an optical imaging module to collect light to form an image on an imaging surface, using one or more imaging sensors each including an array of optical detectors located away from the imaging surface to receive light representing the image formed on the imaging surface and to convert the received light into detector signals, and using optical waveguides coupled between the imaging surface and the one or more imaging sensors to receive light from the imaging surface of the optical imaging module to select a desired portion of the received light to reach the one or more imaging sensors while suppressing undesired stray light from reaching the one or more imaging sensors so that the optical waveguides effectuate an optical aperture stop with a limited angle range for receiving light by the one or more imaging sensors.

Implementations of the method for optical imaging can optionally include one or more of the following exemplary features. For example, each optical waveguide can be tapered. For example, the optical imaging module can be a monoconcentric optical imaging module having concentric optical surfaces, and the imaging surface can be part of a spherical surface that is concentric with the concentric optical surfaces of the monoconcentric optical imaging module. For example, in some implementations, the method can include adjusting an axial position of the monoconcentric optical imaging module at different positions to focus objects at different object planes at different axial positions on to the spherical imaging surface. For example, in some implementations, the method can include providing a textured surface structure over input facets of the optical waveguides to enhance optical coupling into the optical waveguides. For example, in some implementations, the method can include performing the optical imaging without using an optical aperture stop in an optical path in the optical imaging module and between the optical imaging module and the imaging surface.

In another aspect, a method for optical imaging includes operating an optical imaging module to collect light and to form an image on an imaging surface, coupling optical waveguides to the imaging surface to receive light of the image formed by the optical imaging module and deliver received light to one or more imaging sensors located away from the imaging surface, and providing a textured surface structure near or at the imaging surface to enhance optical coupling of light into input facets of the optical waveguides.

Implementations of the method for optical imaging can optionally include one or more of the following exemplary features. For example, the optical imaging module can be a monoconcentric optical imaging module having concentric optical surfaces and the imaging surface is part of a spherical surface that is concentric with the concentric optical surfaces of the monoconcentric optical imaging module. For example, in some implementations, the method can include adjusting an axial position of the monoconcentric optical imaging module at different positions to focus objects at different object planes at different axial positions on to the spherical imaging surface. For example, in some implementations, the method can include configuring each optical waveguide to include tapered section to select a desired portion of the received light to reach the one or more imaging sensors while suppressing undesired stray light from reaching the one or more imaging sensors so that the optical waveguides effectuate an optical aperture stop with a limited angle range for receiving light by the one or more imaging sensors.

FIG. 2A shows a diagram of a monocentric lens imaging system 202 including a physical aperture stop at the center of the objective lens. In this example, a physical aperture configured at the center of the objective lens of the system 202 is projected onto the field angle. At 60° incidence (e.g., of the exemplary 120° FOV), the aperture is elliptical and reduced in width by 50%, with a corresponding decrease in light transmission and diffraction-limited resolution.

FIG. 2B shows a diagram of a monocentric lens imaging system 200 including a "virtual stop" imagers 201 that limit the numerical aperture of the image transfer which, as exemplified in the diagram of FIG. 2B, can include non-imaging optical fibers 203. For example, the field of view of the monocentric virtual stop imagers 201 can be configured to be extraordinarily wide. As FIG. 2B shows, moving the aperture stop to the light transfer enables uniform illumination and resolution over a 160° field of view, where even at extreme angles the input light illuminates the back imaging surface of the monocentric objective of the imaging system 200. For example, the imaging system 102 as shown in FIG. 1B indicates that the image transfer optics perform all stray light control, and does not show non-sequential paths from surface reflections. In practice, for example, an oversized physical aperture or other light baffles can be used to block most of the stray light, while the images transfer optics provide the final, angle-independent apodization. While such practical optomechanical packaging constraints can limit the practical field of view, the potential for performance improvement over a conventional "fisheye" lens is clear.

As shown in FIGS. 2A and 2B, in both imaging systems 202 and 200, stray light can be controlled using a physical aperture stop in the at the center of the monocentric lens (system 202 of FIG. 2A), or through the virtual stop achieved by limiting light transmission in the image transfer optics (system 200 of FIG. 2B). In the exemplary case of relay imaging, this can be implemented using a physical aperture stop internal to the relay optics. In the exemplary case of optical fiber waveguide transfer, this can be implemented by restricting the numerical aperture (NA) of the optical fiber bundles.

Figures 3, 4A:
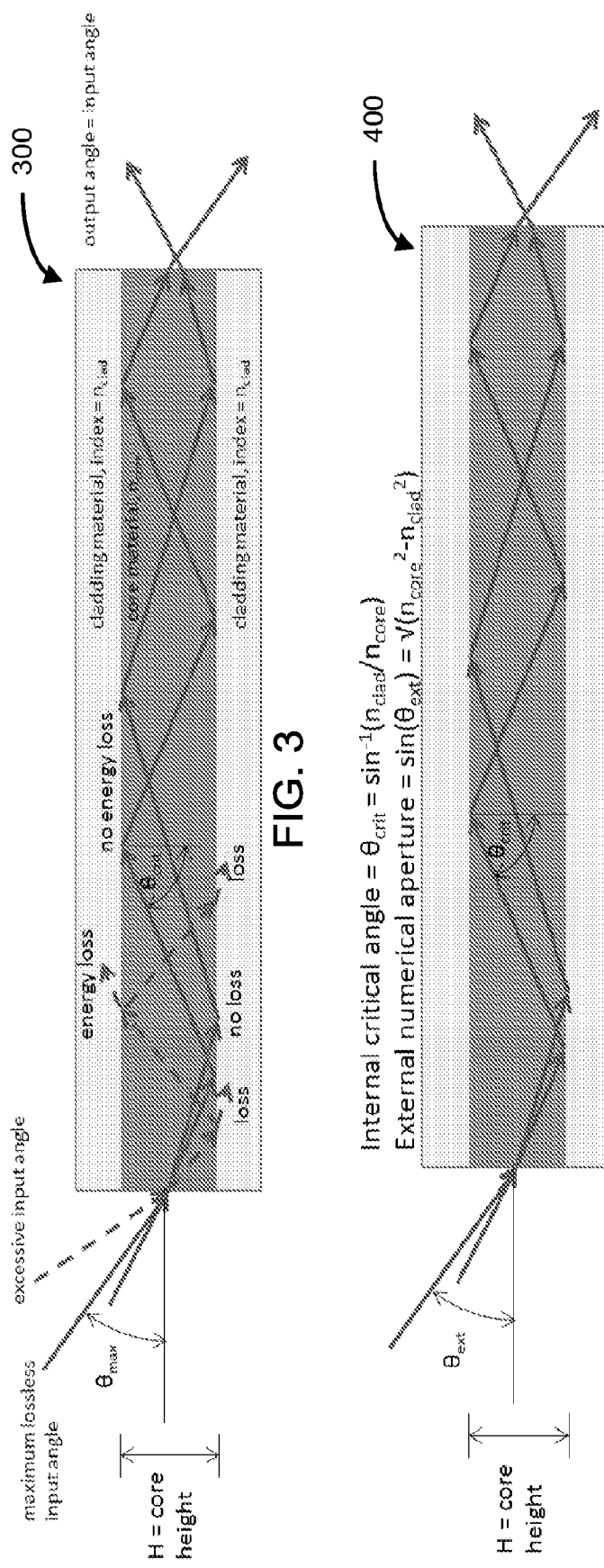
FIG. 3 shows a diagram of an exemplary optical fiber depicting light filtering in the straight fibers having numerical aperture less than 1.
FIG. 4A shows a diagrams of exemplary optical fibers depicting ray filtering in straight and tapered fibers.

FIG. 3 shows a diagram of an exemplary optical fiber 300 depicting light filtering in the straight fibers having numerical aperture less than 1. In one example, straight fiber bundles with a lower index difference between core and cladding glasses that are currently available typically include a numerical aperture of 0.28. The diagram of FIG. 3 shows an example of stray light filtering in an exemplary straight fiber bundle constructed from the fibers 300 with a restricted numerical aperture are. Rays having incident angles less than $\theta_{max}$ will be transferred through the fiber. Other rays will be stopped. The $\sin(\theta_{max}) = \sqrt{n_{core}^2 - n_{clad}^2}$, where $n_{core}$ is refraction index of the core and $n_{clad}$ is refraction index of the cladding.

FIG. 4A shows a diagrams of an exemplary straight optical fiber 400 for ray filtering and an exemplary tapered optical fiber 401 for ray filtering. For example, high index contrast bundles with a spatial taper to a smaller output face as shown in the exemplary optical fiber 401 can provide a controlled NA. Such bundles have the original output NA, but conservation of étendue reduces the input NA of a tapered fiber bundle by approximately the ratio of input to output diameter. For example, a 3:1 taper of input to output width with a 1.84 core and 1.48 cladding index, yields approximately 0.3 input NA.

The principles of light filtering in an exemplary fiber taper were shown in FIG. 4A. For example, if the fiber is tapered the light initially propagating with large angle will be stripped inside. This high propagating angle light stripping is driven by the étendue conservation law. The stripping of large angle light, and reduction in effective numerical aperture, is a property of fiber bundles. This has been treated as a limitation (e.g., in using tapered fiber bundles to concentrate light, there are limits to how much light can be concentrated). However, in a suitably designed imaging system, and especially in monocentric lens systems, the lens can be designed so that undesired stray light (which blurs or washes out the image) is incident upon the image surface with larger angles than the desired, low aberration image light. The disclosed technology utilizes this property of fiber bundles to advantage. In some implementations of the disclosed technology, fiber transmission characteristics and the physical shape of the fiber are configured to deliberately discriminate between desired signal and noise in the disclosed imaging systems, by selectively blocking undesired light from reaching the sensor.

Figure 4B:
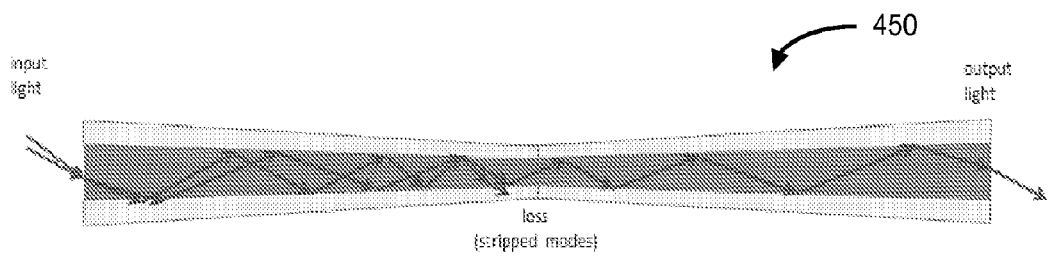
FIG. 4B shows a diagram of an exemplary optical fiber depicting light filtering in an exemplary 'hourglass' double-tapered optical fiber configuration, e.g., having the same input-output divergence.

If the fiber is tapered down, the angle of light emitted is larger than the original input angle. If a bundle is tapered up (larger output core than input core diameter), the emitted light has a smaller angle. FIG. 4B shows a diagram of an exemplary optical fiber 450 depicting light filtering in an exemplary 'hourglass' double-tapered optical fiber configuration, e.g., having the same input-output divergence. In this example, the fiber 450 is tapered down, and then tapered up to the same core diameter, which will cause the larger incident rays to be stripped midway through, but the light emitted from the re-enlarged aperture will return to the incident ray angle.

Such an exemplary hourglass shape can be configured using disclosed fabrication processes described herein for tapered fiber bundles. For example, the net effect of an hourglass fiber bundle is a fiber bundle whose input aperture active area (and light transfer efficiency) is large, but whose input numerical aperture is smaller than would be expected for the index contrast between core and cladding. This exemplary configuration can provide the transfer function needed to provide a "virtual iris" in the monocentric (or other shape) imager, e.g., such as the exemplary monocentric imager 200 shown in FIG. 2B. In some examples, the hourglass structure can also be configured to be asymmetric, e.g., with a net magnification or demagnification, as desired. The disclosed technology can use the exemplary dual-tapered fiber bundle to impose stray light stripping and independently control the light emission angle from the exit face of the fiber, for optimal image sensing.

Figure 5A:
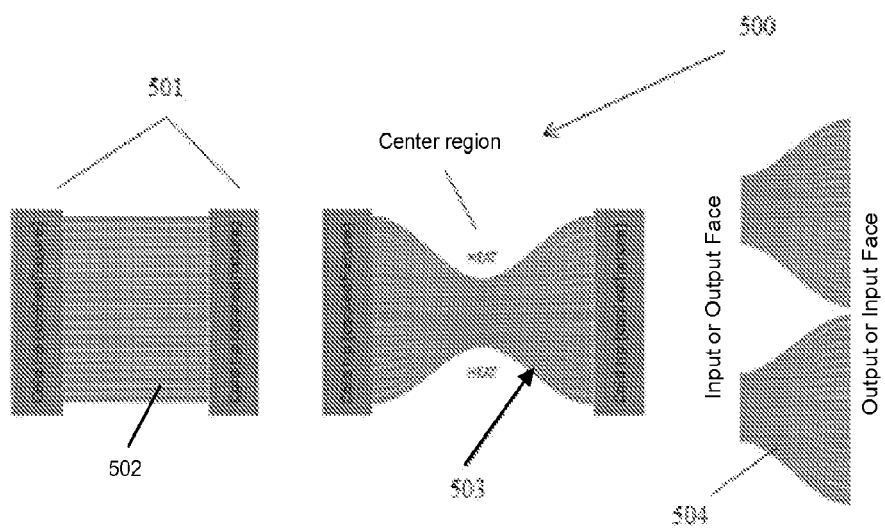
FIG. 5A shows an illustrative process diagram of an exemplary fabrication method to produce an 'hourglass' double-tapered optical fiber of the disclosed technology.

FIG. 5A shows an illustrative process diagram of an exemplary fabrication method to produce an 'hourglass' double-tapered optical fiber of the disclosed technology. The example shown in FIG. 5A includes a three step process to taper a fiber bundle in the exemplary hourglass configuration. The exemplary fabrication method can include a process to mount a plurality of straight optical fibers 502 to "cold tip" fixtures 501. After mounting the bundle in the "cold tip" fixtures 501, the exemplary fabrication method can include a process to stretch the fiber bundles with heat applied to the center region of the fiber bundles 502, e.g., until glass reaches glass transition temperature, in which the ends are held in heat sinks that remain cool and do not deform, forming an hourglass-shaped optical fiber bundle 503. In some implementations, for example, the exemplary fabrication method can include a process to cut and polish the hourglass-shaped optical fiber bundles 503 into two taper fiber bundles 504.

Figure 5B:
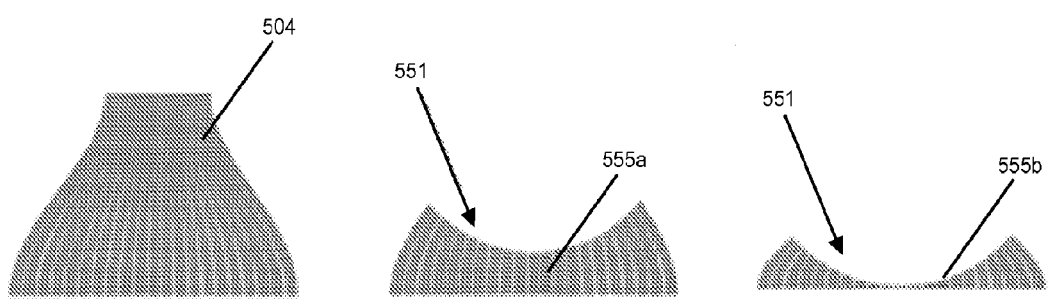
FIG. 5B shows an illustrative process diagram of an exemplary fabrication method to produce a curved fiber bundle from half of an exemplary tapered fiber bundle.

The disclosed technology can include an optical fiber bundle structured to include optical fibers that curve from a spherical image input surface towards a flat output surface with no change in fiber diameter. For example, light which is optically coupled into the fiber bundle from the concave side is guided around the bend to the output on the flat side with little or no loss. Fiber bends do not introduce losses like fiber tapers, as the light propagating in a gently curved fiber has no net angle change. This kind of fully 3-dimensional shape can be difficult to fabricate. FIG. 5B shows an illustrative process diagram of an exemplary fabrication method of the disclosed technology to produce a curved fiber bundle from half of a tapered fiber bundle. For example, a tapered fiber bundle, e.g., such as the tapered fiber bundle 504, can be polished with a spherical curvature on one face 551 to form a curved optical fiber bundle 555, so that the fibers are substantially pointed towards a common center. As shown in FIG. 5B, the tapered fiber bundle 504 can be polished such that the fiber bundle is of a desired size, as shown by the exemplary curved (conforming cup) fiber bundle 555a and 555b. This may not be exactly spherical, since the fiber cannot be drawn to a point. But the precision of alignment required for light coupling into and out of the fiber is not high. Also, stray light filtering can be accomplished with relatively angle loose tolerances. So this degree of accuracy is sufficient for a compact wide angle lens. The conforming cup fiber bundle 555 can be included in a monocentric lens image delivery system, as shown in the FIG. 9.

Figure 5C:
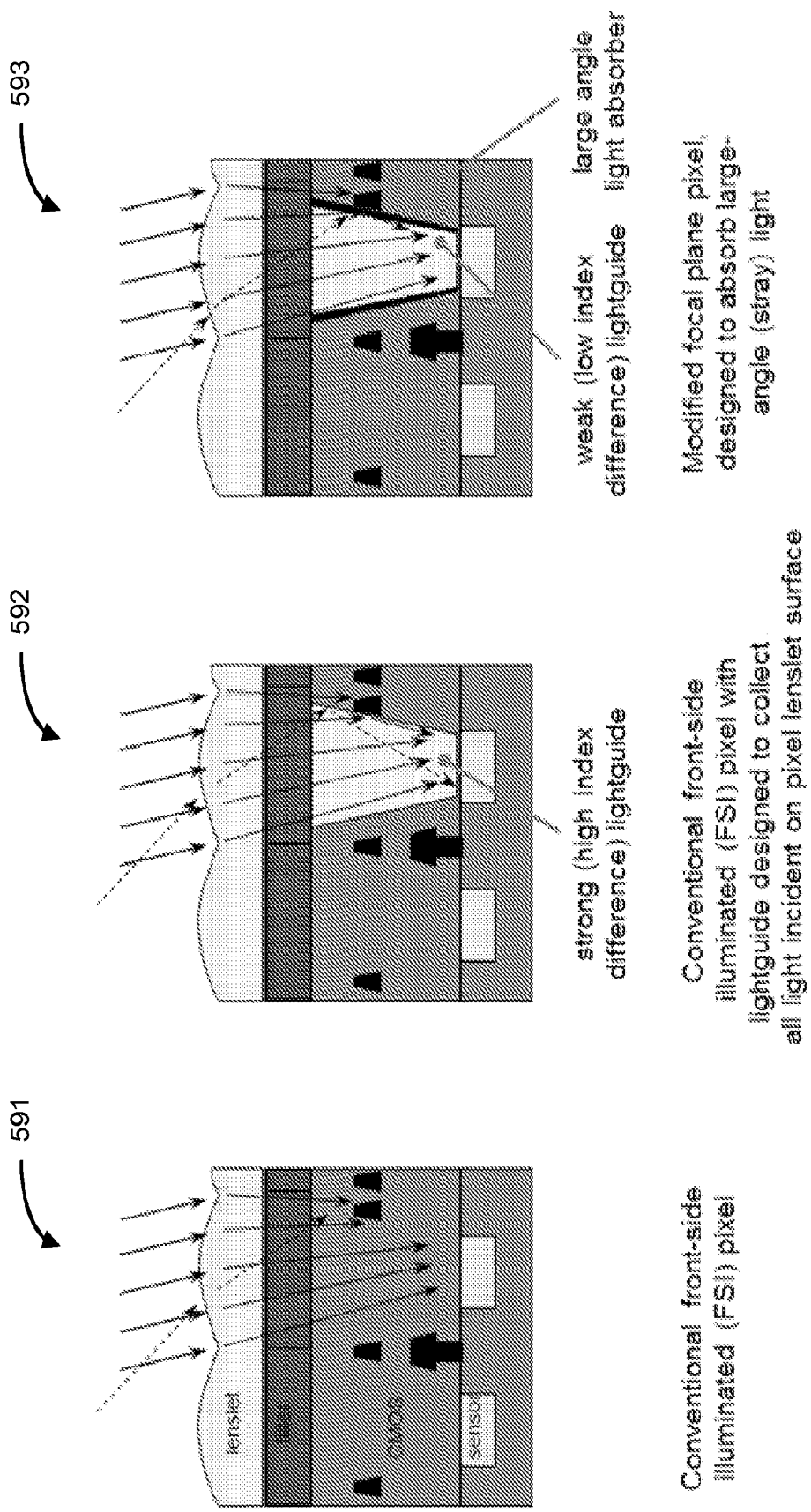
FIG. 5C shows exemplary diagrams depicting light filtering into light guided CMOS pixels, modified to introduce absorption of stray light.

CMOS image sensors can be fabricated using lenslets over each pixel, e.g., to concentrate light. For example, the disclosed technology can employ light filtering techniques including light-guided CMOS pixels, which can be modified to introduce absorption of stray light. FIG. 5C shows exemplary diagrams 591, 592, and 593 depicting light filtering into light guided CMOS pixels, modified to introduce absorption of stray light, e.g., showing front-side illuminated (FSI) vs. back-side illuminated (BSI) focal planes. The diagram 591 shows a conventional FSI pixel. The diagram 592 shows a conventional FSI pixel with an exemplary lightguide designed to collect all the light incident on the pixel lenslet surface. The diagram 593 shows an exemplary modified focal plane pixel, which is configured to absorb large-angle (stray) light. For example, some manufacturers use an internal waveguide to increase light collection in each pixel. Typically, the goal is to transfer as much light as possible to the sensor. However, the same function can be provided using the disclosed tapered fiber bundle using intentional light stripping and filtering in the focal plane itself, e.g., either by shaping the light guide to intentionally strip large angle light or using a lower index contrast waveguide, in combination with introducing an absorbing material between the light guides to absorb the light which is not guided. In some implementations, for example, the focal plane can be designed so that the undesired large angle light is absorbed, or it can be designed so that the large angle light is reflected. In both exemplary cases, the undesired large angle light is not detected, and the use of the focal plane's restrictions on light transmission angle then acts as a stray light filter, or virtual iris, in an imaging system of the disclosed technology.

For example, if the fiber bundle is to be used to strip stray light, the angle of incidence of the light into the fiber should to be well controlled. For example, if the focal plane is to be used to strip stray light, the angle of incidence into the focal plane should be well controlled. For example, if the focal plane is to be used to strip stray light from the light after transmission through the fiber bundle, the angle of incidence into the fiber, as well as the angle of incidence into the focal plane, should be well controlled.

For these types of exemplary imagers, it can be advantageous to have the optical fiber bundle shaped so the fiber cores are oriented radially from the center of the monocentric lens, and then curve to become perpendicular from the focal plane, as exemplified by the curved fiber bundle 555 shown in FIG. 5B.

In another aspect, a method for fabricating a monoconcentric optical imaging system includes forming a flat slab of having fibers being parallel to one another and perpendicular to the flat slab surfaces, bonding the flat slab onto a flat surface of a wafer to form a bonded structure, processing an exposed surface of the flat slab bonded onto the wafer to form spherical surface depressions at different locations, and engaging monocentric optical imaging modules to the spherical surface depressions, respectively, so that each spherical surface depression serves as a curved imaging surface for forming images by a corresponding monocentric optical imaging module.

Implementations of the method for fabricating a monoconcentric optical imaging system can optionally include one or more of the following exemplary features. In some implementations, for example, the method can include, before engaging the monocentric optical imaging modules to the spherical surface depressions, forming a textured surface layer over the spherical surface depressions for enhancing optical coupling into the fibers. In some implementations, for example, the method can include separating the bonded structure into individual modules where each separated module includes a spherical surface depression and a monocentric optical imaging module. For example, the separating step can be performed before the engaging step. For example, the separating step can be performed after the engaging step. For example, the forming of the textured surface layer over the spherical surface depressions can include forming a layer of material over the spherical surface depressions, and patterning the layer of the material to form the textured surface layer. For example, the patterning of the layer of the material can include an embossing process. For example, the forming of the textured surface layer over the spherical surface depressions can include directly patterning a top surface of each spherical surface depression to form a patterned top surface as the textured surface layer. For example, the forming of the textured surface layer over the spherical surface depressions can include a molding process. For example, the wafer can include imaging circuits at different locations that correspond to different the spherical surface depressions and that are separated when separating the bonded structure into individual modules, in which each imaging circuit includes optical detectors for receiving light from the fibers. For example, each imaging circuit can include CCD or CMOS imaging sensing elements.

In another aspect, an optical imaging system includes a substrate, a flat slab bonded over the substrate, the flat slab having fibers being parallel to one another and perpendicular to the flat slab surfaces and configured to include spherical surface depressions at different locations on top of the flat slab, and monocentric optical imaging modules engaged to the spherical surface depressions, respectively, so that each spherical surface depression serves as a curved imaging surface for forming images by a corresponding monocentric optical imaging module.

Implementations of the optical imaging system can optionally include one or more of the following exemplary features. In some implementations, for example, the system can further include a textured surface layer formed on each spherical surface depression for enhancing optical coupling from a respective monocentric optical imaging module into the fibers via the spherical surface depression. In some implementations, for example, each optical fiber includes a tapered fiber core of a cross section that varies along the optical fiber to select desired collected light rays to pass through the optical fiber while rejecting undesired collected light rays from being transmitted to an output facet of the optical fiber.

Figure 6:
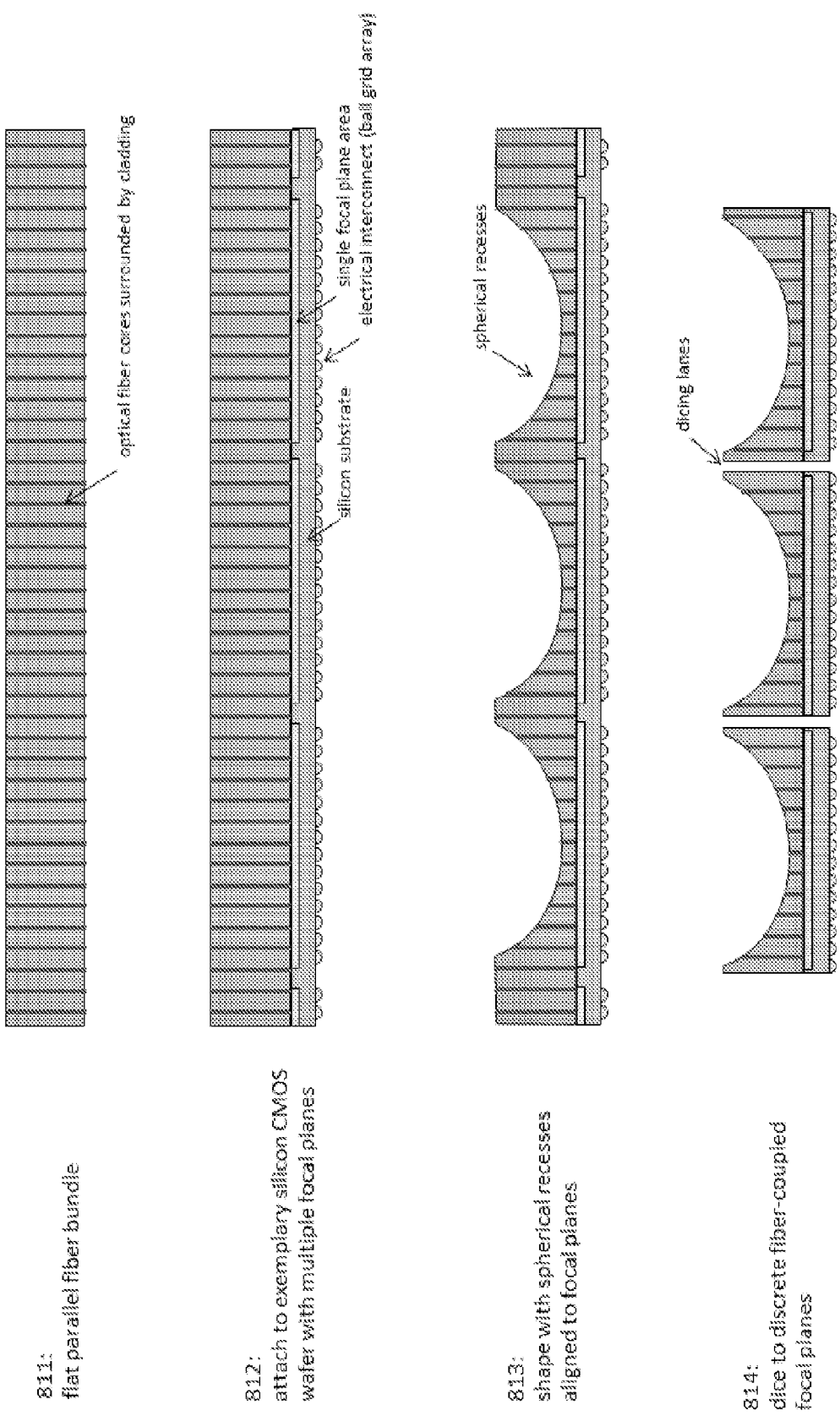
FIGS. 6-8 show illustrative process diagrams of wafer scale fabrication techniques to produce straight fiber bundles.
Figure 7:
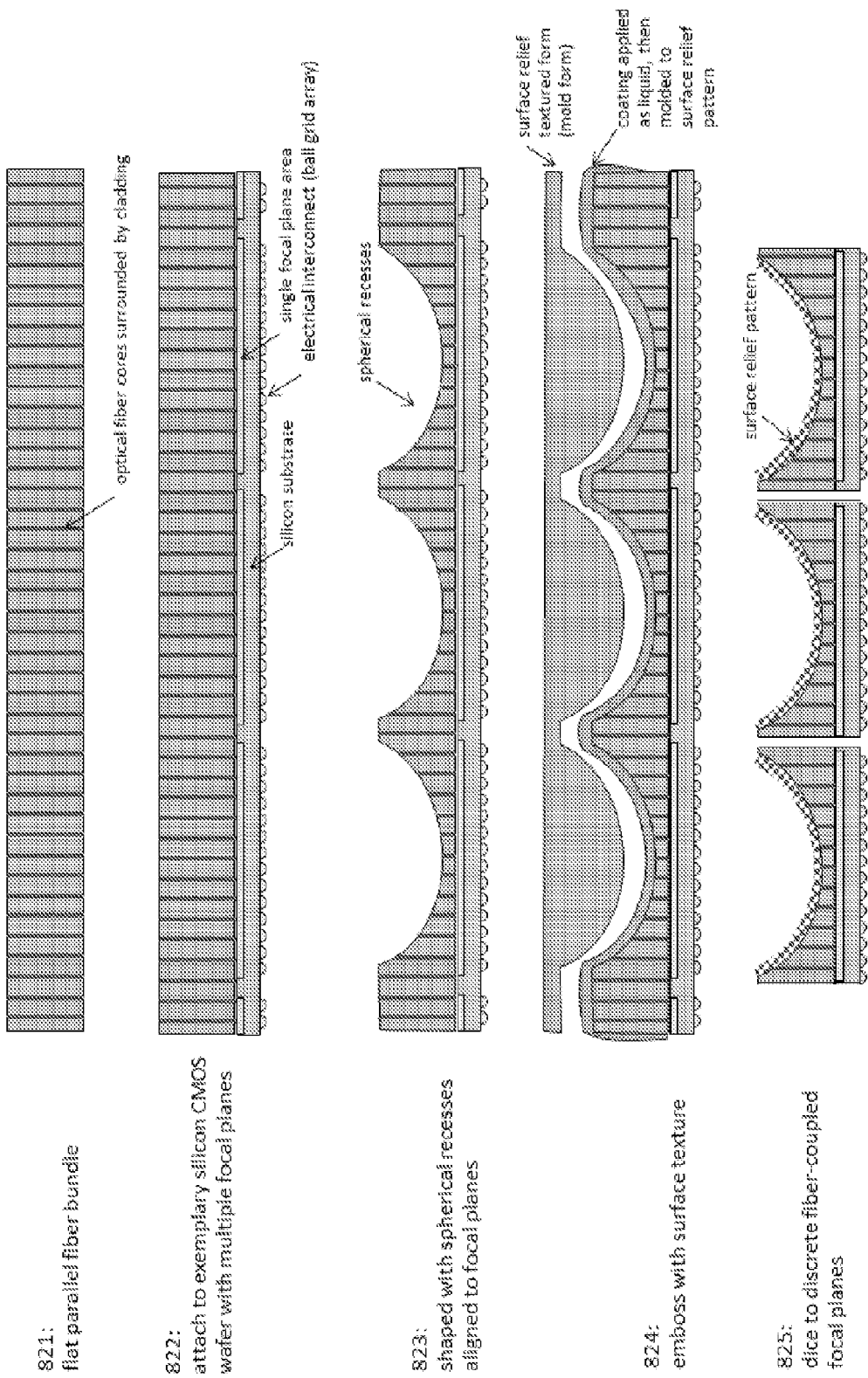
Figure 8:
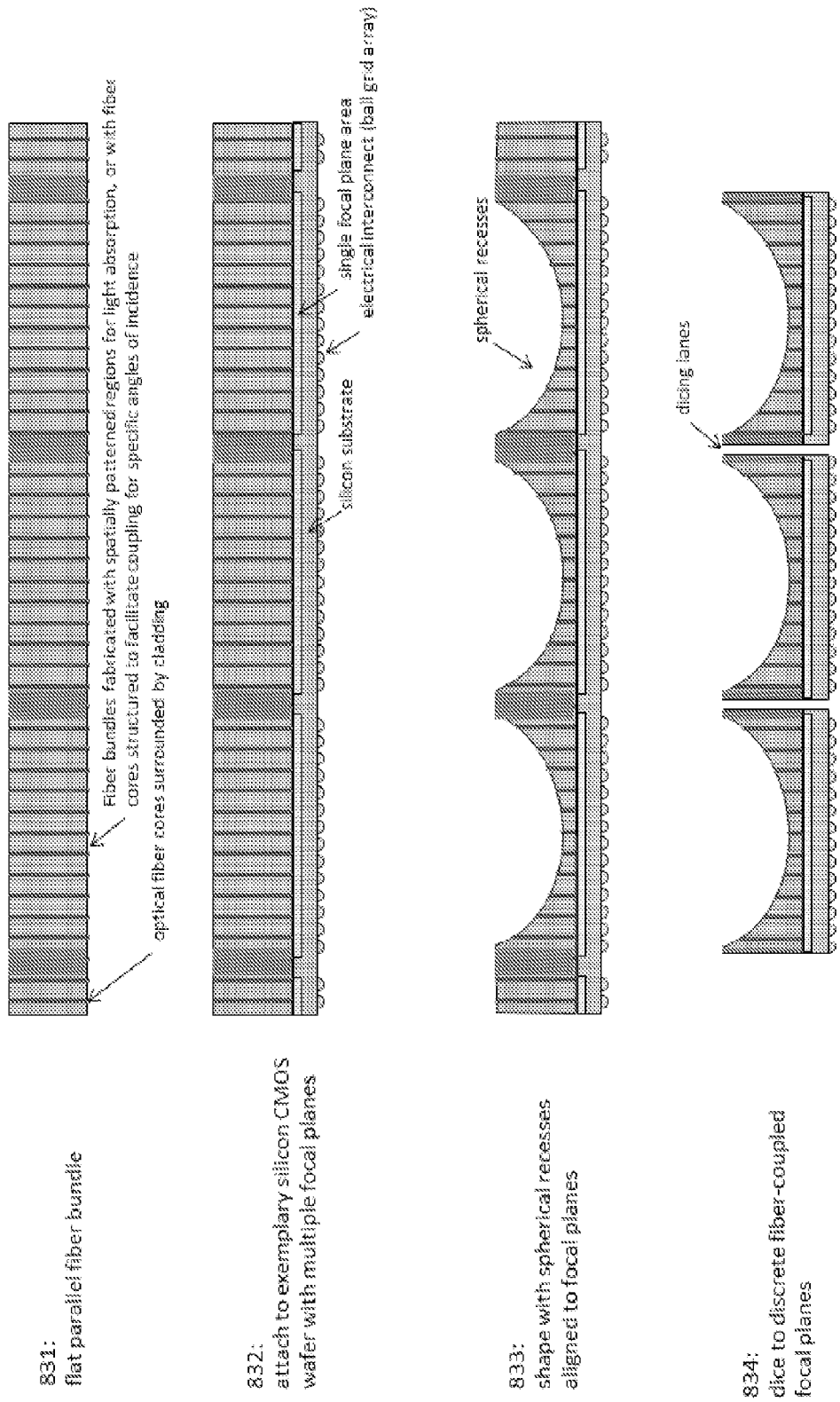

FIGS. 6-8 show illustrative process diagrams of exemplary wafer-scale fabrication techniques to produce straight fiber bundles. In the example in FIG. 6, the exemplary fabrication technique can include a process 811 to form a slab of optical fibers (e.g., optical fiber cores surrounded by cladding) that are substantially parallel to one another and perpendicular to at least one flat surface. The exemplary fabrication technique can include a process 812 to attach the flat surface of the optical fibers slab onto a flat surface of a wafer to form a bonded structure. For example, the wafer can be configured as a silicon-based CMOS wafer with multiple focal planes, and including electrical interconnects configured in a ball and grid array. The exemplary fabrication technique can include a process 813 to form one or more spherical surface depressions at different locations, e.g., that are aligned with focal planes. For example, the process 813 can include rotationally cutting or embossing the surface depressions into the exposed side of the optical fiber slab. The exemplary fabrication technique can include a process 814 to separate the bonded structure into individual modules, in which each separated module includes one or more spherical surface depressions and is diced to discrete fiber-coupled focal planes.

In the example in FIG. 7, the exemplary fabrication technique can include a process 821 to form a slab of optical fibers (e.g., optical fiber cores surrounded by cladding) that are substantially parallel to one another and perpendicular to at least one flat surface. The exemplary fabrication technique can include a process 822 to attach the flat surface of the optical fibers slab onto a flat surface of a wafer to form a bonded structure. For example, the wafer can be configured as a silicon-based CMOS wafer with multiple focal planes, and including electrical interconnects configured in a ball and grid array. The exemplary fabrication technique can include a process 823 to form one or more spherical surface depressions at different locations, e.g., that are aligned with focal planes. For example, the process 823 can include rotationally cutting or embossing the surface depressions into the exposed side of the optical fiber slab. The exemplary fabrication technique can include a process 824 to form a textured surface layer over the one or more spherical surface depressions, e.g., which can enhance optical coupling into the fibers in each of the one or more spherical surface depressions. For example, the process 824 can include forming a coating layer of material over the one or more spherical surface depressions, e.g., formed as a liquid coating and then molded to the surface relief pattern, and subsequently patterning the coating layer to form the textured surface layer by applying an embossing tool to the coating layer. The exemplary fabrication technique can include a process 825 to separate the bonded structure into individual modules, in which each separated module includes at least one spherical surface depression with the surface relief pattern and is diced to discrete fiber-coupled focal planes.

In the example in FIG. 8, the exemplary fabrication technique can include a process 831 to form a slab of optical fibers (e.g., optical fiber cores surrounded by cladding) that are substantially parallel to one another and perpendicular to at least one flat surface. In the example of FIG. 8, the slab of optical fibers are fabricated with spatially patterned features for light absorption, or with fiber cores structured to facilitate coupling for specific angles of incidence. The exemplary fabrication technique can include a process 832 to attach the flat surface of the optical fibers slab onto a flat surface of a wafer to form a bonded structure. For example, the wafer can be configured as a silicon-based CMOS wafer with multiple focal planes, and including electrical interconnects configured in a ball and grid array. The exemplary fabrication technique can include a process 833 to form one or more spherical surface depressions at different locations, e.g., that are aligned with focal planes. For example, the process 833 can include rotationally cutting or embossing the surface depressions into the exposed side of the optical fiber slab. The exemplary fabrication technique can include a process 834 to separate the bonded structure into individual modules, in which each of the one or more separated module includes a spherical surface depression and is diced to discrete fiber-coupled focal planes.

Each of the exemplary fabrication techniques of FIGS. 6-8 can further include a process to engage a monocentric optical imaging module to a separated module, produced of any of the described techniques, so that the spherical surface depression serves as a curved imaging surface for forming images by the monocentric optical imaging module.

Figure 8B:
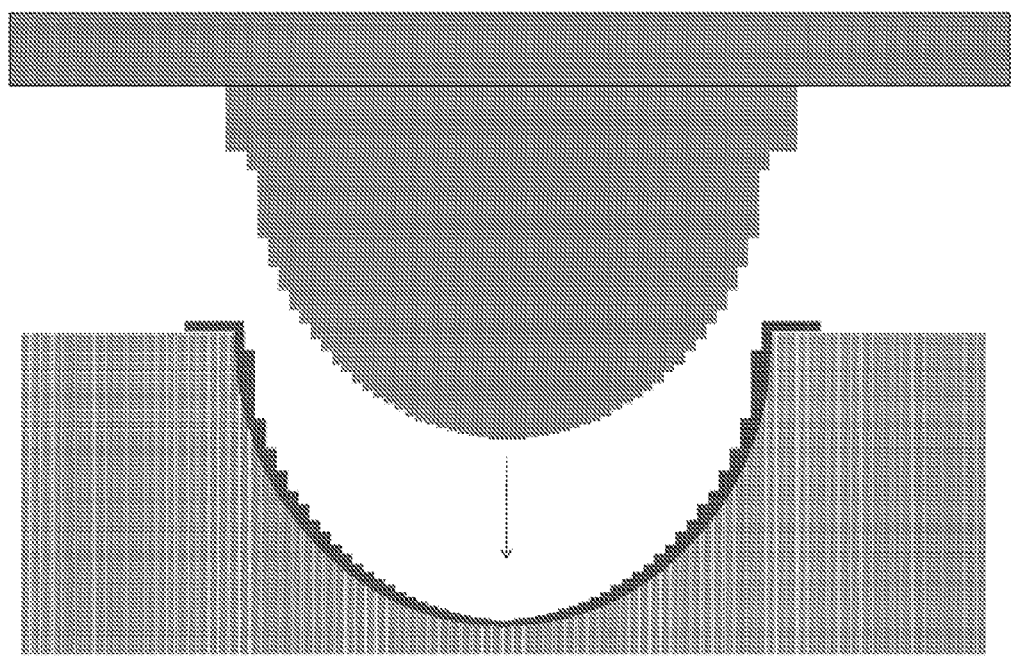
FIGS. 8B and 8C show schematic diagrams of exemplary tools to create and shape surface relief patterns for improved fiber coupling.

FIG. 8B shows a diagram of an exemplary embossing tool to create and shape surface relief patterns for improved fiber coupling. For example, the exemplary embossing tool can be implemented (e.g., pressed down) to form a surface shape on a coating over spherical fiber bundle surface, as illustrated in the diagram of FIG. 8B.

Figure 8C:
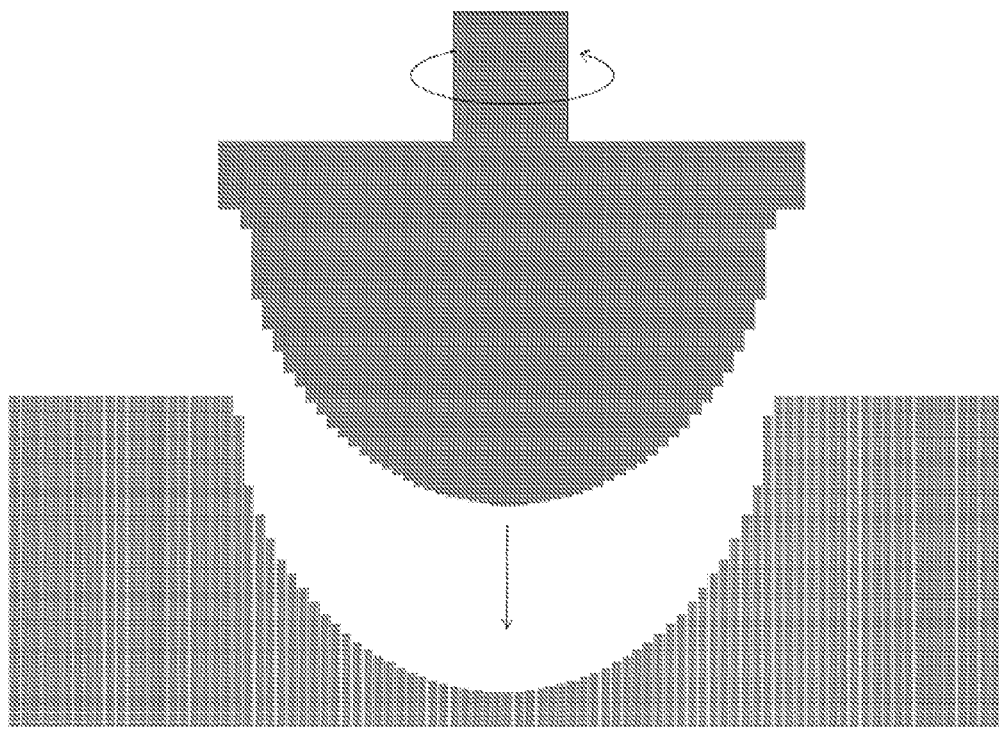

FIG. 8C shows a diagram of an exemplary rotating cutting tool to create and shape surface relief patterns for improved optical fiber coupling. For example, the exemplary rotating cutting tool can be implemented to cut directly into fiber bundle material, e.g., to form an exemplary stepped surface pattern, as illustrated in the diagram of FIG. 8C.

Figure 9:
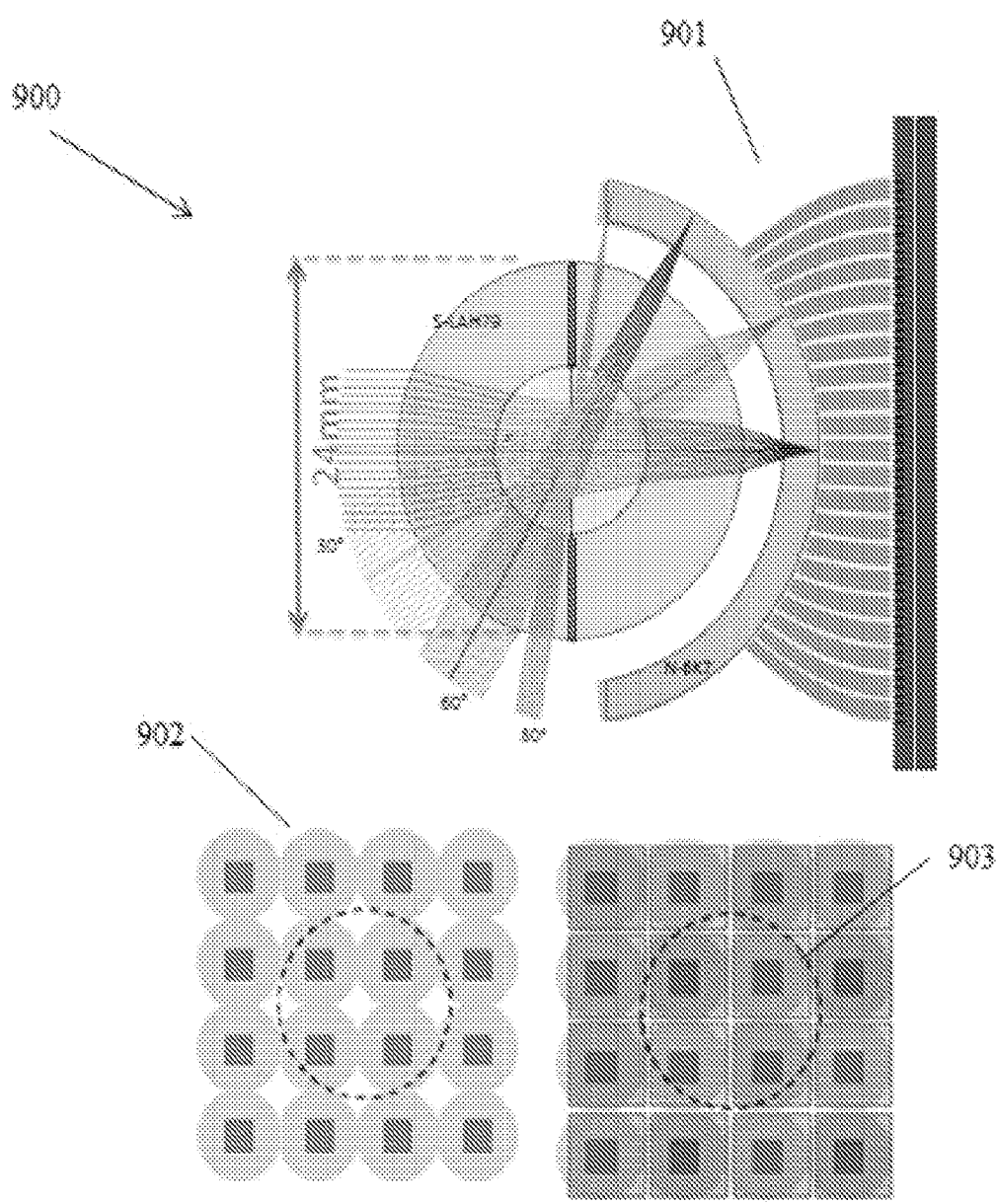
FIG. 9 shows a diagram of an exemplary imaging system including a monocentric lens with curved fiber bundle image delivery system and color CMOS array having pixels pitch two times less than fiber diameter at the output.

FIG. 9 shows a diagram of an exemplary imaging system 900 including a monocentric lens with curved fiber bundle image delivery system and color CMOS array having pixels pitch two times less than fiber diameter at the output. The monocentric imaging system 900 is structured to include an optical fiber bundle 901 having concave surface configured from a tapered bundle, e.g., such as the curved fiber bundle 555 shown in FIG. 5B. The optical fiber bundle 901 can be structured to include fiber cores are configured to be substantially normal to the light cones that transfer light without enlarging the cone angle. While fibers can have the low input NA to restrict stray light, in this exemplary configuration, the fibers of the optical fiber bundle 901 can be configured with an NA=1, e.g., to collect all incident light into the fiber. Because the light incident on the face of the curved fiber is transmitted through the fiber and emitted with a similar angle at the output face, the undesired large angle light is emitted with a large angle. This large angle light can then be filtered and not sensed by a suitably designed CMOS detector 902 which has been structure to detect light incident within a limited range of angles. One way to accomplish this limitation on the acceptance angle of the detector is to introduce specific structures within the individual detector pixel. A color filter can increase apparent resolution; one fiber core 903 illuminates one RGB super pixel which has four physical pixels.

Figure 10:
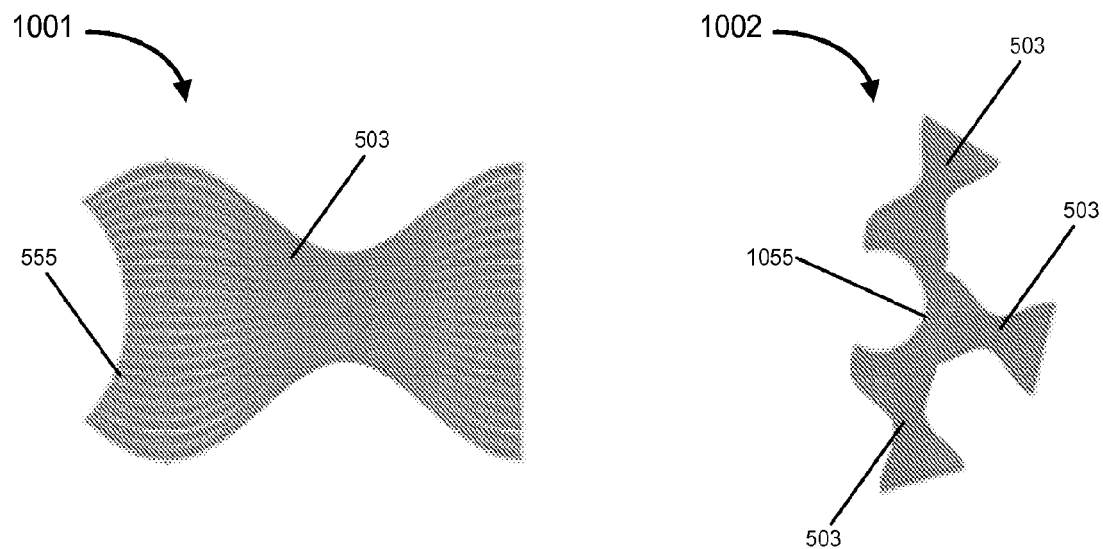
FIG. 10 shows diagrams of exemplary "fish-shaped" fiber bundles for light guiding and stray light filtering.

FIG. 10 shows diagrams of exemplary "fish-shaped" fiber bundles 1001 and 1002 for light guiding and stray light filtering. In one example, the curved fiber bundle 555 can be combined with an hourglass shaped fiber, e.g., like that of hourglass-shaped optical fiber bundle 503, to create an exemplary fish-shaped overall bundle 1001, in which the light is coupled between the two bundles 555 and 503 (e.g., with some spreading, even if the bundles are incoherent and the cores are not matched in pitch or laterally aligned). In one example, the fish-shaped optical fiber bundle 1001 is an exemplary configuration using one curved fiber bundle 555 optically coupled to one hourglass-shaped optical fiber bundle 503. In another example, the fish-shaped optical fiber bundle 1002 is an exemplary configuration using a plurality of curved fiber bundle structures 555 structured to form a single curved fiber bundle structure 1055 that is optically coupled to a plurality of hourglass-shaped optical fiber bundle structures 503. For example, if the total angle range of light to be coupled into any single fiber bundle is not large (e.g., 30 degrees), then the overall structure provides for a good approximation to radially disposed fibers at the image surface, substantially uniform stray light stripping at the fiber waist, and substantially parallel light emission to couple into the focal plane. Also, for example, if the angle subtended by each bundle is sufficiently small, the curved face can be polished directly into the hourglass bundle.

Figure 11:
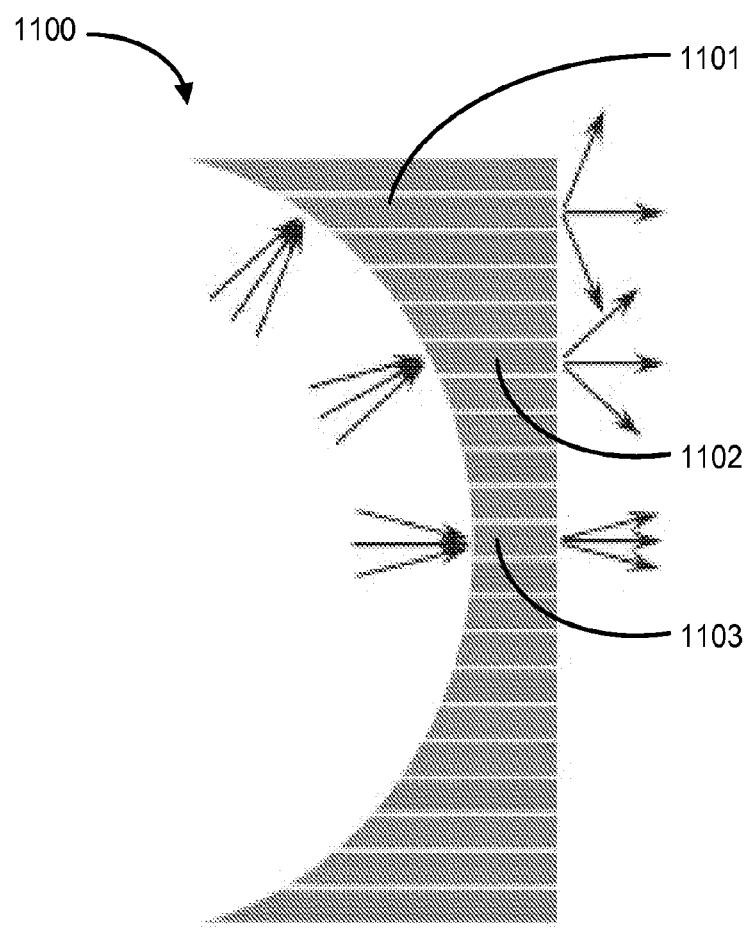
FIG. 11 shows a diagram depicting the ray output resulting from illuminating a straight fiber bundle with a concave input face, e.g., indicating a large variation in output light divergence.

FIG. 11 shows a diagram of an exemplary straight optical fiber bundle 1100 having an overall concave input face and including a plurality of optical fibers each having a fiber core that is sensitive to the input angle of light emitted into the optical fiber and the shape of the optical fiber. The diagram of FIG. 11 shows the ray output resulting from illuminating three exemplary optical fibers 1101, 1102, and 1103 at the concave input face of the straight fiber bundle 1100, e.g., which shows a large variation in output light divergence based on the curvature of the input face and the angle of incidence upon that curved face. The optical fiber 1101 receives input light at a relatively large angle of incidence, e.g., compared to that of the optical fibers 1102 and 1101, such that the light is outputted from the straight optical fiber bundle at greatly diverging output angles. The optical fiber 1102 receives input light at a smaller angle of incidence to that of the optical fiber 1103 but at a larger angle of incidence to that of the optical fiber 1101, such that the light is also outputted from the straight optical fiber bundle at diverging output angles. The optical fiber 1103 is configured as the central fiber on the concave input face of the straight fiber bundle 1100 and receives input light at a relatively small angle of incidence to that of the other optical fibers, such that the light is also outputted from the straight optical fiber bundle at similar angles to those of the input light. For example, such difference in the output divergence over the field can result in excessive CMOS pixels crosstalk toward the edge of the field.

Figure 12:
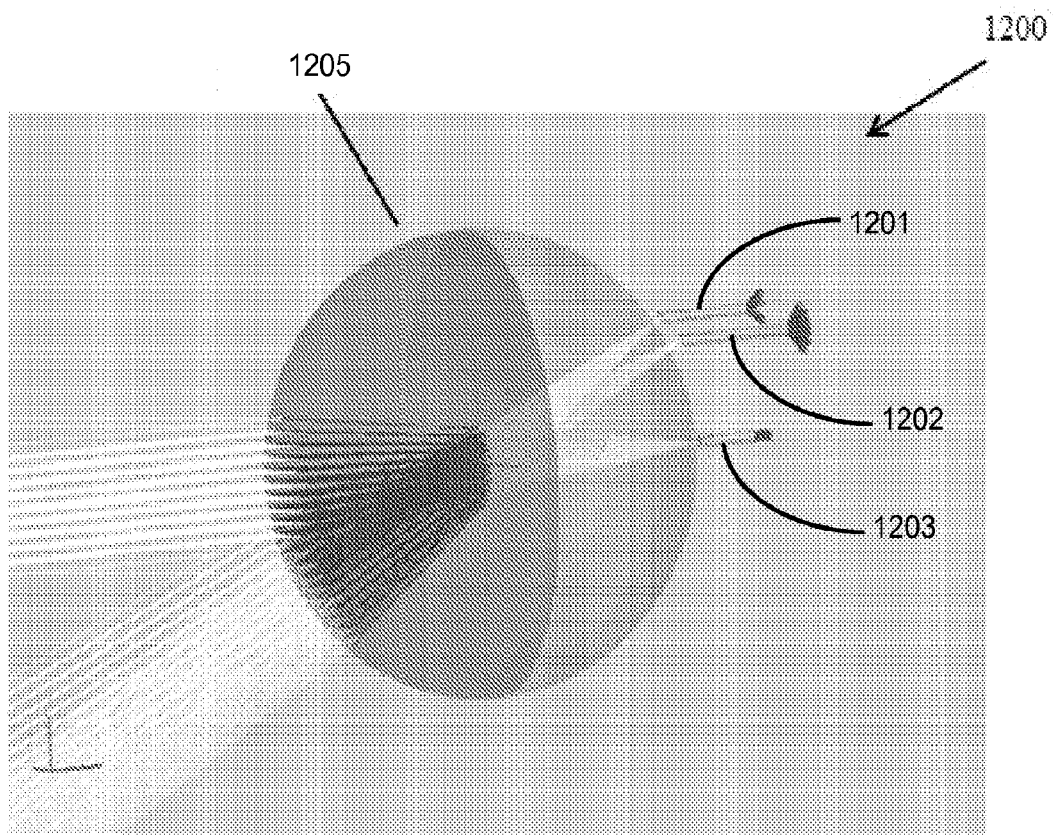
FIG. 12 shows a diagram depicting the coupling efficiency and output divergence for the exemplary straight optical fibers of an exemplary monocentric optical imaging system located at the center field and two off-axis field points.

FIG. 12 shows a diagram of an exemplary monocentric optical imaging system 1200 including a primary monocentric imaging lens module 1205 coupled to straight optical fibers 1201, 1202, and 1203, depicting the coupling efficiency of light between the lens module 1205 and the straight optical fibers and the output divergence of the light out of the straight fiber 1201, 1202, and 1203. For example, showing three fibers located at the center field, and two off-axis field points. As shown in FIG. 12, the exemplary 2 mm focus monocentric lens module 1205 depicts ray-tracing of three field points through the straight fibers 1201, 1202, and 1203, in which the straight fiber 1203 is located at the center of the field, the straight fiber 1201 is located at the upper field point of 30°, and the straight fiber 1202 is located at the field point located at 30° in the vertical direction and 25.5° in horizon direction. The exemplary optical fibers 1201, 1202, and 1203 have NA=1. The exemplary optical fiber bundle can be cemented to an exemplary CMOS sensor, e.g., with Norland 61 cement, so that the fibers output are imbedded into the medium with refraction index 1.56. As shown in the FIG. 12, the divergence increases with field angles.

Figure 13:
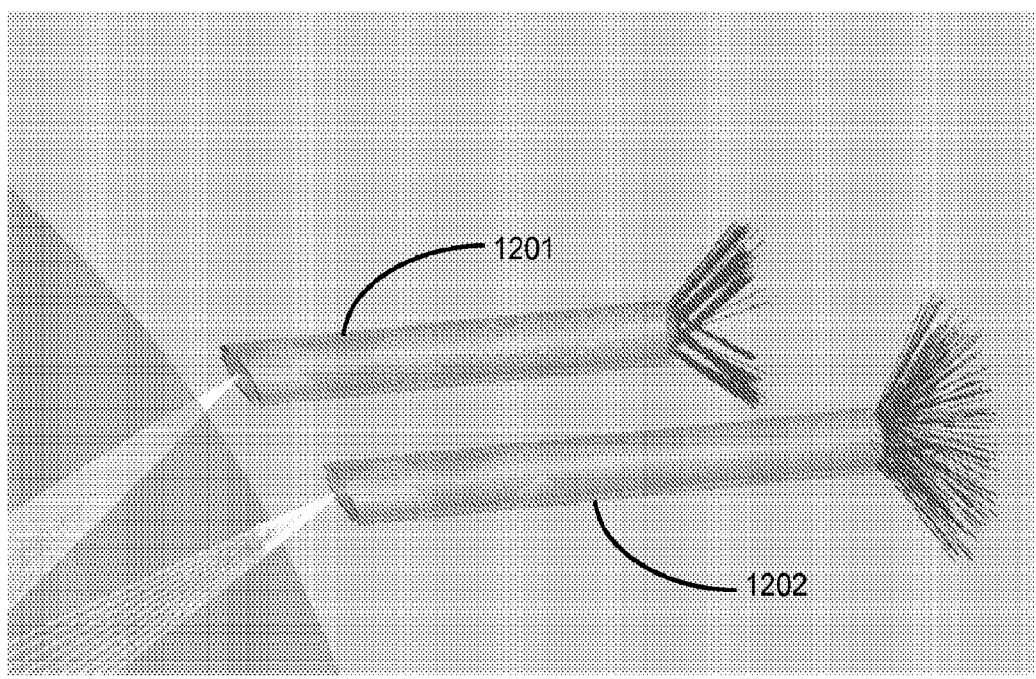
FIG. 13 shows a diagram depicting a more detailed view of the exemplary ray-tracing of FIG. 12 through the exemplary straight fibers of the exemplary monocentric optical imaging system.

FIG. 13 shows a diagram depicting a more detailed partial view of the ray-tracing through the exemplary straight fibers 1201 and 1202 of the monocentric optical imaging system 1200.

Figure 14:
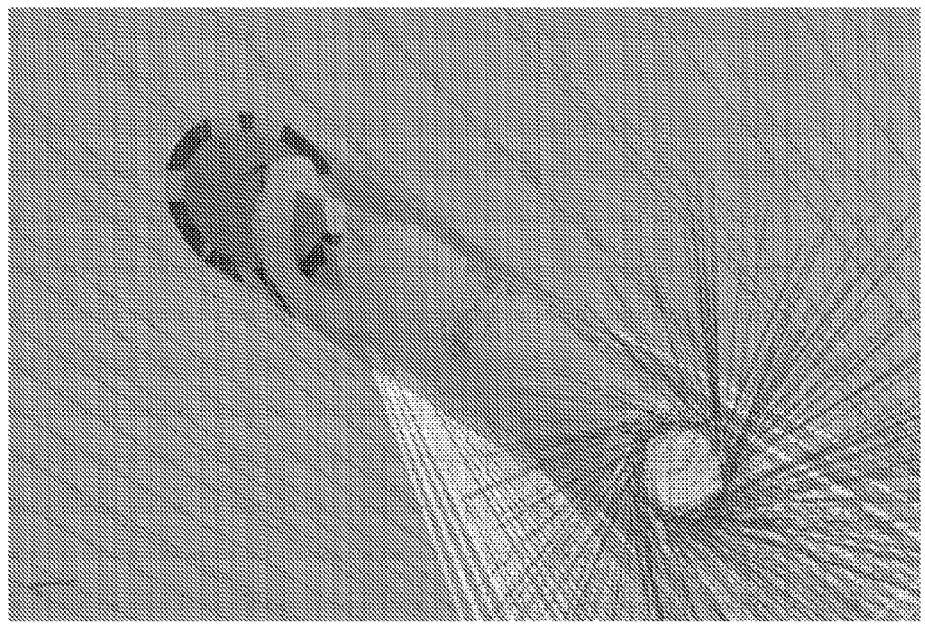
FIG. 14 shows a diagram depicting the output of an exemplary optical fiber of an exemplary monocentric optical imaging system located at the corner field point.

FIG. 14 shows a diagram depicting the output of an exemplary optical fiber of the monocentric optical imaging system 1200 located at a corner field point. For example, the skew coupling angle can create a vortex like output with low intensity at the low divergence angles.

For example, to simulate sensor crosstalk, an imaging sensor was mounted at a 2 μm distance from the bundle output. In this example, the bundle was cemented to the sensor with NOA61 optical cement. The fiber bundle pitch was configured to be 2.5 μm and the CMOS sensor pitch was configured to be 1.75 μm. For example, it was supposed that light will be very fast absorbed, and created electrons will be collected by electrode having 50% from pixel square size. The results of the exemplary simulation are shown in FIG. 15.

Figure 15:
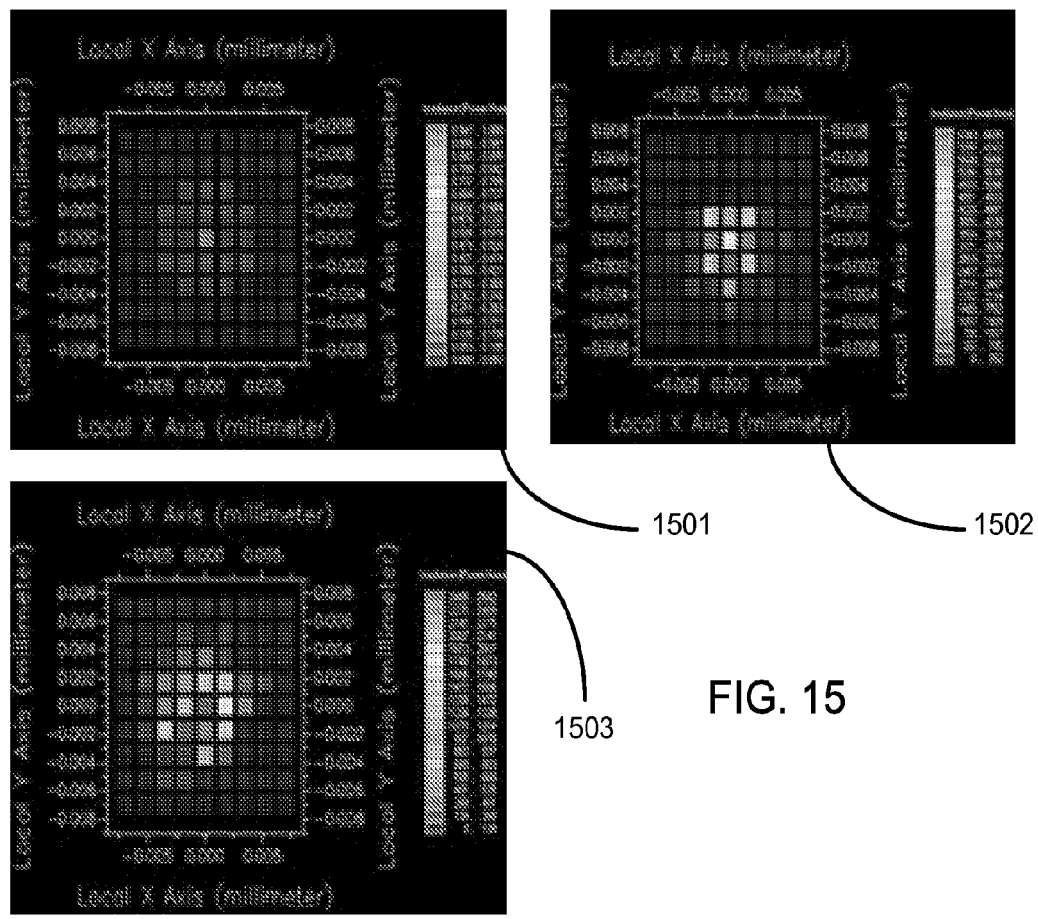
FIG. 15 shows a diagram depicting the detected focal plane signal, e.g., showing the adjacent pixel crosstalk resulting from the same three field points.

FIG. 15 shows a diagram depicting the detected focal plane signal, e.g., showing the adjacent pixel crosstalk resulting from the same three field points. In FIG. 15, an image 1501 shows an array of output signals for the center of the field, an image 1502 shows an array of output signals for the upper field point, and an image 1503 shows an array of output signals for the corner field point. The excessive crosstalk especially for the exemplary vortex-like fiber output at the corner field point is shown to spread into a radius spot of at least four pixels.

Figure 16:
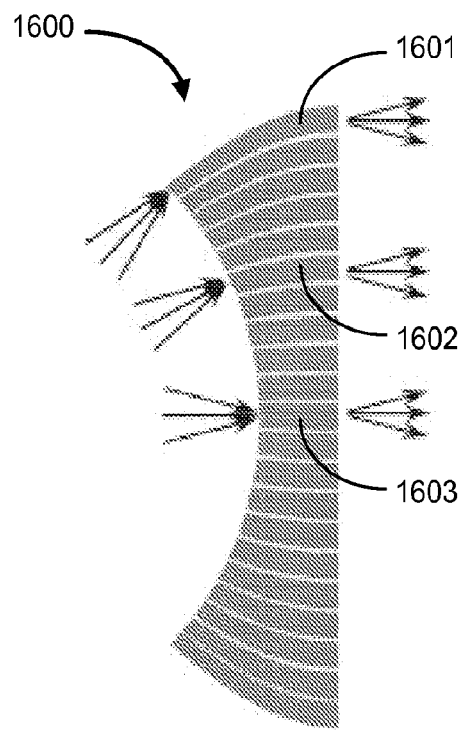
FIG. 16 shows a diagram depicting the uniform output divergence of an exemplary curved tapered fiber bundle operating with an exemplary monocentric lens so the principal rays of the lens substantially align with the fiber axis at input.

For example, to improve coupling efficiency and reduce crosstalk, the disclosed technology includes techniques, devices and systems that curve the overall fiber to align with the incident light cone, as shown in FIG. 16. FIG. 16 shows a diagram depicting the uniform output divergence of an exemplary curved and tapered fiber bundle 1600 that is operable with an exemplary monocentric lens so the principal rays of the lens substantially align with the fiber axis at input. The diagram of FIG. 16 shows the ray output resulting from illuminating three exemplary curved and tapered optical fibers 1601, 1602, and 1603 at the concave input face of the curved and tapered fiber bundle 1600, e.g., which shows no substantial variation in output light divergence based on the curvature of the input face. For example, each of the curved optical fibers can be configured with a tapered optical fiber core surrounded by the exterior cladding, e.g., similar to the hourglass-tapered fiber configuration shown in FIG. 4B. For example, the optical fiber 1601 receives input light at a relatively large angle of incidence, e.g., compared to that of the optical fibers 1602 and 1601, but outputs the light at substantially the same angle as those of the optical fibers 1602 and 1601.

Figure 17:
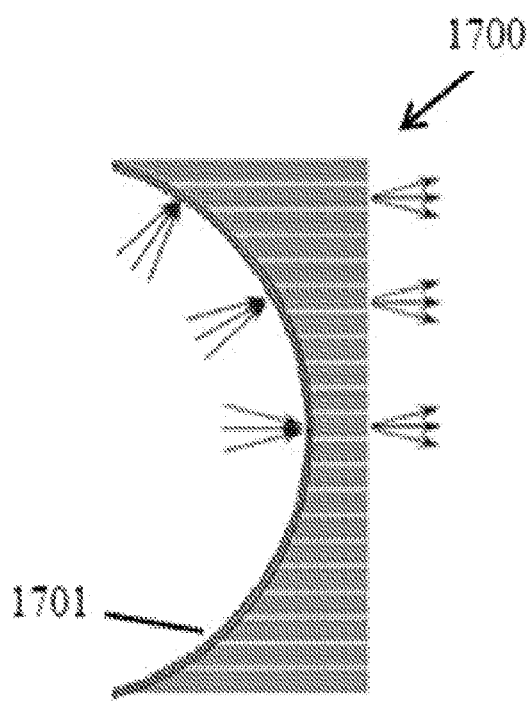
FIG. 17 shows a diagram depicting light coupling into and out of an exemplary straight fiber bundle with a concave input face having beam-deflecting features.

Additionally, for example, the disclosed technology includes techniques, devices and systems that tilt the light cone to align with the fiber. One example includes using a thin conformal layer 1701, e.g., patterned with micro optics along peripheral optical fibers of the concave input face to deflect the input light at optical angles similar to that of those of optical fibers aligned along the center field, as shown in FIG. 17. FIG. 17 shows a diagram depicting light coupling into and out of an exemplary straight fiber bundle 1700 with a concave input face, in which the concave surface has been modified with beam-deflecting features (e.g., holographic or lithographic input structure) to improve uniformity of output divergence.

Figure 18:
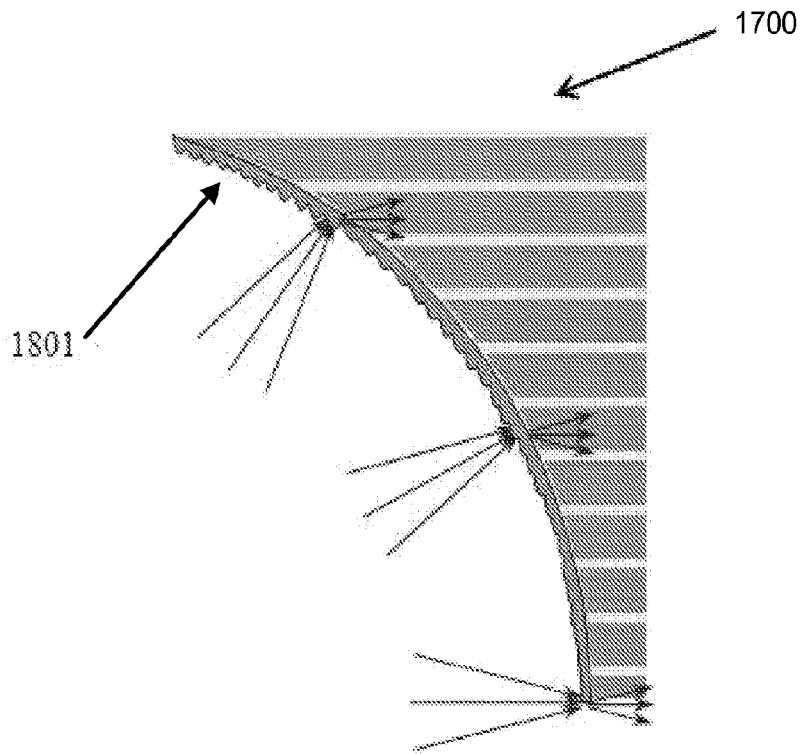
FIG. 18 shows a diagram of a magnified view of the exemplary straight fiber bundle in the diagram of FIG. 17, e.g., showing the variation in spatial features of an exemplary structure for input light angle deflection.

FIG. 18 shows a diagram of a magnified view of the exemplary straight fiber bundle 1700 from the diagram of FIG. 17, e.g., showing the variation in spatial features of exemplary structures 1801 for input light angle deflection. In some examples, the structures 1801 can include titled microprism facets conformed like Fresnel lenses.

Figure 19:
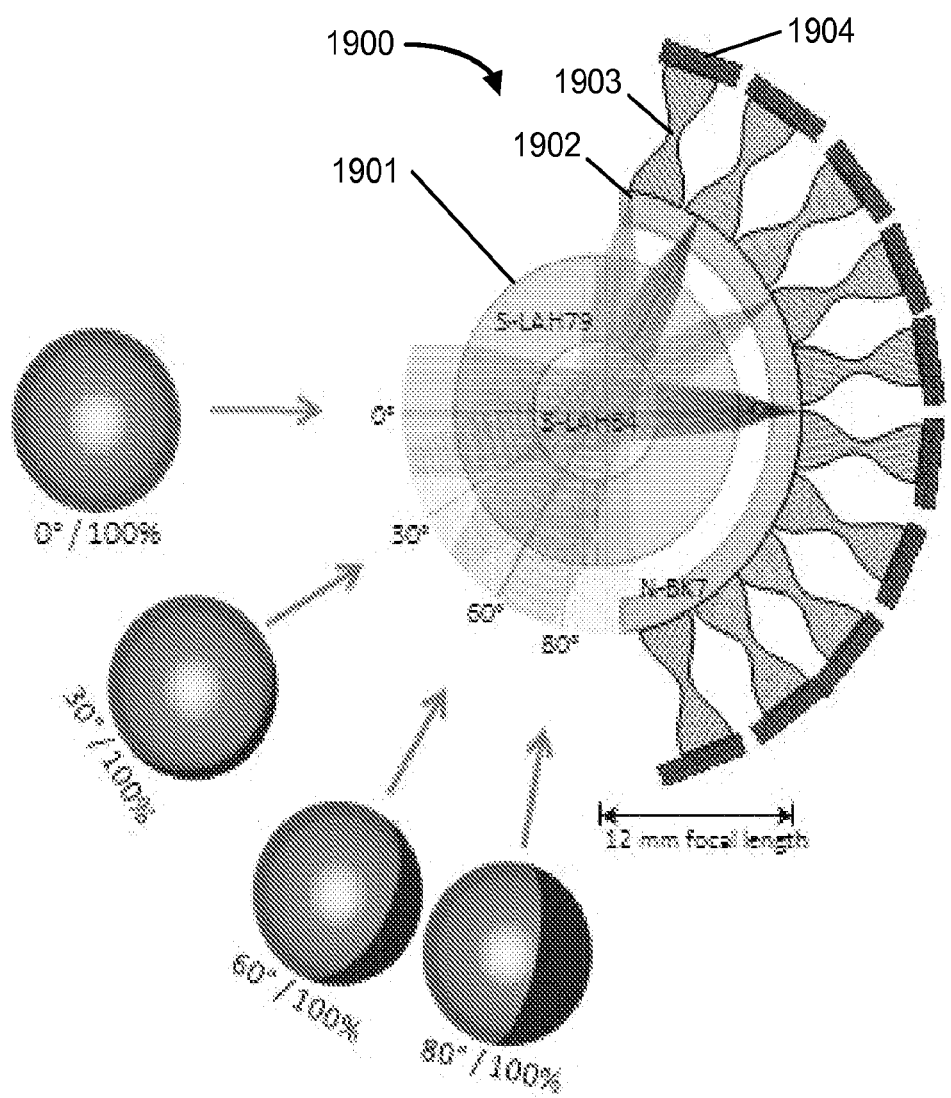
FIG. 19 shows a diagram of an exemplary imaging system including an extremely wide field monocentric lens operating in a "virtual" iris mode and including substantially uniform transmission as a function of illumination angle.

FIG. 19 shows a diagram of an exemplary monocentric imaging system 1900 including a wide-field monocentric lens operating in a "virtual" iris mode and including substantially uniform transmission as a function of illumination angle. The monocentric imaging system 1900 includes a "virtual" aperture stop provided by the exemplary hourglass tapered optical waveguides. For example, the monocentric imaging system 1900 is free from the image illumination reduction toward the edges of field of view.

The monocentric optical imaging system 1900 can include a monocentric optical imaging module 1901 including one or more optical elements having concentric surfaces to collect light and form an image on a curved image surface 1902. The monocentric optical imaging system 1900 can include one or more optical waveguide bundles 1903 each comprising a plurality of optical waveguides that are optically coupled to the monocentric optical imaging module at different locations to receive different portions of the collected light at the curved image surface, respectively, in which each optical waveguide is configured to have a tapered waveguide core of a cross section that varies along the optical waveguide to select desired collected light rays to pass through the optical waveguide while rejecting undesired collected light rays from being transmitted to an output facet of the optical waveguide. For example, each optical waveguide includes a waveguide section having a cross section in the tapered waveguide core to first decrease along a direction directed from the curved image surface to a corresponding imaging sensor and then to increase along the direction directed from the curved image surface to the corresponding imaging sensor. The monocentric optical imaging system 1900 can include one or more imaging sensors 1904 configured on a planar surface and configured to receive output light from the one or more optical waveguide bundles and to detect the received output light, the one or more imaging sensors configured to produce a representation of the image on the curved image surface of the monocentric optical imaging module.

III. Focus of Monocentric Lenses

In another aspect, a method for optical imaging using a monocentric optical imaging module includes operating a monocentric optical imaging module including one or more optical elements having concentric surfaces to collect light from a scene at a first object plane to be imaged and to form an image of the first object plane on a curved image surface which is part of a spherical surface that is concentric with the one or more optical elements having concentric surfaces, and, without adjusting a position or curvature of the curved image surface, adjusting an axial translation position of the monocentric optical imaging module to change focusing of an object on the first object plane onto the curved imaging surface to focusing of an object on a second object plane onto the curved imaging surface, in which the second object plane is parallel to the first object plane but is at a different axial location from the first object plane.

Implementations of the method for optical imaging using a monocentric optical imaging module can optionally include one or more of the following exemplary features. For example, in some implementations, the method can further include using an array of optical waveguide bundles each comprising a plurality of optical waveguides to optically couple to the monocentric optical imaging module at different locations to receive different portions of the collected light at the curved image surface, respectively, using an array of imaging sensors respectively coupled to the array of the optical waveguide bundles to detect output light from the optical waveguides in each optical waveguide bundle to form a partial image of a full image in the collected light by the monocentric optical imaging module in each imaging sensor, and combining partial images of the imaging sensors to collectively form a representation of the full image on the curved image surface. For example, in some implementations, the method can further include digitally reducing image blurring caused by optical crosstalk of the guided light between adjacent optical waveguides. For example, in some implementations, the method can further include using tapered optical waveguides coupled between the curved image surface and one or more imaging sensors to direct an image formed on the curved imaging surface to the one or more imaging sensors so as to select desired light on the curved imaging surface to reach the one or more imaging sensors while preventing undesired light on the curved imaging surface from reaching the one or more imaging sensors. For example, in some implementations, the method can further include using optical waveguides coupled between the curved image surface and one or more imaging sensors to direct an image formed on the curved image surface to the one or more imaging sensors, and using a textured surface structure over facets of the optical waveguides for receiving light from the curved imaging surface to enhance optical coupling from the curved imaging surface into the optical waveguides.

In another aspect, an optical imaging system includes a monocentric optical imaging module including one or more optical elements having concentric surfaces and a curved imaging surface, the monocentric optical imaging module configured to collect light to form an image on the curved imaging surface, one or more imaging sensors each including an array of optical detectors located away from the curved imaging surface to receive light from the imaging surface and to convert the received light into detector signals, and an actuator coupled to the one or more optical elements having concentric surfaces and configured to adjust an axial translation position of the one or more optical elements having concentric surfaces relative to the curved imaging surface, along an optical axis from the one or more optical elements having concentric surfaces to the curved imaging surface, to change focusing of an object in a first object plane onto the same curved imaging surface to focusing of an object in a second, separate object plane onto the curved imaging surface, in which the first and second object planes are at different axial locations from each other.

Implementations of the optical imaging system can optionally include one or more of the following exemplary features. For example, the actuator can include a voice coil actuator. In some implementations, for example, the optical imaging system also can include a flexure support coupled to the one or more optical elements having concentric surfaces. In some implementations, for example, the optical imaging system also can include optical waveguides coupled between the curved imaging surface of the monocentric optical imaging module and the one or more imaging sensors to receive light from the curved imaging surface and configured to deliver the received light to the one or more imaging sensors. For example, each of the optical waveguides can be configured to selectively deliver a desired portion of the received light to the one or more imaging sensors while suppressing undesired stray light from reaching the one or more imaging sensors so that each optical waveguide effectuates an optical aperture stop with a limited angle range for receiving light by the one or more imaging sensors. For example, each of the optical waveguides can be tapered in cross section. In some implementations, for example, the optical imaging system also can include a textured surface structure over input facets of the optical waveguides to enhance optical coupling from the imaging surface into the optical waveguides. For example, the textured surface structure can be optically reflective. For example, the textured surface structure can be optically refractive. For example, the textured surface structure can be optically diffractive.

FIG. 20B shows a schematic diagram of an exemplary monocentric micro-scale imager device 2000 capable of focusing using an axial translation motion. For example, the exemplary monocentric imager device 2000 can be configured with an ultra-compact form factor. The imager device 2000 includes a monocentric optical imaging module 2001 including an interior optical elements 2001a and an outer lens element 2001b having concentric surfaces and a curved imaging surface 2002. The monocentric optical imaging module 2001 is configured to collect light to form an image on the curved imaging surface 2002. The imager device 2000 can include imaging sensors 2005, e.g., each including an array of optical detectors located away from the curved imaging surface to receive light from the imaging surface and to convert the received light into detector signals. The imager device 2000 can include optical waveguides 2004 optically coupled to and between the curved imaging surface 2002 of the monocentric optical imaging module 2001 and the imaging sensors 2005 to receive light from the curved imaging surface 2002 and deliver the received light to the imaging sensors 2005. The imager device 2000 can include a voice coil actuator 2006 coupled to the optical elements 2001a and 2001b to adjust an axial translation position of the optical elements of the monocentric optical imaging module 2001 relative to the curved imaging surface 2002 to change focusing of an object in a first object plane onto the curved imaging surface to focusing of an object in a second, separate object plane onto the curved imaging surface, in which the first and second object planes are at different axial locations from each other. The imager device 2000 can include a flexure support arm 2007 coupled to the monocentric optical imaging module 2001. The imager device 2000 can include an armature / light block 2008 mechanically coupled to the actuator 2006 to translate the monocentric optical imaging module 2001 relative to the curved imaging surface 2002.

For example, photographic lenses are normally focused by moving them closer or further from the image plane, but this appears impractical for the deep spherical image surface in a wide-field monocentric lens. For an exemplary 70 mm focal length objective, e.g., such as the objective of the monocentric primary lens 101a of FIG. 1A, a 1 mm axial translation to focus on an object at 5 m range brings the image surface only 0.5 mm closer to the objective for an object at a 60° field angle, and 0.17 mm closer for an object at an 80° field. This seems to imply that the lens can only focus in one direction at time, and needs 3 dimensional translations to do so. In the monocentric multi-scale imager, the primary lens position is fixed, and the secondary imagers are used for independent focus on each region of the scene. However, introducing optomechanical focus mechanism for each secondary imager constrains the lens design, and adds significantly to the overall system bulk and cost. More fundamentally, the exemplary monocentric-waveguide imager 102 shown in FIG. 1B has no secondary imagers, and cannot be focused in this way, which initially appears a major disadvantage. In fact, however, axial translation of monocentric lenses maintains focus on a planar object across the full field of view.

Figure 20A:
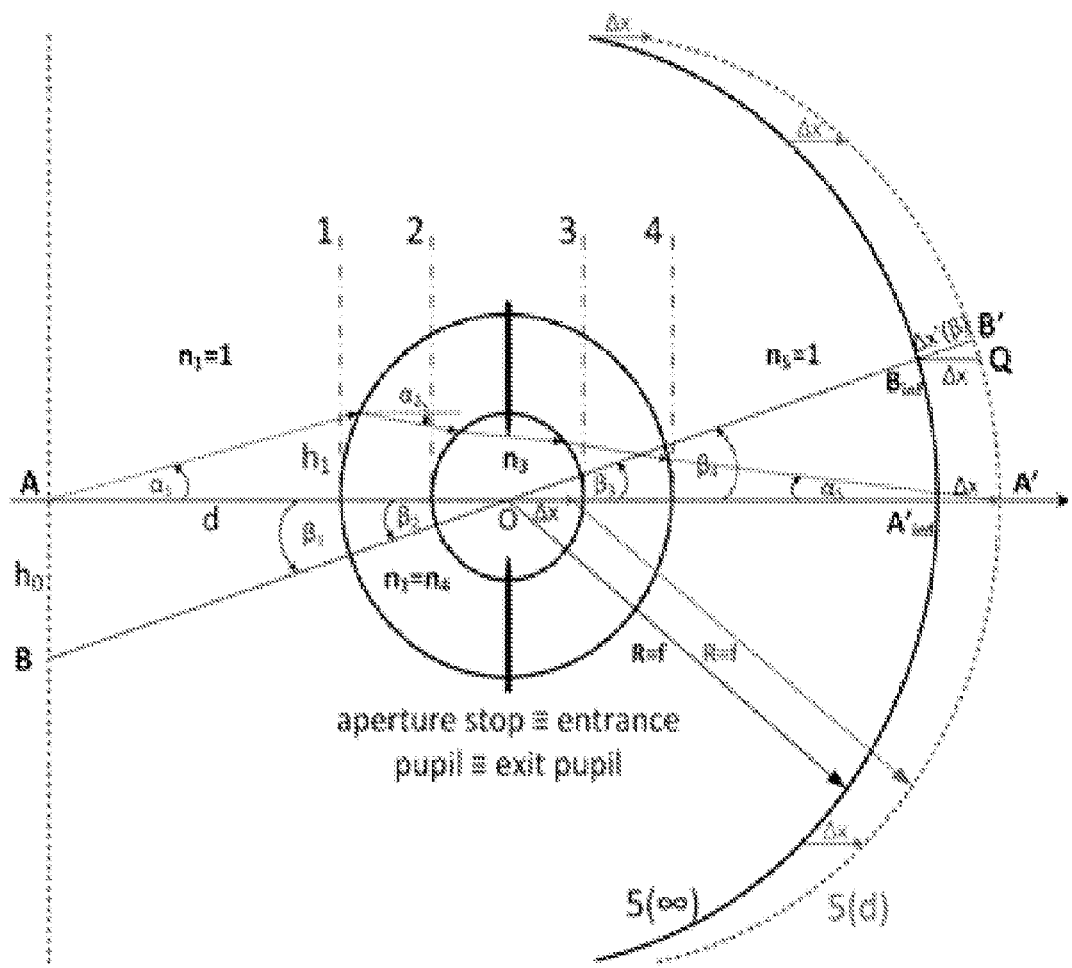
FIG. 20A shows a diagram depicting first and third order considerations of monocentric lens refocus.

Consider the geometry of an image formation in the monocentric lens structure shown in FIG. 20A. For a focal length f with refocusing from object at infinity to the closer on-axis object at distance d, assuming d>>f, the image surface shift Δx is:

$$\Delta x = \frac{f^2}{d-f} \approx \frac{f^2}{d} \quad (1)$$

For the off-axis field point B, having a field angle and the angle of principal ray $\beta_1$, the distance OB to the object is $d/\cos(\beta_1)$ and the refocusing image point shift $\Delta x'$ ($B_{inf}B'$) will be $$\Delta x'(\beta_1) = f^2 \frac{\cos(\beta_1)}{d} = \Delta x \cos(\beta_1) \Rightarrow \overline{B_{inf}Q} = \frac{\Delta x'(\beta_1)}{\cos(\beta_1)} = \Delta x = \overline{A'_{inf}A'} \quad (2)$$

which means that for refocusing, the spherical image surface $5(\infty)$ is axially translated on segment $\Delta x$ to the position $5(d)$. As will be shown later, for the exemplary 12 mm focus monocentric lens this approximation works well for up to the closest distance of 500 mm, and reasonably well for objects at a 100 mm range. So for a planar object at any distance above some moderate minimum, the geometry of refocusing the monocentric lens is in accordance with first order paraxial optics.

The most general analytic tool for lens aberration analysis and correction is classical $3^{rd}$ order Seidel theory. In Seidel theory astigmatism and image curvature are bound with the coefficients C and D. Referring to the variables defined in FIG. 21, the coefficients C and D are shown in Eq. (3) and (4) can be expressed as:

$$C = \frac{1}{2}\sum_{s=1}^{m} h_s \left(\frac{\beta_{s+1} - \beta_s}{\frac{1}{n_{s+1}} - \frac{1}{n_s}}\right)^2 \left(\frac{\alpha_{s+1}}{n_{s+1}} - \frac{\alpha_s}{n_s}\right) \quad (3)$$

$$D = \frac{1}{2}\sum_{s=1}^{m} \frac{\left(\frac{1}{n_s} - \frac{1}{n_{s+1}}\right)}{r_s} + C \quad (4)$$

where $r_i$ is radius of $i^{th}$ surface and $n_i$ is the preceding index of refraction. From the diagram of FIG. 20A, it is clear that chief ray angles to optical axis at each surface are identical ($\beta_1=\beta_2=\beta_3=\beta_4$) for any axial position of the monocentric optics relative to image surface. Therefore, coefficient C remains zero while focusing to planar object surfaces by means of axial movement of the monocentric objective lens. C and D can be expressed as:

$$C = \frac{1}{4n_{im}}\left(\frac{1}{R_t} - \frac{1}{R_s}\right) \text{ and } D = \frac{1}{2n_{im}}\frac{1}{R_s} \quad (5)$$

where $R_t$ is the tangential image surface radius, $R_s$ is the sagittal image surface radius, and $n_{im}$ is the image space refraction index. So if C is defined as zero during refocusing then $R_t$ will be equal to $R_s$ and the image surface will stay spherical and maintain the image radius $R_{im}=R_t=R_s$. Also, from Eq. (4) it is clear that the coefficient D will remain constant. Because D remains constant equations (5) also show that $R_s$ and hence radius $R_{im}$ will stay unchanged as well. Third order aberration theory couples the image curvature with astigmatism, while coma and spherical aberrations need to be corrected at this surface. In other words, third order Seidel aberration theory also indicates that simple axial refocusing of monocentric lens structures preserves the image surface radius, maintaining focus for a planar object onto a spherical image surface over a wide range of object distances. In a purely monocentric geometry there is zero coma, and no additional coma will be introduced by translation. Suppose that spherical aberration is corrected at infinity. Third order spherical aberration does not have the term, which depends on the object distance. For example, only a minor change in spherical aberration during refocusing is expected, e.g., due to the small changes in terms $(\alpha_{i+1}-\alpha_i)^2$, which constitutes the Seidel spherical aberration coefficient. This is confirmed by the ZEMAX simulations shown in Section IV for an optimal f=12 mm lens solution.

IV. Systematic Design of the Two Glass Monocentric Lens

In another aspect, an optical imaging system includes a monocentric optical imaging module having concentric optical surfaces that collect light in a photographic visible spectrum to form an image on a curved imaging surface that is concentric with the concentric optical surfaces of the monocentric optical imaging module, in which the monocentric optical imaging module includes an inner glass ball lens of a sphere having a low index and an outer glass lens element of a high index glass, one or more imaging sensors each including an array of optical detectors located away from the imaging surface to receive light representing the image initially formed on the curved imaging surface and to convert the received light into detector signals, and optical waveguides coupled between the imaging surface and the one or more imaging sensors to receive light from the curved imaging surface and deliver the received light to the one or more imaging sensors.

Implementations of the optical imaging system can optionally include one or more of the following exemplary features. For example, the outer glass lens element of the high index glass can include a glass material of S-LAH79, N-LASF46A, TAFD40, K-GIR79, S-LAH79, K-PSFN2, K-PSFN203, or P-SF68, and the inner glass ball lens of the low index can include a glass material of K-LASFN9, TAF5, S-LAH59, M-TAF1, MC-TAF1, TAF5, S-LAH59, K-LAFK50, M-TAFD305, LAF2, S-LAM2, M-TAF1, K-LaFK50T, S-LAL59, K-LaKn12, TAC4, TAF4, N-LAF21, TAF1, S-LAH64, K-VC80, S-LAL13, M-LAC130, P-LAK35, LAC13, N-LASF45, N-LASF45HT, S-LAM66, BAFD8, or S-BAH28. For example, the outer glass lens element of the high index glass and the inner glass ball lens of the low index can be configured to minimize a third order spherical aberration while minimizing monochromatic and chromatic aberrations.

In another aspect, a method for designing a monocentric optical imaging module having concentric optical surfaces that collect light to form an image on a curved imaging surface that is concentric with the concentric optical surfaces of the monocentric optical imaging module, in which the monocentric optical imaging module includes an inner glass ball lens of a sphere having a low index and an outer glass lens element of a high index glass, in which the method includes: determining surface radii of the inner glass ball and outer glass lens element to minimize 3rd order Seidel spherical and axial chromatic aberrations for combinations of glass materials for the inner glass ball and outer glass lens element; optimizing lens prescriptions of the inner glass ball and outer glass lens element via ray tracing of multiple ray heights for a central wavelength within the photographic visible spectrum to generate lens design candidates based on the combinations of glass materials for the inner glass ball and outer glass lens element; computing a polychromatic mean RMS wavefront deformation to generate a ranked list of lens design candidates for the combinations of glass materials for the inner glass ball and outer glass lens element; and confirming the ranked order by comparing polychromatic diffraction modulation transfer function (MTF) curves of the lens design candidates.

Despite the structural constraints, even a simple two-glass monocentric objective lens can provide high angular resolution over the spherical image surface. With waveguide image transfer, an overall system resolution is directly limited by objective lens resolution. In multi-scale imagers, geometric aberrations in the objective can be corrected by configuring objective-specific relay optics. However, compensating for large aberrations in the primary lens tends to increase the complexity and the precision of fabrication of the relay optics. For example, since each multi-scale imager requires many sets of relay optics (e.g., such as 221 sets in the 120° field 2.4 Gigapixel imager design), minimizing relay optic complexity and fabrication tolerance can significantly reduce system cost. So for both structures, it is useful to optimize the objective lens resolution.

As previously shown in FIG. 1B, the exemplary Gigapixel monocentric multi-scale imager 102 integrates a mosaic of sub-images via fiber bundle waveguides 106. In some embodiments, for example, the fiber bundles 106 can be configured as curved and/or tapered waveguide fiber bundles 1001 according to the optical layout diagram shown in FIG. 10.

Optical systems are now typically designed by computer numeric optimization in software, e.g., which can include using commercial software like Zemax and CodeV. The highly constrained monocentric lenses seem well suited to a global optimization search to identify the best glass combination and radii. However, for example, "blind" optimization of monocentric lenses, even a simple two-glass lens, often overlooks the best solutions. This can be especially true for large NA designs, where the ray angles are steep and the optimization space has multiple deep local minima There are also a large number of glasses to consider. For example, a currently available glass catalog was recently increased by a number of new glasses including 559 glasses. The more advanced optimization algorithms take significant processing time. Even for a two glass lens it is impractical to use them to search all 312k potential combinations, so the best design may be overlooked. Fortunately, the symmetry of monocentric lenses permits a relatively straightforward mathematical analysis of geometrical optic aberrations, as well as providing some degree of intuitive understanding of this overall design space. Combining previous analysis techniques with computer sorting of glass candidates can enable a global optimization for any specific focal length and spectral bandwidth desired.

In this section, a detailed analysis is provided for the design of two-glass monocentric lenses. The detailed analysis begins with the first order paraxial and Seidel third order analysis of the focus of wide-field monocentric imagers, showing that despite the highly curved focal surface, axial translation of monocentric lenses can maintain focus of a planar object field from infinite to close conjugates. Later, the systematic optimization of these lenses is demonstrated by the following these exemplary process.

The exemplary process includes, for a specified focal length, numerical aperture, and wavelength range:
(1) compute and minimize 3rd order Seidel spherical and axial chromatism aberrations to find approximate surface radii for valid glass combination;

(2) optimize lens prescriptions via exact ray tracing of multiple ray heights for the central wavelength;
(3) calculate the polychromatic mean RMS wavefront deformation, and generate ranked list of all lens candidates;
(4) confirm ranking order by comparing polychromatic diffraction modulation transfer function (MTF) curves.

To verify this exemplary method, the objective from the exemplary 2.4 Gigapixel multi-scale imager was redesigned, in which the global optimization process yields the original exemplary design (and fabricated) lens, as well as additional candidates with improved internal image surface resolution. An exemplary design methodology was applied to a new system, e.g., an ultra-compact fiber-coupled imager with a 12 mm focal length and uniform resolution and light collection over more than 120° field of view. This exemplary design compares favorably to a more conventional imager using a "fisheye" wide field lens in exemplary implementations performed and described herein.

Imaging optics are conventionally designed in two steps. First, monochromatic design at the center wavelength achieves a sufficient level of aberrations correction. The second step is to correct chromatic aberration, usually by splitting some key components to achieve achromatic power: a single glass material is replaced with two glasses of the same refraction index at the center wavelength, but different dispersions. However, this process cannot easily be applied to the exemplary symmetric two glass monocentric lens shown in FIG. 21. For a given glass pair and focal length, lens has only four prescription parameters to be optimized (two glasses and two radii), and the radii are constrained with the monocentric symmetry and desired focal length. In place of this lens design procedure, a systematic search process is defined beginning with a specified focal length, F/number, and wavelength range.

Optimization of each glass combination was done in three steps. The first step is to determine the solution (if it exists) to minimize third order Seidel geometrical and chromatic aberrations. A monocentric lens operating in the "fiber" stop mode has only two primary third order aberrations—spherical aberration (Seidel wave coefficient $W_{040}$) and chromatism of position $W_{020}$, which is defocus between blue and red paraxial foci. The sum of the absolute values of the third order coefficients provide a good approach for a first-pass merit (cost) function, and an analytical solution for third order coefficients allows this cost function to be quickly calculated.

Figure 21:
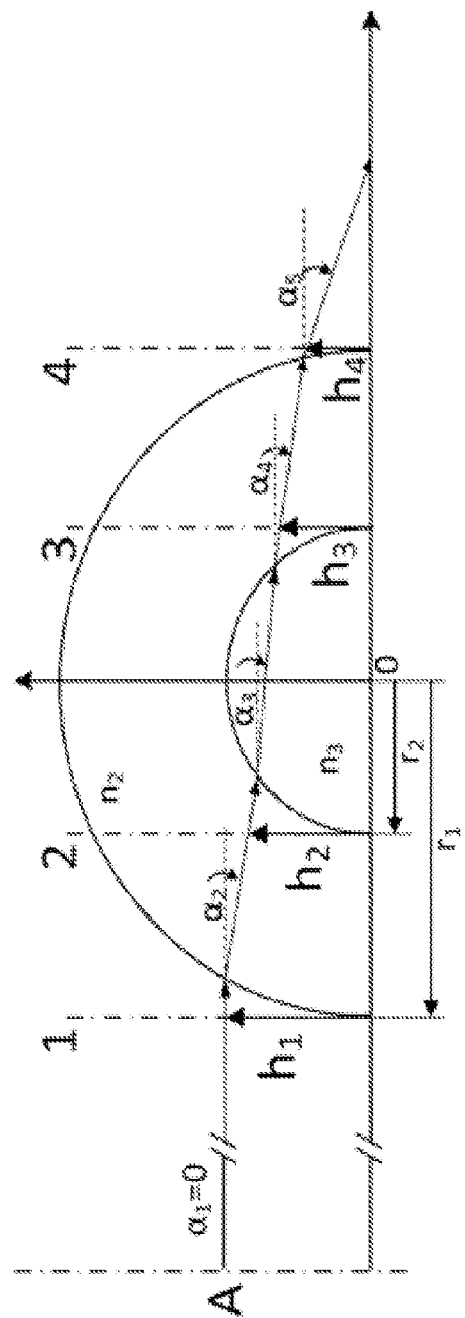
FIG. 21 shows a diagram depicting third order aberration theory applied to monocentric lens design.

FIG. 21 shows a diagram depicting third order aberration theory applied to monocentric lens design. The exemplary monocentric lens shown in FIG. 21 is defined with 6 variables, the two radii $r_1$ and $r_2$, and the index and Abbe number for each of two glasses: the outer glass $n_2$ and $v_2$, and the inner glass $n_3$ and $v_3$. Ray-tracing of any collimated ray can use the Abbe invariant:

$$r_i = h_i \frac{n_{i+1} - n_i}{n_{i+1}\alpha_{i+1} - n_i\alpha_i} \tag{6}$$

or $$\alpha_{i+1} = \frac{n_i}{n_{i+1}}\alpha_i + h_i \frac{n_{i+1} - n_i}{n_{i+1}r_i} \tag{7}$$

where $\alpha_i$ are the angles between marginal rays and the optical axis. The ray-tracing proceeds surface by surface and at each step for the input ray angle $\alpha_i$ and ray height $h_i$ the output angle $\alpha_{i+1}$ can be calculated by Eq. (7). The ray height at the next surface is $$h_{i+1} = h_i - \alpha_{i+1}d_i \tag{8}$$

where $d_i$ is the thickness between surfaces i+1 and i. For the monocentric lens $d_1 = r_1 - r_2$, $d_2 = 2r_2$ and $d_3 = r_1 - r_2$. The ray trace of the marginal input ray having $\alpha_1 = 0$ gives $$\frac{1}{f} = \frac{2}{r_1}\left(1 - \frac{1}{n_2}\right) + \frac{2}{r_2}\left(\frac{1}{n_2} - \frac{1}{n_3}\right) \tag{9}$$

For a given glass combination and focal length f Eq. (9) constrains the radius $r_2$ to the radius $r_1$ for all subsequent calculations.

The Seidel spherical aberration coefficient B can be expressed as:

$$B = \frac{1}{2}\sum_{s=1}^{4} h_s \left(\frac{\alpha_{s+1} - \alpha_s}{\frac{1}{n_{s+1}} - \frac{1}{n_s}}\right)^2 \left(\frac{\alpha_{s+1}}{n_{s+1}} - \frac{\alpha_s}{n_s}\right) \tag{10}$$

Equivalently, the spherical wave aberration $W_{040}$ for the marginal ray is:

$$W_{040} = \frac{1}{4}B\rho^4 \stackrel{\rho=1}{=} \frac{1}{8}\sum_{s=1}^{4} h_s \left(\frac{\alpha_{s+1} - \alpha_s}{\frac{1}{n_{s+1}} - \frac{1}{n_s}}\right)^2 \left(\frac{\alpha_{s+1}}{n_{s+1}} - \frac{\alpha_s}{n_s}\right) \tag{11}$$

where a clockwise positive angle convention is used.

The starting position for ray-tracing is $h_1 = f \times NA$ and $\alpha_1 = 0$. Consequently, applying the Abbe invariant for each surface can allow substituting ray angles and heights with the system constructional parameters. Thus, from Abbe invariant for $1^{st}$ surface, one gets:

$$r_1 = h_1 \frac{n_2 - 1}{n_2\alpha_2} \text{ or } \alpha_2 = h_1 \frac{n_2 - 1}{n_2 r_1} \tag{12}$$

So $\alpha_2$ can be determined from the input ray height and prescription parameters of the first surface. The value of $h_2$ is found from angle $\alpha_2$ (see Eq. (8)), and so on. Using this iterative process, and the relation between $r_1$ and $r_2$ from Eq. (9), one gets:

$$W_{040} = h_1^4 \left( \begin{array}{l} -\frac{(n_2^2 - 3n_2n_3 + n_3^2)}{32f^3(n_2 - n_3)^2} - \frac{(n_2 - 1)(n_2^2 - n_3)(n_3 - 1)}{4n_2^2(n_2 - n_3)^2 r_1^3} + \\ \frac{(n_2 - 1)^2(n_2^2 + n_2n_3 + n_3^2)}{8fn_2^2(n_2 - n_3)^2 r_1^2} - \frac{(n_2 - 1)(n_2^2 + n_2n_3 + n_3^2)}{16f^2 n_2(n_2 - n_3)^2 r_1} \end{array} \right) \tag{13}$$

The defocus coefficient $W_{020}$ between images in blue and red light is equal to $-L_0/2$, where $$L_0 = -2W_{020} = \tag{14}$$
$$h_1^2 \left( \frac{(n_3 - 1)(2f(1 - n_2) + n_2 r_1)}{f(n_2 - n_3)r_1 n_3 v_3} - \frac{(n_2 - 1)(2f(1 - n_3) + n_3 r_1)}{f(n_2 - n_3)r_1 n_2 v_2} \right)$$

Eq. (14) is sufficiently accurate for the visible (photographic) spectral range, where the dispersion is approximately linear. Design for extended visible waveband (400-

700 nm) requires calculations in two separate sub-bands with custom defined Abbe numbers to compensate for the increased nonlinearity of the glass dispersion curve. $E(r_1)=|W_{040}|+|W_{020}|$ can be defined as a merit function for 3rd order aberrations, which is continuous-valued and has a single global minimum identifying the approximate (near optimum) radius $r_1$ for each valid two glass combination. Afterwards, radius $r_2$ is calculated from Eq. (9).

The result is an algebraic expression for the 3rd order aberrations of the solution—if any—for a given glass combination. In the examples, this calculation was performed for each of the 198,000 combinations of the 446 glasses, e.g., which were available in the combined Schott, Ohara, Hikari and Hoya glass catalogs, which are incorporated by reference as part of the disclosure of this patent document. This yields a list of qualified candidates (those forming an image on or outside of the outer glass element), ranked by third order aberrations. However, this ranking is insufficiently accurate for a fully optimized lens.

Because of high numerical aperture, monocentric systems tend to have strong $5^{th}$ and $7^{th}$ order aberrations. That makes $3^{rd}$ order analysis only a first approximation towards a good design. Fortunately, the two-glass monocentric lens system has an exact analytical ray trace solution in compact form, and the more accurate values of the lens prescription parameters can be found from a fast exact ray-tracing of several ray heights.

Figure 22:
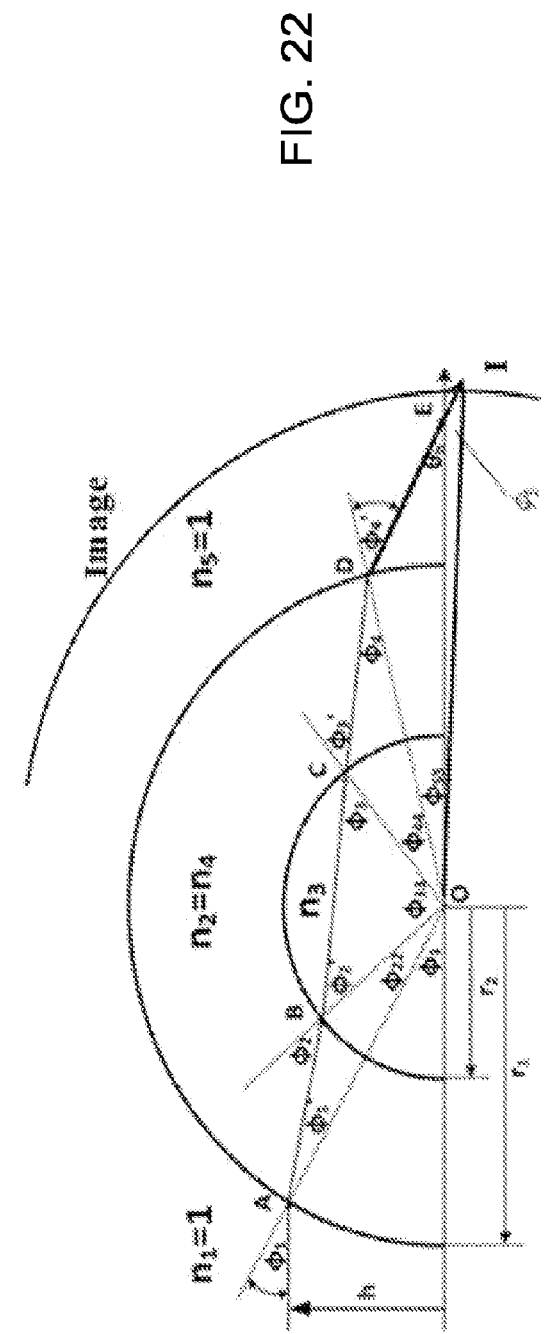
FIG. 22 shows a diagram depicting monocentric lens real ray trace variables.

The variables for ray-tracing of rays with arbitrary input height h is shown in FIG. 22, where $\varphi_i$ are the angles between the ray and the surface normal. One can write $$\sin(\phi_1) = \frac{h}{r_1} \tag{15}$$

From Snell's law, one has:

$$\sin(\phi_1') = \frac{h}{r_1 n_2} \tag{16}$$

Applying the sine law for the triangle ABO yields $$\sin(\phi_2) = \frac{r_1}{r_2}\sin(\phi_1') = \frac{r_1}{r_2}\frac{h}{r_1 n_2} = \frac{h}{r_2 n_2} \tag{17}$$

Again from Snell's law $$\sin(\phi_2') = \frac{n_2}{n_3}\sin(\phi_2) = \frac{n_2}{n_3}\frac{h}{r_2 n_2} = \frac{h}{r_2 n_3} \tag{18}$$

Triangle OBC has equal sides OB and OC. So, $$\sin(\phi_3') = \frac{n_3}{n_2}\sin(\phi_3) = \frac{n_3}{n_2}\frac{h}{r_2 n_3} = \frac{h}{r_2 n_2} \tag{19}$$

From triangle OCD, one can find $$\sin(\phi_4) = \frac{r_2}{r_1}\sin(\phi_3') = \frac{h}{r_1 n_2} \tag{20}$$

Then finally $$\sin(\phi_4') = n_2 \sin(\phi_4) = \frac{h}{r_1} \tag{21}$$

One exemplary result is that for the monocentric lens there is an invariant in the form:

$$\varphi_4' = \varphi_1 \tag{22}$$

Next, the segment OE=S can be found by applying the sine theorem to the triangle OED:

$$S = \frac{r_1 \sin(\phi_4')}{\sin[180° - (180° - \phi_4') - (180° - \phi_1 - \phi_{22} - \phi_{33} - \phi_{44})]} \tag{23}$$

or $$S = \frac{r_1 \sin(\phi_4')}{\sin(-180° + 2\phi_1 + \phi_{22} + \phi_{33} + \phi_{44})} \tag{24}$$

From Eq. (15)

$$\phi_1 = \arcsin\left(\frac{h}{r_1}\right) \tag{25}$$

From the triangles OAB, OBC and OCD, one has $$\phi_{22} = \phi_2 - \phi_1' = \arcsin\left(\frac{h}{r_2 n_2}\right) - \arcsin\left(\frac{h}{r_1 n_2}\right) \tag{26}$$

$$\phi_{33} = 180° - 2\phi_2' = 180° - 2\arcsin\left(\frac{h}{r_2 n_3}\right) \tag{27}$$

$$\phi_{44} = \phi_3' - \phi_4 = \arcsin\left(\frac{h}{r_2 n_2}\right) - \arcsin\left(\frac{h}{r_1 n_2}\right) \tag{28}$$

Finally, $$S = \frac{h}{\sin\left\{2\left[\arcsin\left(\frac{h}{r_1}\right) - \arcsin\left(\frac{h}{r_1 n_2}\right) + \arcsin\left(\frac{h}{r_2 n_2}\right) - \arcsin\left(\frac{h}{r_2 n_3}\right)\right]\right\}} \tag{29}$$

From Eq. (29) the longitudinal aberration for the ray with input height $h_i$ is given by $$\Delta S(h_i) = S(h_i) - f \tag{30}$$

Radius $r_2$ is bound to radius $r_1$ with Eq. (9). With a given focal length and combination of refractive indices, the longitudinal aberration $\Delta S$ is actually a function of a single variable $r_1$. Finally, for the more accurate monochromatic optimization of the radius $r_1$, a more accurate cost function Q is obtained:

$$Q = \sum_{i=1}^{3}\text{Abs}(\Delta S(h_i, \lambda)) + \sum_{j=1}^{3}\sum_{k \neq j}\text{Abs}[\Delta S(h_j, \lambda) - \Delta S(h_k, \lambda)] \tag{31}$$

Where for visible light operation, $\lambda$ is the $n_d$ line located in center of photographic waveband and three input ray heights are: $h_1 = f \times NA$, $h_2 = 0.7 h_1$ and $h_3 = 0.41 h_1$, respectively.

Figure 23:
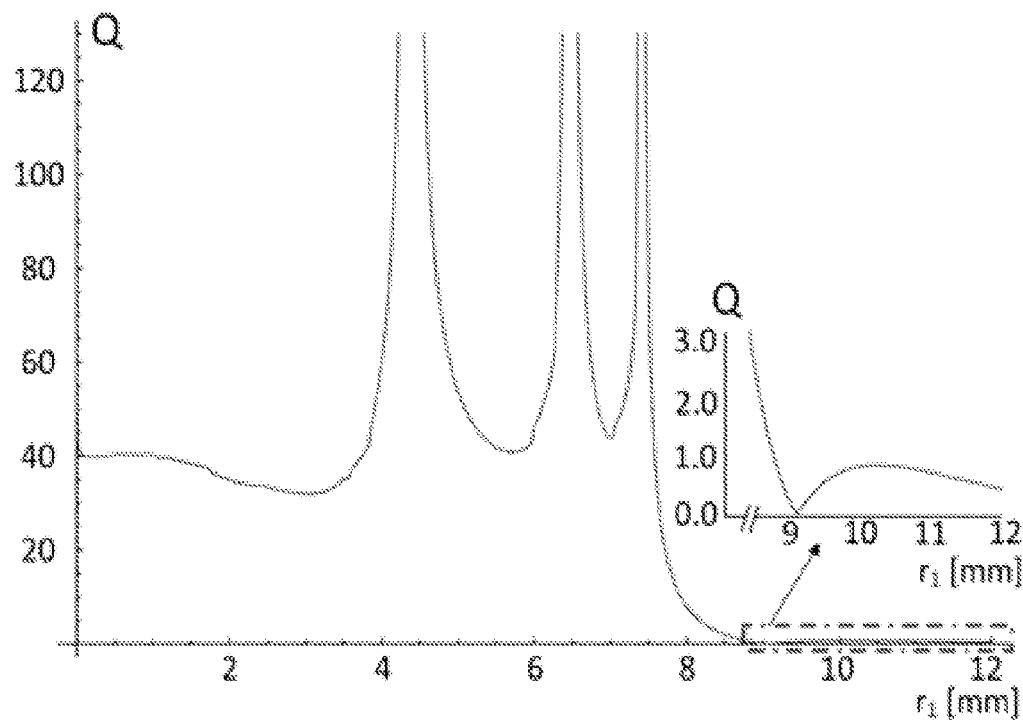
FIG. 23 shows an exemplary plot showing dependence of criterion Q on the radius $r_1$.

With such steep ray angles Q is a strongly varying function, which is why a fast automated optimization can overlook the optimal radius values for a given glass pair. FIG. 23 shows an exemplary plot showing dependence of criterion Q on the radius $r_1$. FIG. 23 shows the dependence of the Q on radius $r_1$ for a representative case, one of the best glass pairs (S-LAH79 and S-LAH59) for the 12 mm focal length lens described in later in this section. The monochromatic image quality criterion Q has several minimums over the possible range for $r_1$ radius. The preliminary solution for $r_1$ radius for this glass pair obtained from the third order aberrations minimization was 8.92 mm, close to the global minimum solution for Q found at 9.05 mm. This shows how the first optimization step provided a good starting point for $r_1$ radius, avoiding the time consuming investigation of low quality solutions in the multi-extremum problem illustrated by FIG. 23.

Figure 24:
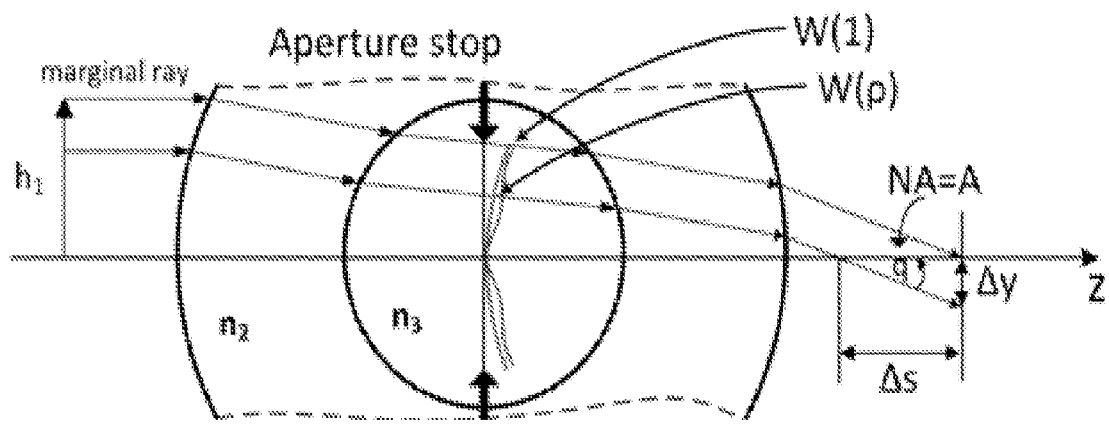
FIG. 24 shows a diagram depicting image formation in an exemplary monocentric lens.

In the third step, the wavefront deformation is calculated and expanded into Zernike polynomials. The polychromatic mean square root wavefront deformation (RMS) is calculated and used as a criterion for creating the ranked list of monocentric lens solutions by means of their quality. In the monocentric lens geometry the aperture stop is located at the center of the lens, where entrance and exit pupils coincide as well. This is shown in FIG. 24, which shows a diagram depicting image formation in an exemplary monocentric lens.

For an arbitrary ray the lateral aberrations $\Delta Y$ are bound to the wavefront deformation as:

$$\Delta Y = -\frac{\partial W}{\partial \rho} \frac{\lambda}{A} \qquad (32)$$

where W is the wavefront deformation expressed in wavelengths; $\rho$ is reduced ray pupil coordinate which varies from zero at the pupil center to unity at the edge; defining A as the back numerical aperture, and $\Delta Y$ as the lateral aberration in mm From FIG. 24 one has $$\Delta S(\rho) = \frac{\Delta Y}{A\rho} = -\frac{\partial W}{\partial \rho} \frac{\lambda}{A^2 \rho} \qquad (33)$$

where $A\rho$ is coordinate of the ray in the image space. Expansion of the wavefront deformation into Zernike polynomials up to $7^{th}$ order is given by:

$$-\Delta S(\rho, \lambda_i)\frac{A^2}{\lambda_i} = 4C_{20} + C_{40}(24\rho^2 - 12) + \\ C_{60}(120\rho^4 - 120\rho^2 + 24) + C_{80}(560\rho^6 - 840\rho^4 + 360\rho^2 - 40) \qquad (34)$$

The values for $\Delta S(\rho, \lambda_i)$ are calculated with fast ray-tracing (Eq. (30)) for nine rays with reduced coordinate heights $\rho_j = 1$, 0.95, 0.9, 0.85, 0.8, 0.75, 0.7, 0.6, 0.5 and for three wavelengths 470 nm, 550 nm and 650 nm. Then coefficients $C_{n0}(\lambda_i)$ are calculated from the least square criterion:

$$\sum_{j=1}^{9} \begin{bmatrix} -\Delta S(\rho, \lambda_i)\frac{A^2}{\lambda_i} - 4C_{20}(\lambda_i) - C_{40}(\lambda_i)(24\rho^2 - 12) - \\ C_{60}(\lambda_i)(120\rho^4 - 120\rho^2 + 24) - \\ C_{80}(\lambda_i)(560\rho^6 - 840\rho^4 + 360\rho^2 - 40) \end{bmatrix}^2 = \min \qquad (35)$$

In order to prevent general defocus of the image surface due because bounded was the radius $r_2$ and focus with third order equation (9), introduced was a small shift dS of the back focal distance which makes the new coefficient $C_{20}^{new}$ ($\lambda_2 = 550$ nm) equal to zero $$dS = 4C_{20}(\lambda_2)\frac{\lambda_2}{A^2} \qquad (36)$$

This means that the system will have a slightly adjusted focus $f^{new} = f + dS$, and the only difference from before will be in coefficients $C_{20}^{new}$:

$$C_{20}^{new}(\lambda_i) = C_{20}(\lambda_i) - dS\frac{A^2}{4\lambda_i} \qquad (37)$$

Finally, the system RMS wavefront deformation is:

$$RMS = \frac{1}{3}\sum_{i=1}^{3}\left\{\frac{[C_{20}^{New}(\lambda_i)]^2}{3} + \frac{[C_{40}(\lambda_i)]^2}{5} + \frac{[C_{60}(\lambda_i)]^2}{7} + \frac{[C_{80}(\lambda_i)]^2}{9}\right\} \qquad (38)$$

In the examples, the top 50 solutions for different glasses combinations were sorted in the ranked list by RMS quality performance, then each was imported into ZEMAX optical design software and quickly optimized for the best modulation transfer function (MTF) performance at the 200 lp/mm. For example, this frequency was chosen because the smallest fiber bundle receiver 24AS, e.g., available from Schott, has 2.5 microns pitch. This close to the optimal design, however, the MTF performance is well behaved, and a similar result is found with a wide range of MTF values.

V. Exemplary Two Glass Monocentric Cases

V.1 AWARE2 Monocentric Lens Analysis

Figures 25A, 25B:
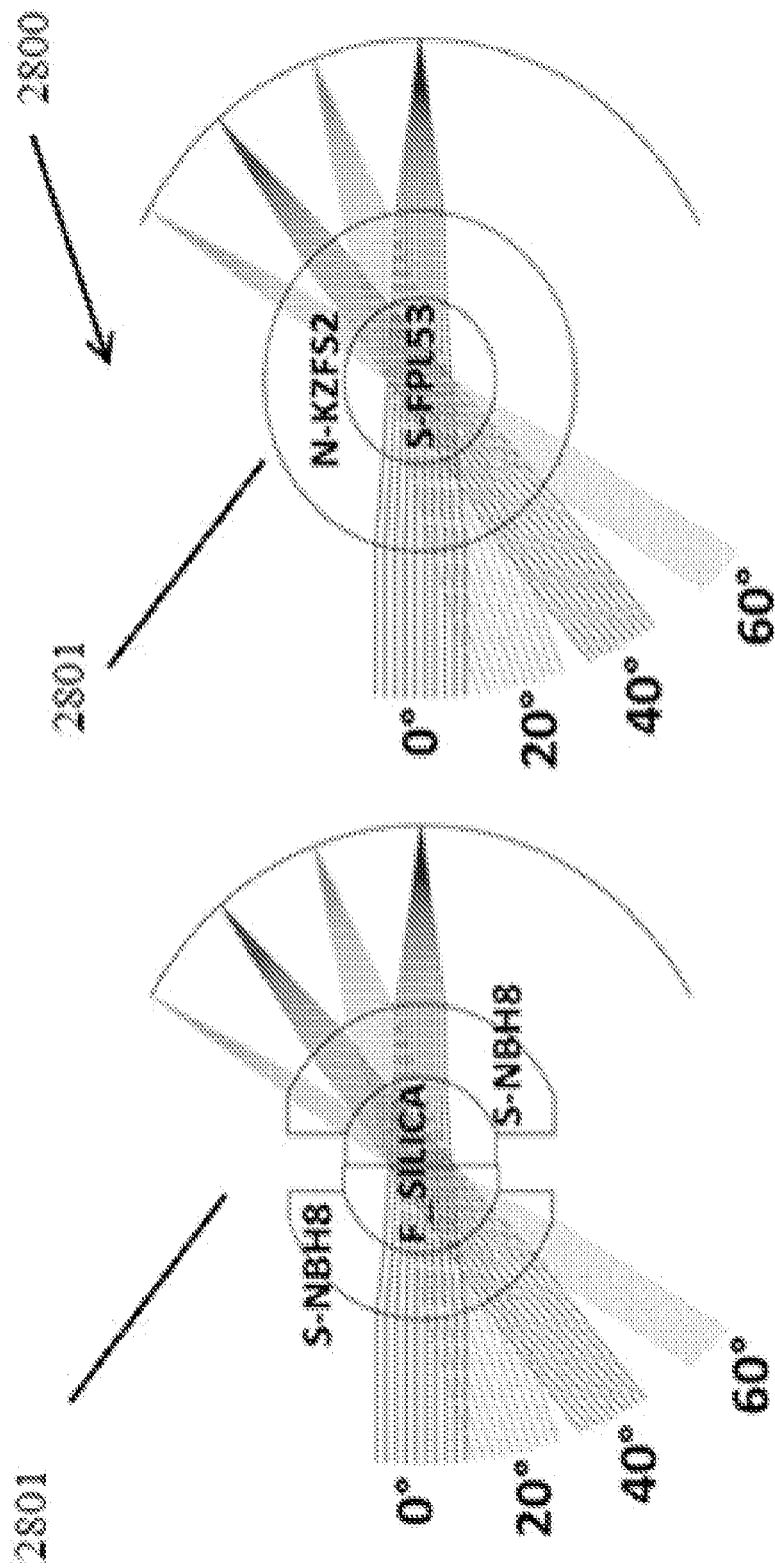
FIGS. 25A and 25B show diagrams of exemplary lens and global optimum solutions.

The goal of this analysis is a monocentric lens optimization process to find the best possible candidates for fabrication. These candidates are then subject to other materials constraints involved in the final selection of a lens design, including mechanical aspects such as differential thermal expansion or environmental robustness, as well as practical aspects like availability and cost. The process described above appears to provide a comprehensive list of candidate designs. However, the best test of a lens design process is to compare the results to one generated by the normal process of software based lens design. To do this, used was the constraints of a monocentric objective, for example, which was designed in the DARPA AWARE program; specifically, for example, the AWARE-2 objective lens, e.g., which was designed by a conventional software optimization process, then fabricated, tested, and integrated into the AWARE2 imager. The lens has a 70 mm focal length and image space F# of 3.5, using a fused silica core and a S-NBH8 glass outer shell. The optical prescription is shown in Table 1, and the layout of the embodiment 2801 in FIG. 25A.

TABLE 1

Optical prescription of the fabricated AWARE2 lens.

| Surface | Type | Radius | Thickness | Glass | Semi-Diameter |
|---|---|---|---|---|---|
| OBJ | Standard | Infinity | Infinity | | |
| 1 | Standard | 31.80000 | 13.61300 | S-NBH8 | 29.69700 |
| 2 | Standard | 18.18700 | 18.18700 | F_SILICA | 17.39400 |
| STO | Standard | Infinity | 18.18700 | F_SILICA | 16.95200 |
| 4 | Standard | −18.18700 | 15.19100 | S-NBH8 | 16.95200 |
| 5 | Standard | −33.37800 | 36.87800 | | 30.13600 |
| IMA | Standard | −70.25600 | | | 60.84437 |

The global optimization method identified this candidate lens system, as well as multiple alternative designs (glass combinations) which provide a similar physical volume and improved MTF. The optical prescription of the top-ranked solution is shown in the Table 2, and the lens layout is shown as embodiment 2802 in FIG. 25B.

TABLE 2

Optical prescription of the top design solution for the AWARE2 lens.

| Surface | Type | Radius | Thickness | Glass | Semi-Diameter |
|---|---|---|---|---|---|
| OBJ | Standard | Infinity | Infinity | | |
| 1 | Standard | 34.91298 | 17.95482 | N-KZFS2 | 34.91298 |
| 2 | Standard | 16.95816 | 16.95816 | S-FPL53 | 16.95816 |
| STO | Standard | Infinity | 16.95816 | S-FPL53 | 7.00075 |
| 4 | Standard | −16.95816 | 17.95482 | N-KZFS2 | 16.95816 |
| 5 | Standard | −34.91298 | 35.30018 | | 34.91298 |
| IMA | Standard | −70.21316 | | | 70.00000 |

The new candidate appears physically very similar to the fabricated lens. However, the MTF 2901 and ray aberrations 2902 for manufactured prototype and the top design solution are compared in FIGS. 26A and 26B. The new candidate lens is significantly closer to diffraction limited resolution, has lower chromatism and polychromatic mean square wavefront deformation than the actually fabricated lens. It is important to recognize that the resolution of the AWARE-2 imager system includes the microcamera relay optics. The relay optics corrected for aberrations in the primary, as well as provided flattening of the relayed image field onto the planar image sensors. In fact, the overall AWARE-2 system optics design was diffraction limited. However, conducting the systematic design process on a relatively long focal length system, where geometrical aberrations are influential on resolution, served as a successful test of the design methodology.

V.2 F#1.71 12 mm Focal Length Lenses

One exemplary goal was to design an imager with at least 120° field of view and resolution and sensitivity comparable to the human eye (1 arc minute), resulting in about 100 Megapixels total resolution. For example, assuming that the exemplary waveguide configuration of the multi-scale monocentric imager 102 of FIG. 1B is used with 2.5 micron pitch NA=1 fiber bundles, an exemplary goal can be set of a 12 mm focal length lens with diffraction limited operation in the photographic spectral band (0.47 to 0.65 μm) and the numerical aperture of 0.29 (F/#1.71). For example, designed was the monocentric lens assuming fiber stop operation mode, which means that the fiber taper shown in the exemplary embodiments 102 and 201 can provide effective light filtering of all rays traveling out of rotated on field angle physical stop. The details on fiber stop operational mode will be given in the following section. As that is the more demanding design: the physical aperture stop and vignetting of the field beams will increase diffraction at wider field angles, but can only reduce geometrical optic aberrations.

Figure 27:
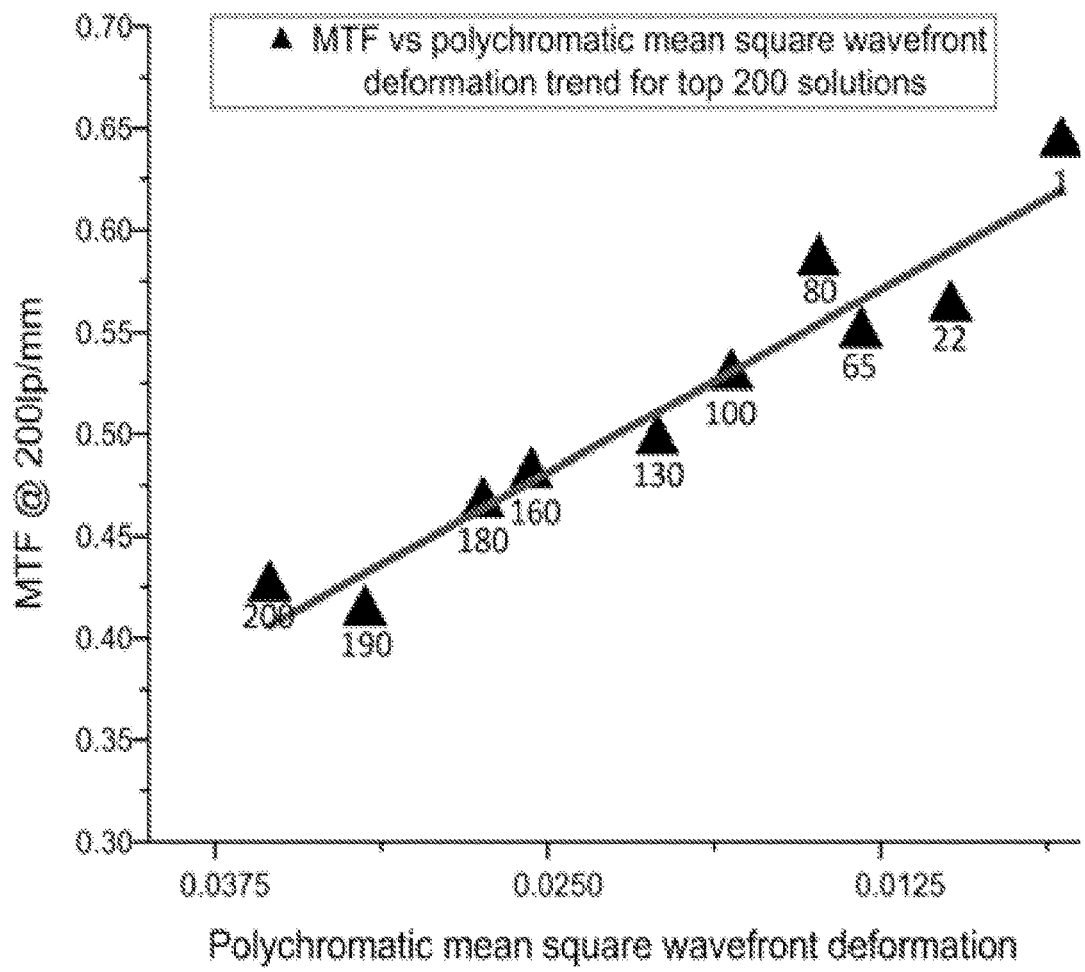
FIG. 27 shows an exemplary data plot depicting the correlation between polychromatic mean square wavefront deformation and MTF @ 200 lp/mm.

The result of the design process was an initial evaluation of 198,000 glass pair systems, of which some 56,000 candidates passed the initial evaluation and were optimized using exact ray tracing to generate the final ranked list. The entire process took only 15 minutes to generate using single-threaded Matlab optimization code running on a 2.2 GHz i7 Intel processor. Part of this list is shown in Table 3. Because different optical glass manufacturers produce similar glasses the solutions have been combined in families, and the table shows the first nine of these families. For example, shown are radii for a primary glass and list several substitutions glasses in parenthesis. Design with the substitutions glasses result in small changes in radii but substantially the same performance. The table shows the computed polychromatic mean square wavefront deformation, the criterion for the analytical global search, and the value for the MTF at 200 lp/mm (Nyquist sampling) found following Zemax optimization of the same candidate glasses. If the design process has worked, one could expect that these metrics would be strongly correlated. FIG. 27 illustrates by showing the correlation for representative samples of the top 200 solutions, and found is the identical sequence for all 200 of the top candidates.

TABLE 3

Top solutions for a F#/1.7 f =12 mm monocentric lens.

| # | Outer Glass | Internal Glass (substitution glasses shown in parentheses) | Fast exact ray-tracing R1 | R2 | $(\Delta\Phi)^2$ | ZEMAX radii (mm) R1 | R2 | MTF at 200 lp/mm |
|---|---|---|---|---|---|---|---|---|
| 1 | S-LAH79 | K-LASFN9 (TAF5, S-LAH59) | 9.049 | 3.765 | 0.0038 | 9.068 | 3.792 | 0.65 |
| 2 | N-LASF46A | M-TAF1(MC-TAF1, TAF5,S-LAH59, K-LAFK50) | 9.057 | 3.614 | 0.0041 | 9.062 | 3.626 | 0.61 |
| 3 | TAFD40 | M-TAFD305 (LAF2, S-LAM2) | 9.533 | 3.729 | 0.0047 | 9.537 | 3.735 | 0.59 |
| 4 | K-GIR79 | M-TAF1 (K-LaFK50T) | 9.392 | 3.404 | 0.0048 | 9.401 | 3.426 | 0.59 |
| 5 | S-LAH79 | S-LAL59 (K-LaKn12, TAC4, TAF4, N-LAF21, TAF1, S-LAH64) | 8.049 | 3.772 | 0.0059 | 8.074 | 3.807 | 0.59 |
| 6 | S-LAH79 | K-VC80 (S-LAL13, M-LAC130, P-LAK35, LAC13) | 7.581 | 3.738 | 0.0070 | 7.593 | 3.756 | 0.55 |
| 7 | K-PSFN2 | N-LASF45 (N-LASF45HT, S-LAM66) | 8.871 | 3.773 | 0.0077 | 8.901 | 3.819 | 0.59 |

TABLE 3-continued

Top solutions for a F#/1.7 f =12 mm monocentric lens.

| # | Outer Glass | Internal Glass (substitution glasses shown in parentheses) | Fast exact ray-tracing R1 | R2 | $(\Delta\Phi)^2$ | ZEMAX radii (mm) R1 | R2 | MTF at 200 lp/mm |
|---|---|---|---|---|---|---|---|---|
| 8 | K-PSFN203 | BAFD8 (S-BAH28) | 7.869 | 3.769 | 0.0083 | 7.886 | 3.791 | 0.54 |
| 9 | P-SF68 | BAFD8 (S-BAH28) | 7.917 | 3.765 | 0.0091 | 7.934 | 3.787 | 0.53 |

Figure 28:
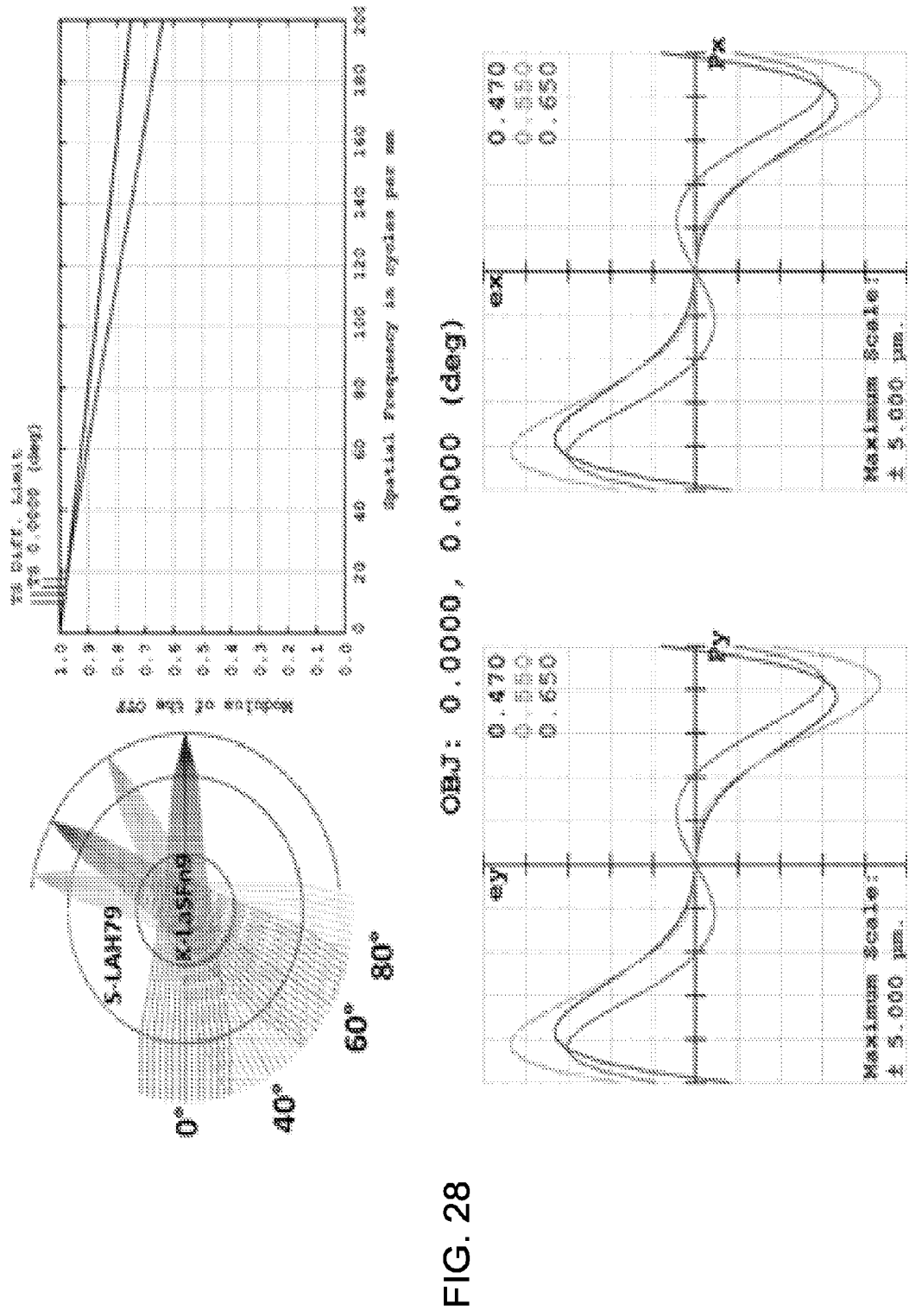
FIG. 28 shows an exemplary diagram and corresponding data plots showing an exemplary highest ranked design solution (e.g., high index center glass).

The best performance monocentric lens solution (family number 1) demonstrates near diffraction limited resolution over the photographic visible operational waveband (e.g., 470-650 nm). It uses S-LAH79 for the outer shell glass and K-LASFN9 for the inner glass. To provide a central aperture stop, it is necessary to fabricate the center lens as two hemispherical elements. Because optical glass K-LASFN9 has a high refractive index of 1.81, the interface between the two hemispherical elements can cause reflections at large incidence angles unless the interface is index matched, and the index of optical cements is limited. For example the Norland UV-cure epoxy NOA164 has an index of 1.64. This results in a critical angle of 65°, and a maximum achievable field of view of ±55°. For this glass system, it is preferable to fabricate the center lens as a single spherical element and operate the system in the "virtual iris" mode, where the system can provide a maximum field of view of ±78.5°. The optical layout, MTF and ray fan diagrams of the top solution operating in "virtual" stop mode are shown in FIG. 28.

Table 4 shows the detailed optical prescription of the monocentric lens example. The lens operation is shown in three configurations. The distance to the object plane is changed from infinity to 1 m and then to 0.5 m. The back focal distance (e.g., thickness 5 in Table 4) is changed as well. The back focal distance for object at infinity is 2.92088 mm, for 1 m object distance 3.06156 mm and for the 0.5 m object distance 3.20050 mm.

TABLE 4

Optical prescription for refocusing of the monocentric lens, showing multiple configurations for three object distances

| Surface | Type | Radius | Thickness | Glass | Semi-Diameter |
|---|---|---|---|---|---|
| OBJ | Standard | Infinity | 1.0E+10/ 1000.000/ 500.000 | | |
| 1 | Standard | 9.06762 | 5.27607 | S-LAH79 | 9.06000 |
| 2 | Standard | 3.79155 | 3.79155 | K-LASFN9 | 3.79000 |
| STO | Standard | Infinity | 3.79155 | K-LASFN9 | 1.94188 |
| 4 | Standard | −3.79155 | 5.27607 | S-LAH79 | 3.79000 |
| 5 | Standard | −9.06762 | 2.92088/ 3.06156/ 3.20318 | | 9.06000 |
| IMA | Standard | −12.2708 | — | | 11.0000 |

Figure 29A:
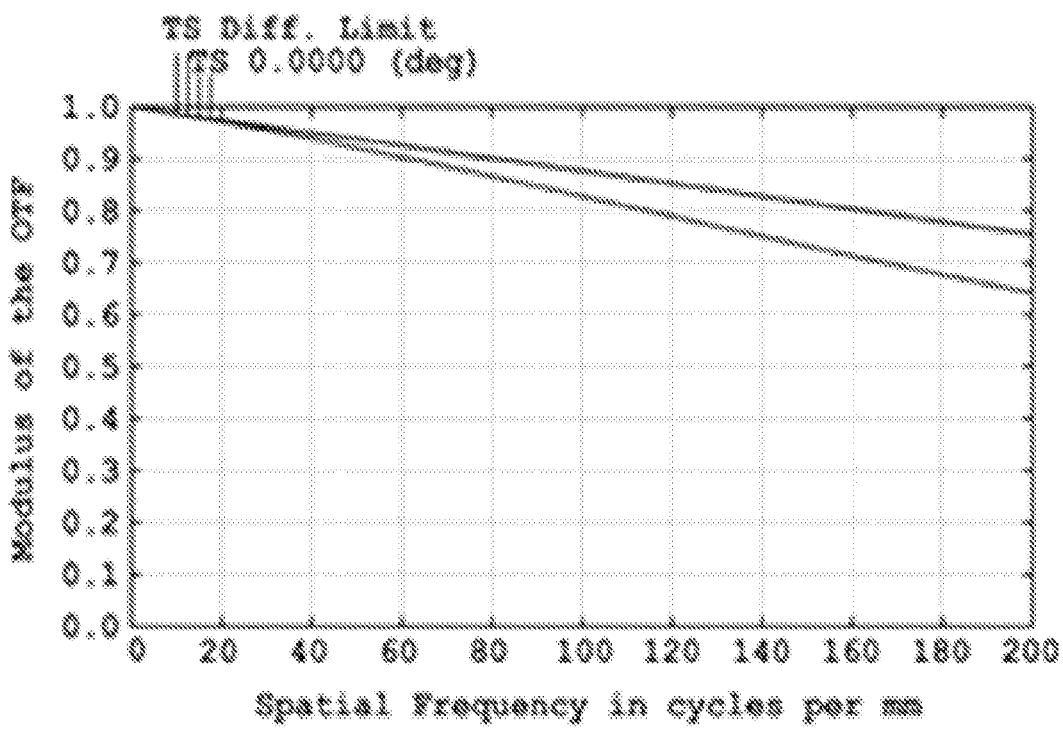
FIGS. 29A and 29B show exemplary data plots depicting the MTF performance of monocentric lens focused at infinity (design) and refocused at flat object at 0.5 m, respectively.
Figure 29B:
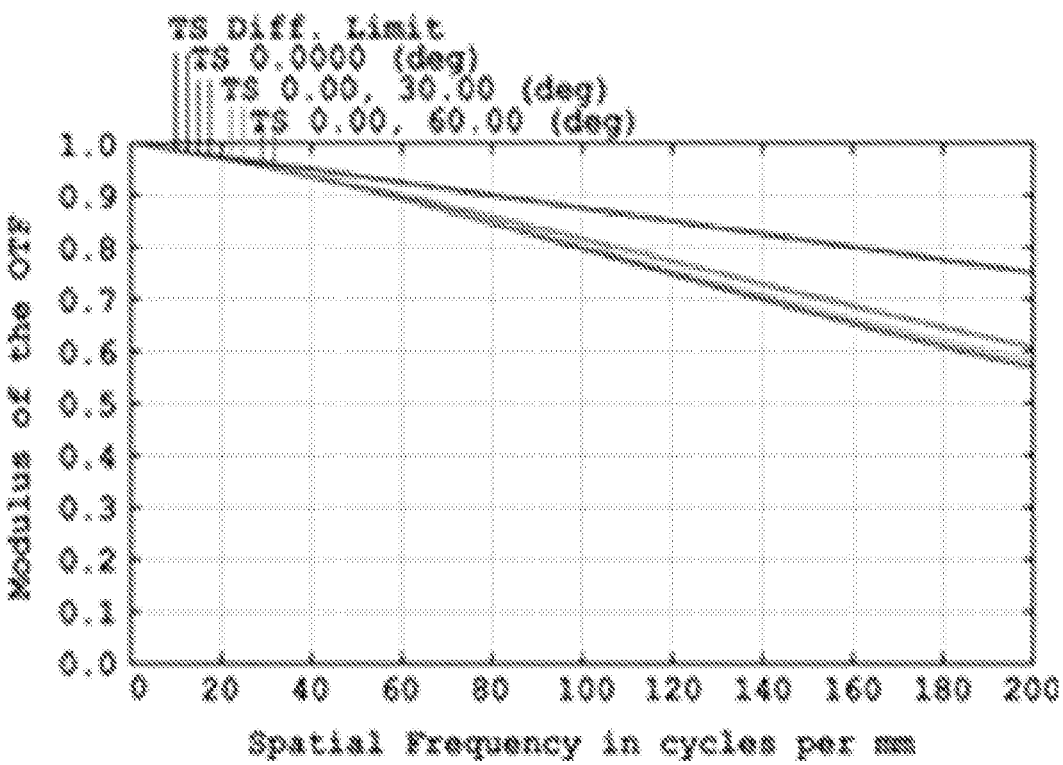

The MTF for two extreme object positions is shown in FIGS. 29A and 29B. After refocusing to closer object distance, the image surface loses concentricity with the lens but still retain the original radius, as was shown in Section III. The loss of concentricity enables conjugation between planar objects at a finite distance to the spherical image surface, and so implies the ability to focus onto points anywhere in the object space. A concentric system designed at a specific finite object radius can be conjugated only with a specific concentric spherical image surface, and focus of a concentric lens system onto spherical objects at different distances would require the change in the image surface radius. At closer object distances, angle $\alpha_1$ (FIG. 23) increases from zero to some small finite value, which changes spherical aberration (Eq. (10)) and MTF slightly away from optimum value. As predicted by third order aberration analysis, image quality can be maintained close to the original infinite conjugate design during refocusing operation, over a wide range of field angles. A ZEMAX design files modeling this lens are available for download at http://psilab.ucsd.edu/VirtualStopFamily1.zip. Note that adequate simulation of the "virtual stop" operational mode in ZEMAX requires the rotation of the aperture stop at off-axis field angles, as well as rotation on this angle image surface around its center of curvature. In this file, a distinct configuration has been defined for each field angle.

Figure 30A:
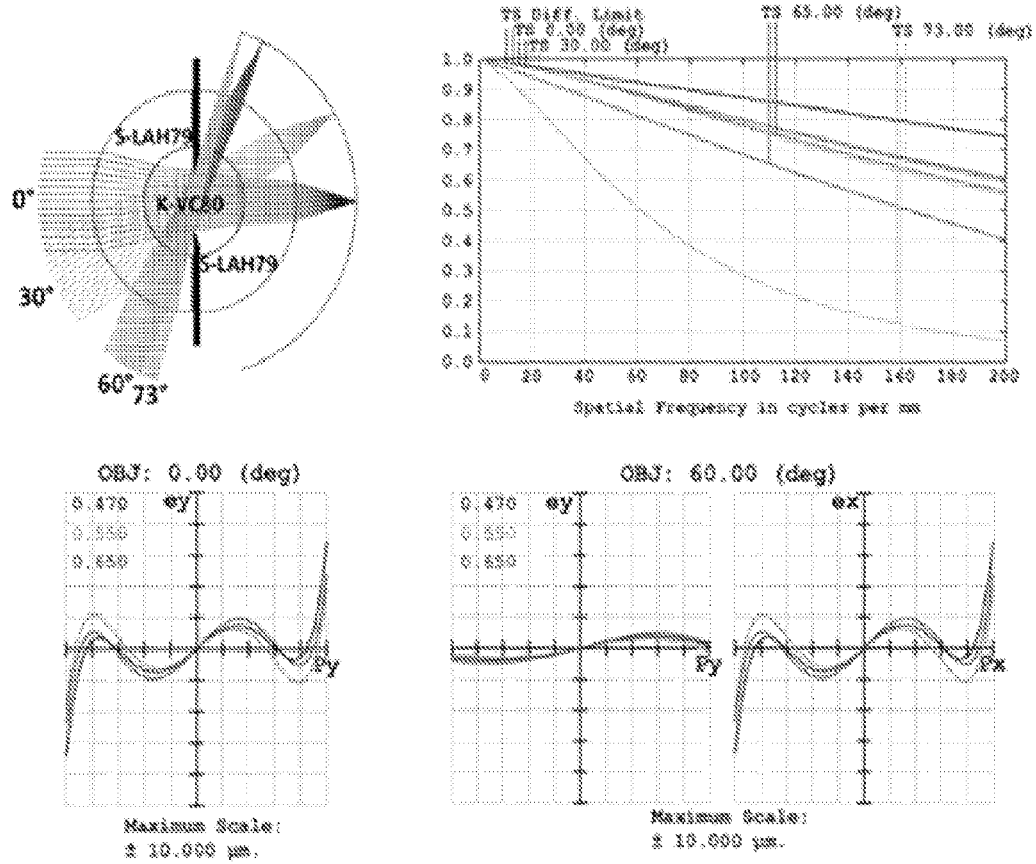
FIGS. 30A and 30B show an exemplary diagram and data plots of the exemplary top member of the third family (e.g., lower center glass index) operating in the physical aperture stop, e.g., including a 73° field angle illustrating the effect of aperture vignetting and "virtual" aperture stop mode, with uniform response up to 80°.
Figure 30B:
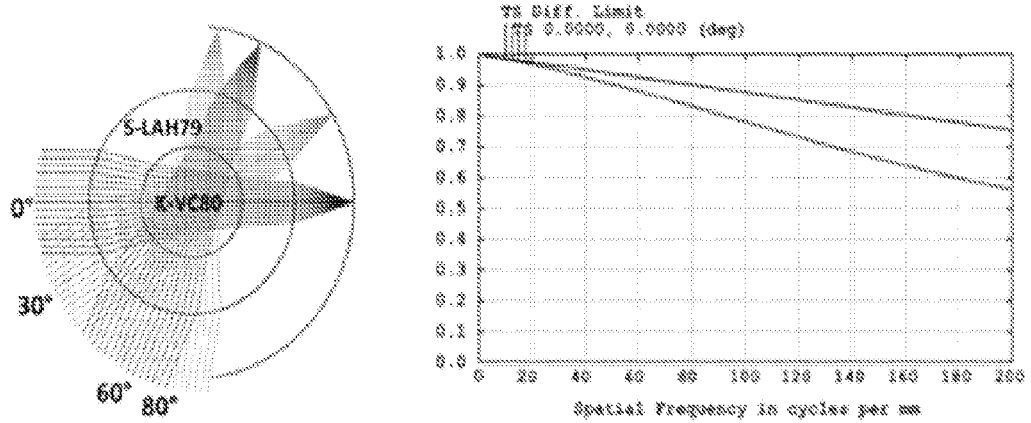

The members of the family six of Table 3 have a glass with a significantly lower refraction index of the central glass ball, 1.69, which can be index matched with standard UV cure epoxies. This enables the lens to be fabricated as two halves, and assembled with a physical aperture stop at the center. While members of this family have slightly lower image quality performance they can fully operate over ±65° field of view in both "virtual" stop and "aperture" stop modes. The optical layout, MTF and the ray fan diagrams of the top member of the third family operating in the "aperture stop" mode for the object located at infinity is shown in FIG. 30. The ray fan graphs are shown for the axial and 60° field points at the image surface. The scale of ray fans is ±10 µm. The design has been modified to include a 10 µm thick layer of NOA164 glue between the two glasses, and in the central plane. Simplified ZEMAX files of this lens without optical cement are also available at: http://psilab.ucsd.edu/PhysicalApertureStopFamily3.zip The optical layout 3301 and MTF of the top member of the family number six operating in the "fiber stop" mode is shown in FIG. 30. The "virtual" stop mode has a uniform high image quality performance all over the field. The "aperture" stop mode suffers from drop in performance at the edge of the field due to the pupil vignetting and aberrations in the optical cement layer. This design is useful, however, as operation in the "aperture" stop mode simplifies requirements to the image transfer and detection. In this case the input aperture of the fiber bundle can exceed back aperture of the optics, as the physical aperture stop provides all stray light filtering needed, and the image transfer can be done with relay optics or with standard Schott fiber bundles with NA=1 and 2.5 micron pitch.

V.3 Comparison with Conventional Wide Angle Lenses

Figure 31:
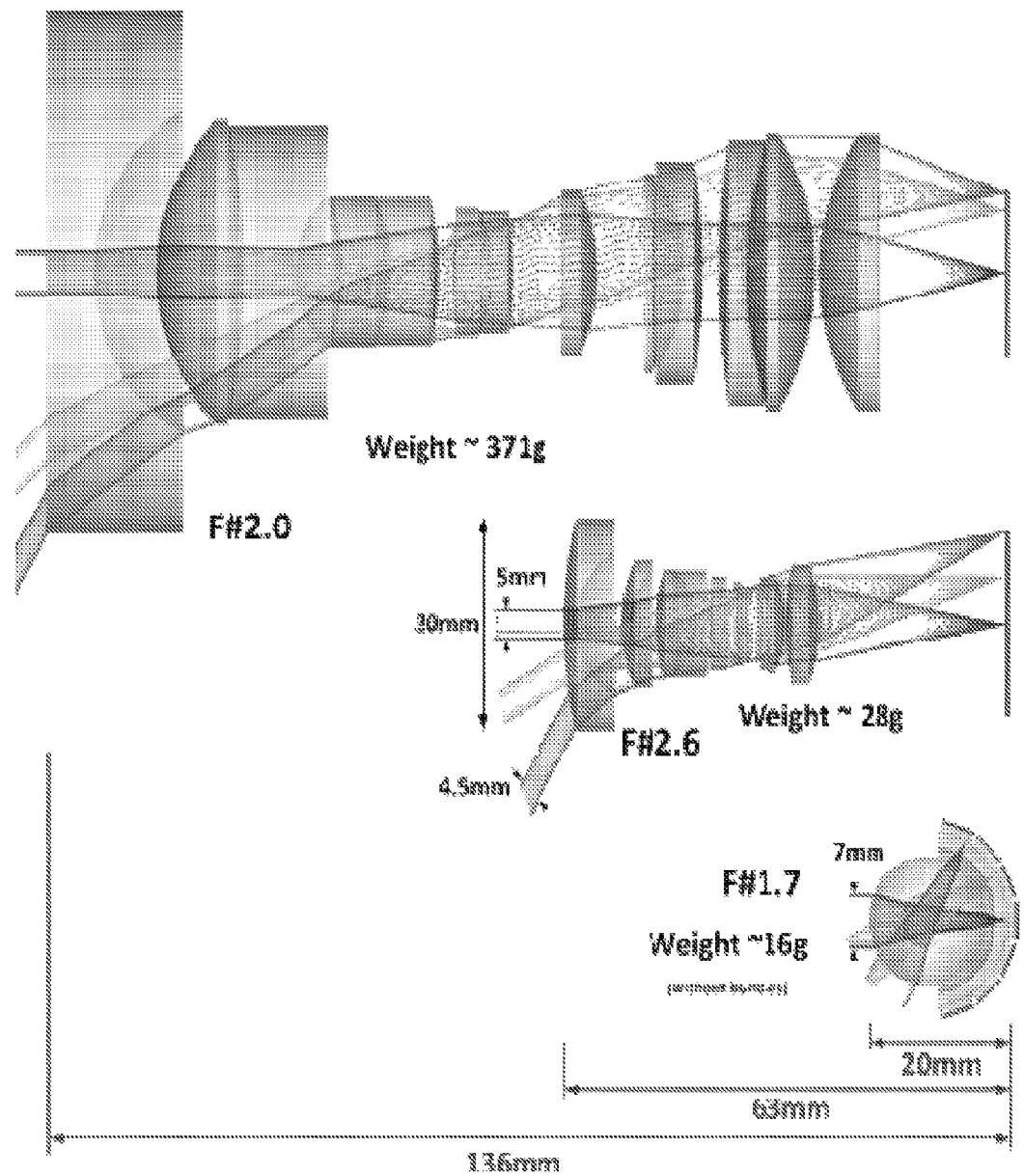
FIG. 31 shows exemplary diagrams illustrating a comparison of two conventional wide field lenses with exemplary monocentric-waveguide lenses, e.g., in which all imagers have a 12 mm focal length, 120° field of view, and similar light collection.
Figure 32:
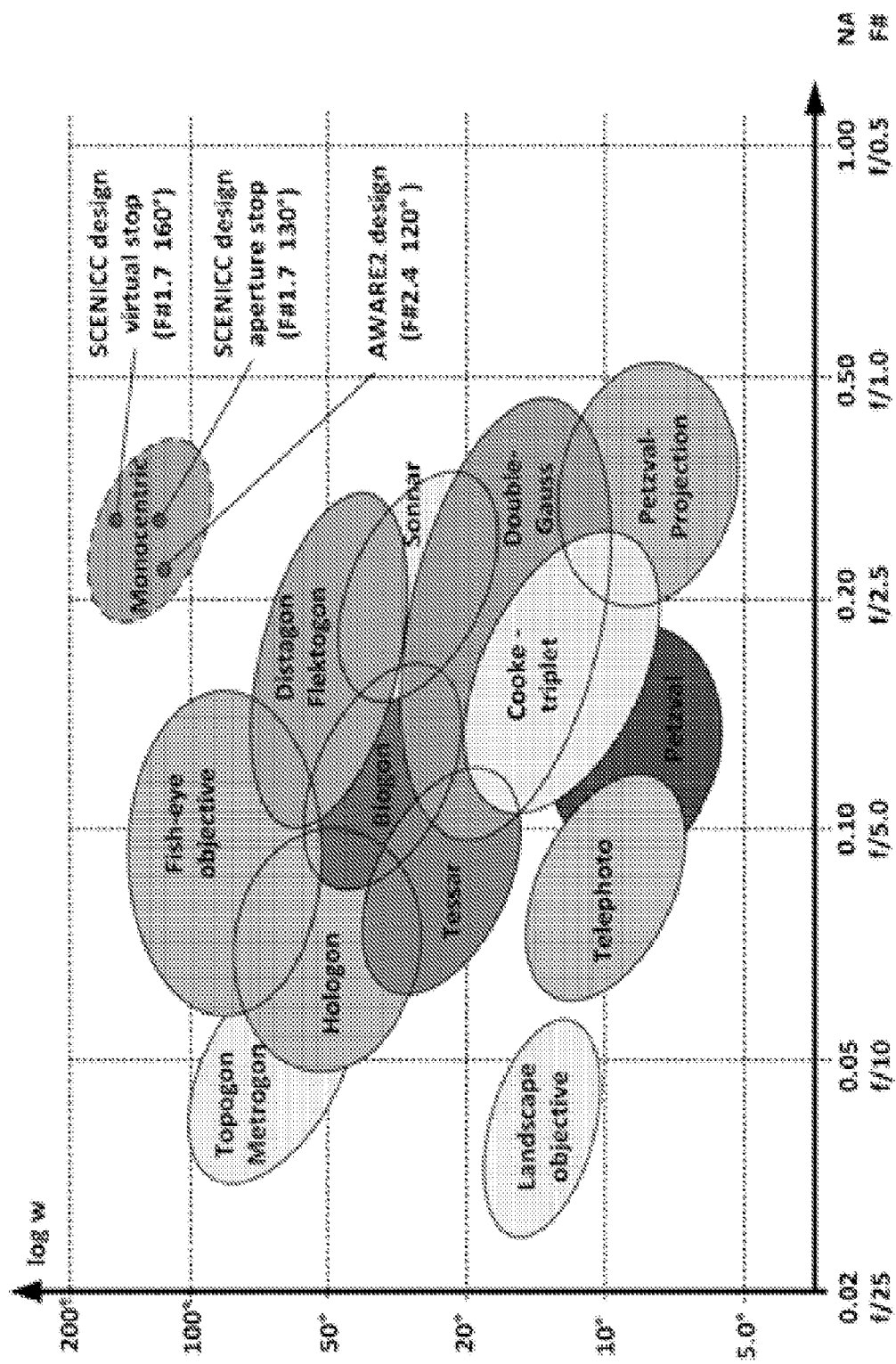
FIG. 32 shows an exemplary systematic diagram of photographic lens setup families, including monocentric multi-scale and waveguide imagers.

The architecture of monocentric lens is intrinsically compact: the principal (central) rays of all field angles are orthogonal to the front (powered) optical surface, and are directly focused to an image surface which is always substantially perpendicular to the incident light. Conventional wide field of view imagers require a lens which conveys wide field input to a contiguous planar image surface. Extreme wide angle "fisheye" lenses use two stage architecture in the more general class of reverse-telephoto lenses, where the back focal distance is greater than the focal length. The front optic in FIG. 31 is a wide aperture negative lens to insure acceptance of at least a fraction of light incident over a wide angle range. The negative power reduces the divergence of principal rays of the input beams, so the following focusing positive component operates with a significantly reduced field of view, although it must provide sufficient optical power to compensate for the negative first element. This retro-telephoto architecture results in a physically bulky optic. FIG. 31 shows two conventional widefield lenses on the same scale as the f=12 mm design example above. At the top of the FIG. 31 is an element "fisheye" lens taken directly from the Zebase catalog of standard lens designs (F_004), then scaled from 31 mm to the 12 mm focal length. The smaller lens at the center of FIG. 31 is based on the prescription for a 9-element wide field lens specifically designed to minimize volume. This design was intended for a shorter focal length, and the aberrations are not well corrected when scaled to 12 mm. When this design was optimized, even allowing aspheric surfaces, the components tended toward the same overall physical shape and volume of the lens above. Both of these lenses are substantially larger than the monocentric lens design, even including the volume of the fiber bundles, and they collect less light, even including for coupling and transmission losses in the fiber bundles. For example, looking further at a specific design example, identified were high- and low-index center glass solutions for F/1.7 12 mm focal length monocentric lenses with (at least) a 120° field of view, and showed that this lens compares favorably to conventional fisheye and projection lens solutions to panoramic imaging. It is reasonable to ask whether the specific designs used for the comparison were optimal, and in fact there is clearly room for improvement in these specific designs. However, the standard lens categorization shown in FIG. 32 indicates that monocentric lenses can enter a domain of light collection and field of view which is not otherwise addressable.

V.4 Other Exemplary Two Glass Specific Designs

V.4.1 Compact Monocentric Mass-Productable Cell Phone Camera Lens

Figure 33:
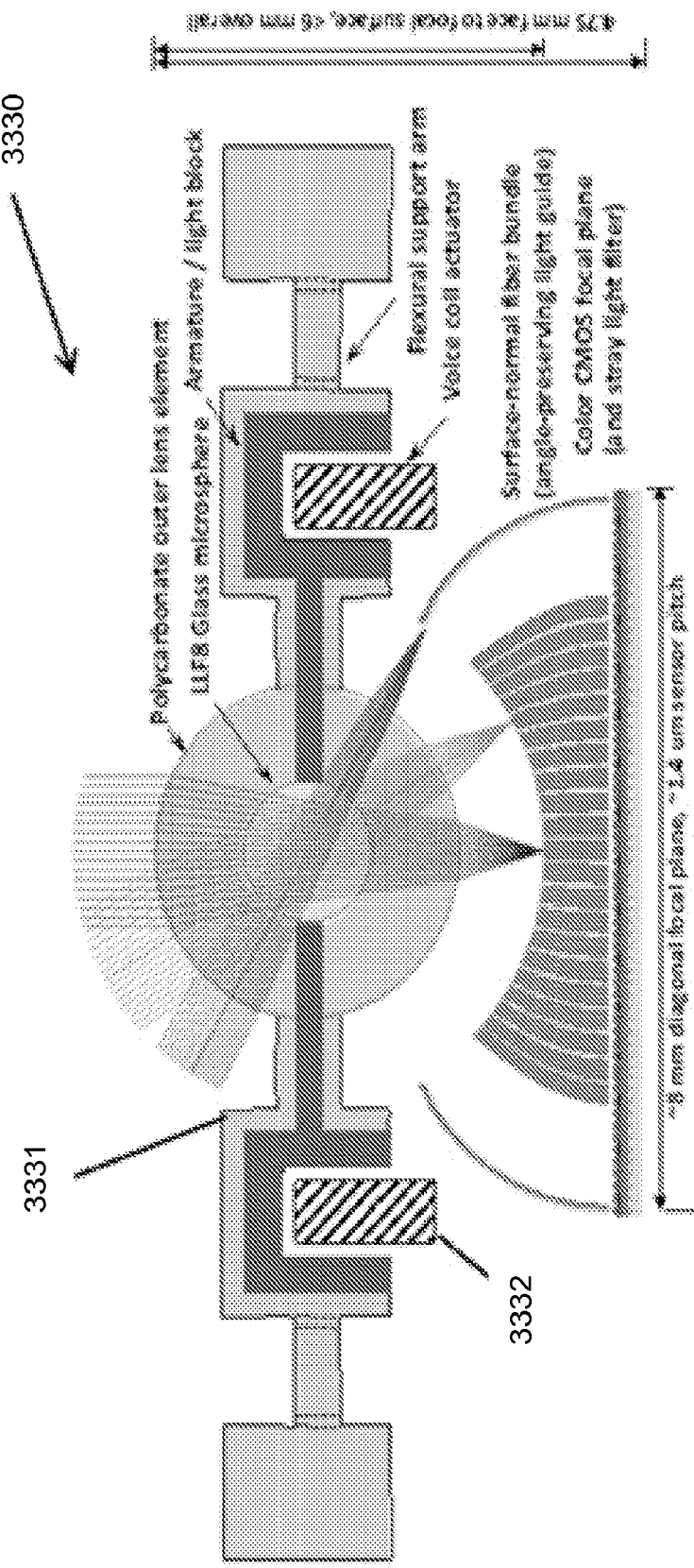
FIG. 33 shows a cross section of a diagram showing an exemplary compact imager in which the outer lens element is made of molded plastic and incorporates mechanical supports as well as portions of an electromagnetic focus actuation mechanism.

FIG. 33 shows an exemplary layout and compact cell phone camera assembly of the 3 mm focus 120 degrees field of view monocentric cell phone lens having the central ball lens made from glass LLF8 and outer shell lens made from optical plastic-polycarbonate. The optical prescription is shown in the Table 5.

TABLE 5

The optical prescription of the 3 mm focus two glass MC lens.

| | Type | Radius | Thickness | GLASS | Semi-Diam. |
|---|---|---|---|---|---|
| OBJ | Standard | Infinity | Infinity | | |
| 1 | Standard | 1.9619 | 1.1385 | POLYCARB | 1.96 |
| 2 | Standard | 0.8235 | 0.8235 | LLF8 | 0.82 |
| 3 | Standard | Infinity | 0.8235 | LLF8 | 0.57 |
| 4 | Standard | −0.8235 | 1.1385 | POLYCARB | 0.82 |
| 5 | Standard | −1.9619 | 1.09929 | | 1.96 |
| IMA | Standard | −3.06122 | | | 2.9 |

Another optional design for the exemplary compact 3 mm focus MC lens with F3=1.71 having optical plastic outer shell is shown in the Table 6.

TABLE 6

The optical prescription of the 3 mm focus two glass MC lens.

| | Type | Radius | Thickness | GLASS | Semi-Diam. |
|---|---|---|---|---|---|
| OBJ | Standard | Infinity | Infinity | | |
| 1 | Standard | 1.8989 | 1.1095 | POLYCARB | 1.81 |
| 2 | Standard | 0.7895 | 0.7895 | FF2 | 0.782 |
| 3 | Standard | Infinity | 0.7895 | FF2 | 0.56 |
| 4 | Standard | −0.7895 | 1.1095 | POLYCARB | 0.782 |
| 5 | Standard | −1.8989 | 1.07097 | | 1.81 |
| IMA | Standard | −2.96994 | | | 2.57 |

Both lenses have are operating in the 0.4 μm to 0.7 μm spectral band and give 0.5 MTF contrast at 200 lp/mm. Such compact lens can be mass-producible in two exemplary steps. For example, at the first step, the glass ball lenses can be manufactured with rolling technology. At the second step, the glass balls can be mounted into the mold of the outer plastic lens. The plastic melt temperature can be configured to be around 150° C., which is one order of magnitude less than glass melt temperature, e.g., which is around 1500° C. So molding of the plastic-glass sandwich at the second step will not damage glass ball. The outer to the glass core plastic lens can be molded together with the attachment mechanical trusses (armature block 3331 in the FIG. 33). After the molding, the assembly of the monocentric lens can be prepared with plastic camera housing. The assembly 3330 is shown in the FIG. 33. For example, refocusing of the exemplary 3 mm focus monocentric lens can require an axial shift of the lens of 0.09 mm. This is the difference between back distances numbered as 32 and 24. Such shift can be made with the inexpensive coil motor 3332. The motor will push the lens-housing connector trusses (armature beams), as shown in FIG. 33. Thus with this technology the whole cell phone refocusable objective assembly can be mass-producible with the cost as low as $1.

Figure 35:
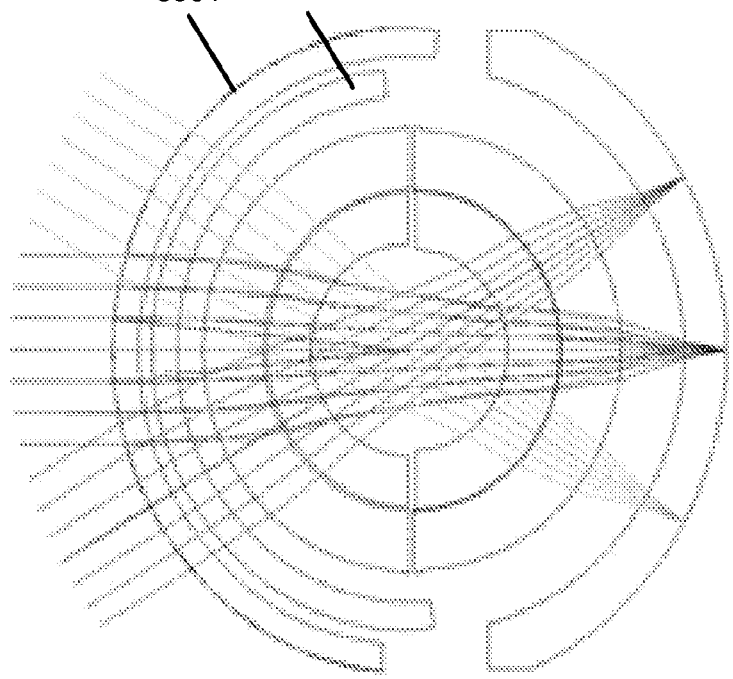
FIG. 35 shows a diagram of an exemplary compact monocentric lens with active spherical Alvarez lens aberration compensator, positioned to provide optical power.

As was shown in the Section II, this exemplary imager assembly can be refocused in a wide range of the object distances. With refocusing from the infinity object distance to the 100 mm distance the back focal distance changes from 1.09929 mm to 1.19292 mm. The condition of Eqs. (3) and (4) for astigmatism and image curvature do not change. So the system will be still free from the third order astigmatism and will keep the radius of the image surface. However angles $\alpha_i$ in Eq. (11) will change and third order spherical aberration begins to grow up. Because by operating with the physical aperture stop, the entrance pupil at the field points gets elliptical shape, e.g., such cut off of the spherical aberration in tangential plane deceptively transfers this spherical aberration to the additional astigmatism. Nevertheless if this variable is compensated over the focusing distance spherical aberration, the associated field astigmatism is compensated as well. The variable spherical aberration can be compensated with modified spherical Alvarez lens. As shown in FIG. 35, two (rotated in opposite directions) concentric meniscus 3801 and 3802 can be mounted in front of the monocentric lens. The concentric meniscuses 3801 and 3802 can be configured to have the aspherical deformation, e.g., which depends on the angles $\varphi_x$ and $\varphi_y$ between system axis and the vector connecting the point on the surface with the center of the curvature. Aspherical deformation $S(\varphi_x, \varphi_y)$ will be $$A^*(6\varphi_x^5/5 + 4\varphi_x^3\varphi_y^2 + 6\varphi_x\varphi_y^4 - 6\varphi_x\varphi_y^2 - 2\varphi_x^3) \quad (39)$$

for the first surface and $$-A^*(6\varphi_x^5/5 + 4\varphi_x^3\varphi_y^2 + 6\varphi_x\varphi_y^4 - 6\varphi_x\varphi_y^2 - 2\varphi_x^3) \quad (40)$$

for the second one. With rotation on the angle $\Delta\varphi_x$ of the first meniscus and on the angle $-\Delta\varphi_x$ the second one will have variable third order spherical deformation $$\Delta S(\varphi_x,\varphi_y)=2*A*\Delta\varphi_x*[6(\varphi_x^2+\varphi_y^2)^2-6(\varphi_x^2,\varphi_y^2)+1] \quad (41)$$

Figure 34:
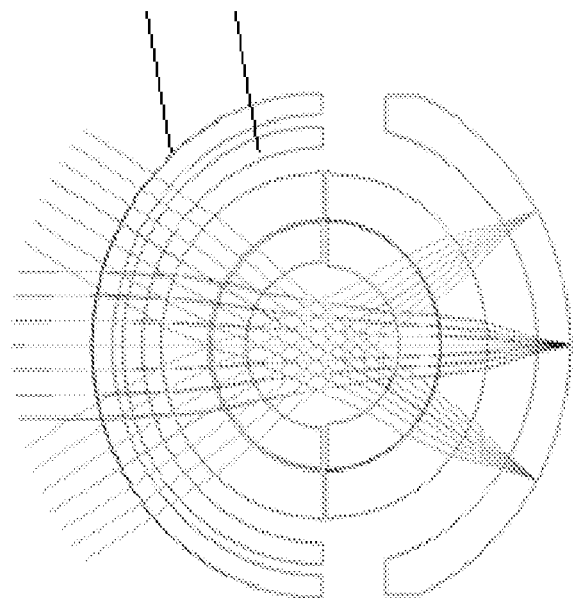
FIG. 34 shows a diagram of an exemplary compact monocentric lens with neutral spherical Alvarez lens aberration compensator, positioned to provide no optical power.

FIGS. 34 and 35 shows the monocentric lens having the mounting meniscus and refocused from infinity to close distance with rotated Alvarez lens aberrations compensator. FIG. 34 shows a diagram of an exemplary compact monocentric lens with neutral spherical Alvarez lens aberration compensation, e.g., shown by components 3701 and 3702, positioned to provide no optical power. FIG. 35 shows a diagram of an exemplary compact monocentric lens with active spherical Alvarez lens aberration compensation, positioned to provide optical power. For example, the monocentric optical imaging modules shown in FIG. 34 can include two optical elements 3801 and 3802 having complementary phases to form an Alvarez lens for close focusing operations.

V.4.2 Compact Monocentric Mid Infrared Imager

Figure 36:
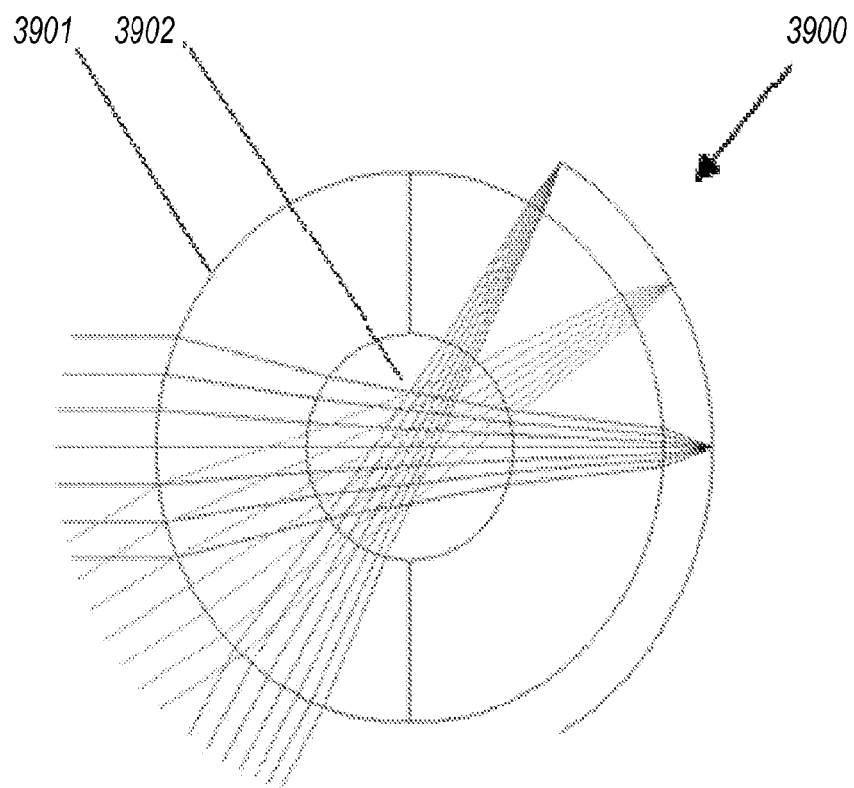
FIG. 36 shows a diagram of an exemplary MWIR two glass monocentric lens.

The next embodiment 3900 of the two glass monocentric lens is designed to operate in the MWIR (3 μm to 5 μm) waveband. The outer optical material 3901 is ZN Selenide. The internal ball optical material 3902 is AGCL (silver chloride) cristalline compound. The layout of the lens is shown in FIG. 36. The refraction index of the AGCL cristal is in the range of 2. The MWIR optical cement Arsenic-doped amorphous selenium has refraction index 2.5. So the lens can operate over whole wide field of view without total internal reflection at the flat cement layer of the central ball. Hence it can successfully operate in the aperture stop and fiber stop mode. This lens operates with F#=1.5. The optical prescription of the MWIR monocentric lens is shown in Table 7.

TABLE 7

The optical prescription of the MWIR two glass MC lens.

| Type | Radius | Thickness | GLASS | Semi-Diam. |
| --- | --- | --- | --- | --- |
| OBJ Standard | Infinity | Infinity | | |
| 1 Standard | 10.0488 | 5.94728 | ZNS_BROAD | 10 |
| 2 Standard | 4.10158 | 4.10158 | AGCL | 5 |
| 3 Standard | Infinity | 4.10158 | AGCL | 2.0293 |
| 4 Standard | -4.10158 | 5.94728 | ZNS_BROAD | 5 |
| 5 Standard | -10.0488 | 1.93327 | | 10 |
| IMA Standard | -11.98212 | | | 10.37 |

Figure 37:
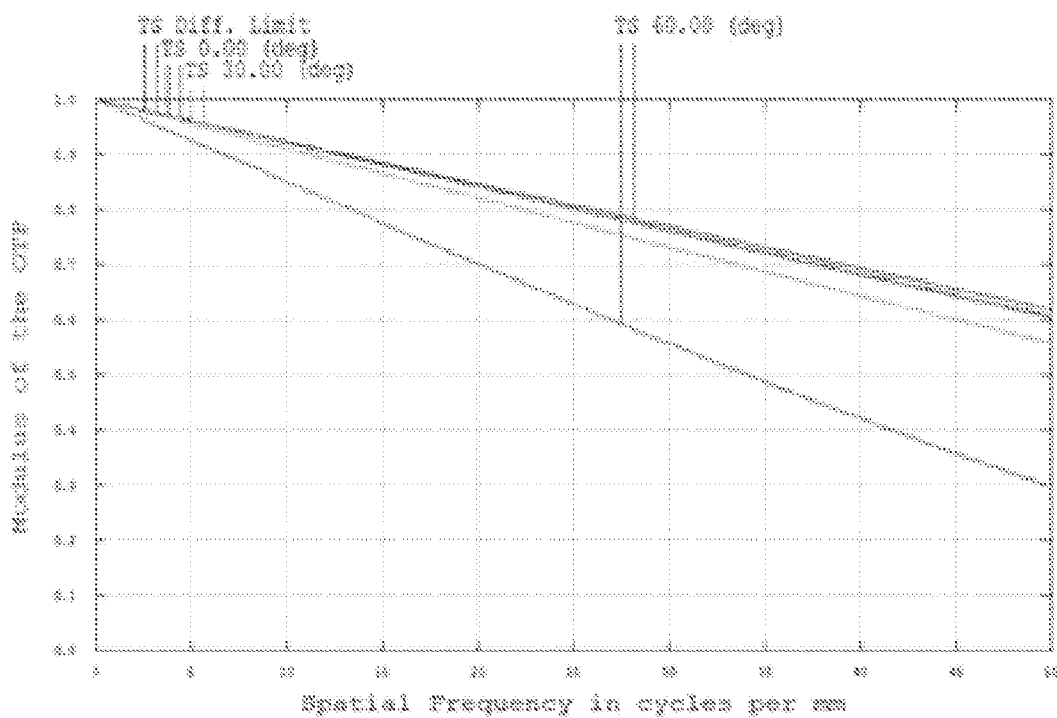
FIG. 37 shows an exemplary data plot depicting the MTF of the exemplary MWIR two glass monocentric lens.

The MTF of the lens operating in the aperture stop mode is shown in FIG. 37 All embodiments of the 12 mm focus monocentric lenses together with receivers assembly have size of about 23 mm. To deliver the image from the intermediate spherical image surface to the receiver the chalcogenide fiber bundle can be used. For example, a receiver array that can be used TACHYON uncooled MWIR array, e.g., from New IR Technologies. The TACHYON FPA sensors, made of polycrystalline PbSe using the Vapor Phase Deposition manufacturing method (exclusive from NIT), are built directly on top of the Si-CMOS readout circuitry (ROIC) taking advantage of the VPD-Si-CMOS manufacturing method compatibility. This allows the use of large Si-CMOS substrates (8-inch) and has a big impact in the final cost per device obtained. The spectral response is mainly centered in the MWIR (3-5 μm) with a peak response at 3.7 μm; in addition, the material has an extended response down to 1 μm.

V.4.3 Compact Monocentric LWIR Lens

The optical prescription of the compact 12 mm focus Long Wave Infrared MC lens is shown in the Table 8.

TABLE 8

Optical prescription of the compact LWIR MC lens

| Type | Radius | Thickness | GLASS | Semi-Diam. |
| --- | --- | --- | --- | --- |
| OBJ Standard | Infinity | Infinity | | |
| 1 Standard | 11.0465 | 6.30297 | GERMANIUM | 10 |
| 2 Standard | 4.74349 | 4.74349 | CDTE | 5 |
| 3 Standard | Infinity | 4.74349 | CDTE | 2.0293 |
| 4 Standard | -4.74349 | 6.30297 | GERMANIUM | 5 |
| 5 Standard | -11.0465 | 0.89959 | | 10 |
| IMA Standard | -11.94606 | | | 10.37 |

The lens is operating in the waveband 8 to 12 microns. The working F# of the lens is 1.6. Lens has diffractional image quality.

VI. Monocentric Lens Imagers Capable to Operate in Extended Wavebands

In the Section IV of this patent document, a combination of Seidel $3^{rd}$ order aberration analysis was used with exact ray-trace optimization to achieve a fast global search of two glass symmetric (2GS) geometries for a given focal length, F-number and waveband of interest. Since the number of degrees of freedom was 3, a direct check of all 312,000 possible glass combinations (using the entire available glass catalog) yielded a one-dimensional optimization, which could be executed within minutes. Such search for the two glass MC lens solution can gave diffractional limited results for the F# above 1.7 and photographic spectrum band with wavelengths from 0.47 to 0.65 microns. Moreover the use of photographic operational spectrum band required to use the complex band pass filter. To apply such filters to any hemispherical optical surface of the MC lens raise a significant technological challenge. So this coating has to be applied on the entrance surfaces of image delivery fiber bundles thus increase the cost of overall assembly. While two glass MC lenses are still attractive solution for the low cost compact wide field of view imagers the optical solutions that can operate in whole wavebands for assigned receivers, for example that can cover 0.4 to 1.05 microns band of front illuminated CCD, can help to avoid the use of complex coatings and achieve even higher light collection power. Requiring a broader spectrum band and a lower F-number quickly drove the 2GS geometry to its limits, so the same basic algorithm was modified to work with a three glass symmetric (3GS) geometry.

In the exemplary 3GS geometry there are around 170 million glass combinations, and the optimization problem is inherently two-dimensional. For example, in an attempt to reduce the computing time to reasonable limits, an interesting fact about 3GS geometries was identified and made use of. In the 2-dimensional optimization space of the three glass symmetric system, if the glass choice is viable, areas of minimum merit function (high performance) look like a long and nearly linear ravine. So it was possible to fix the radius of second glass shell to some reasonable value, and trade the two-dimensional optimization problem for one-dimensional track along the ravine. This increased the computational efficiency and made it possible for the global search to run in 24 to 48 hours on a high performance workstation (4×2.7 Hz Intel Xeon E5-4650). The freedom to choose the second radius in 3GS system was helpful in avoiding excessively thin shells solutions, which are impractical to fabricate. Unfortunately, the 3GS geometry offered only modest performance improvements, and introducing additional layers of glass did not provide significant improvement.

Figure 38:
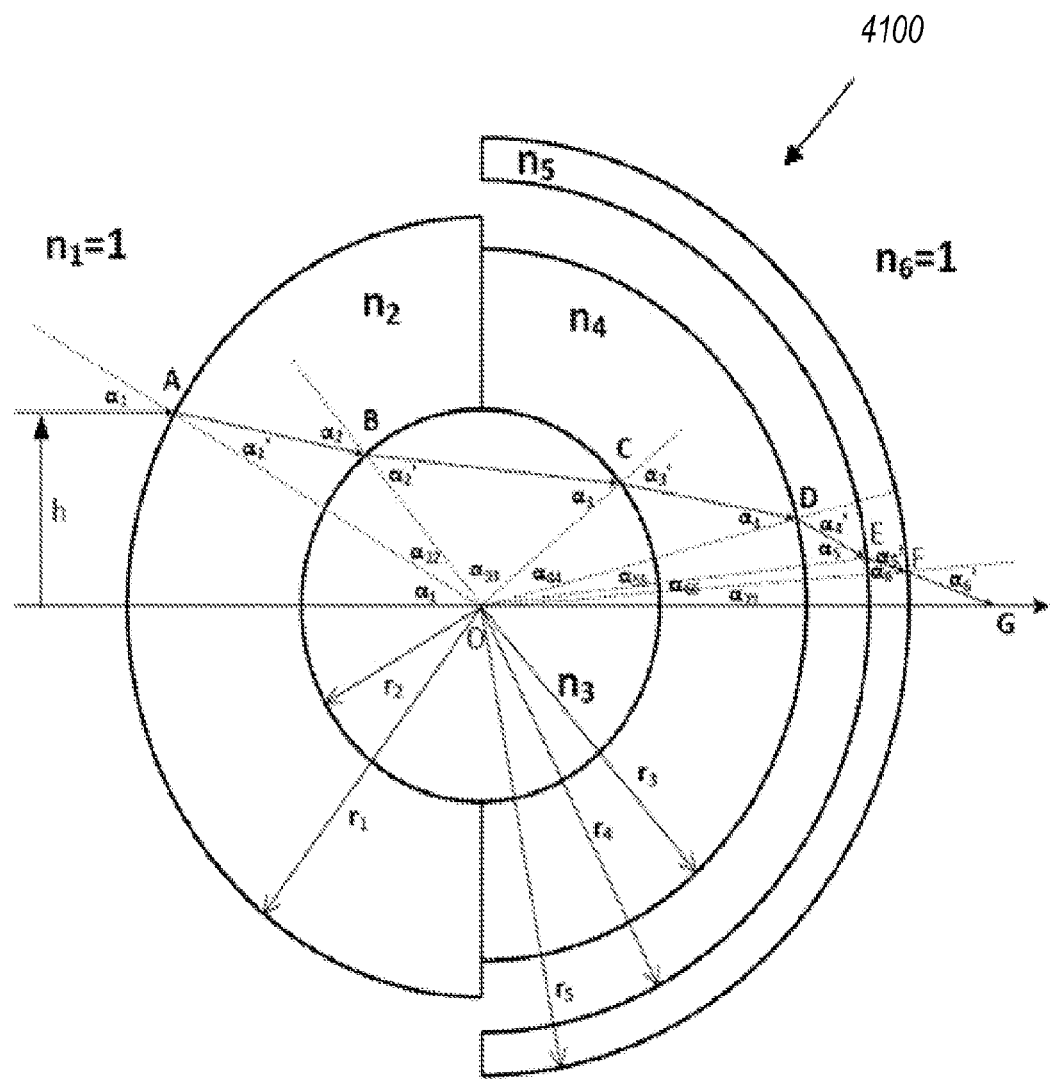
FIG. 38 shows an architectural diagram of an exemplary four glass semi-monocentric lens.

A useful solution is to break the front/rear symmetry and introducing an asymmetric air gap between the crown and flint glass core. Introducing such an air gap is a common method used for control of spherochromatism. This approach yields the four glass air gap asymmetric geometries, which improve performance on extended spectral bands, larger apertures, and longer focal length systems. The four glass semi-monocentric lens architecture 4100 is shown in FIG. 38. For any particular glass combination the optimization criterion is based on fast exact analytical ray-tracing. The similar to the shown above in Eqs. 15-28 procedure for ray tracing the arbitrary ray with entrance height h gives $$\sin \alpha_1 = h/r_1 \quad (42)$$

From the Snell's law $$\sin \alpha_1' = h/(r_1 n_2) \quad (43)$$

From triangle OAB $$\frac{r_2}{\sin \alpha_1'} = \frac{r_1}{\sin \alpha_2} \quad (44)$$

or $$\sin \alpha_2 = \frac{h}{(r_2 n_2)}$$

Then from Snell's law $$\sin \alpha_2' = \frac{n_2 \sin \alpha_2}{n_3} = \frac{h}{r_2 n_3} \quad (45)$$

From triangle OBC $$\alpha_3 = \alpha_2' \quad (46)$$

Then from Snell's law $$n_4 \sin \alpha_3' = n_3 \sin \alpha_2' \quad (47)$$

or $$\sin \alpha_3' = \frac{h}{r_2 n_4}$$

Next step from triangle OCD and sine low, one has $$\frac{r_3}{\sin \alpha_3'} = \frac{r_2}{\sin \alpha_4} \quad (48)$$

or $$\sin \alpha_4 = \frac{h}{r_3 n_4}$$

Then from Snell's law $$\sin \alpha_4' = n_4 \sin \alpha_4 = \frac{h}{r_3} \quad (49)$$

From triangle ODE $$\frac{r_4}{\sin \alpha_4'} = \frac{r_3}{\sin \alpha_5} \quad (50)$$

or $$\sin \alpha_5 = \frac{h}{r_4}$$

From Snell's law $$\sin \alpha_5 = n_5 \sin \alpha_5' = \frac{h}{r_4 n_5} \quad (51)$$

From triangle OEF and sine low $$\frac{r_5}{\sin \alpha_5'} = \frac{r_4}{\sin \alpha_6} \quad (52)$$

or $$\sin \alpha_6 = \frac{h}{r_5 n_5}$$

Then from Snell's law $$\sin \alpha_6' = n_5 \sin \alpha_6 = \frac{h}{r_5} \quad (53)$$

from triangle OFK segment OK=S is $$OK = S = \frac{r_5 \sin \alpha_6'}{\sin(\alpha_6' - \alpha_{00})} = \frac{h}{\sin(\alpha_6' - \alpha_{00})} \quad (54)$$

or $$S = \frac{h}{\sin\left[\arcsin\left(\frac{h}{r_5}\right) + \arcsin\left(\frac{h}{r_1}\right) + \arcsin\left(\frac{h}{r_2 n_2}\right) + \arcsin\left(\frac{h}{r_2 n_4}\right) + \arcsin\left(\frac{h}{r_3}\right) + \arcsin\left(\frac{h}{r_4 n_5}\right) - \arcsin\left(\frac{h}{r_1 n_2}\right) - 2\arcsin\left(\frac{h}{r_2 n_3}\right) - \arcsin\left(\frac{h}{r_3 n_4}\right) - \arcsin\left(\frac{h}{r_4}\right) - \arcsin\left(\frac{h}{r_5 n_5}\right)\right]} \quad (55)$$

The longitudinal aberration L(h) for this ray will be $$L(h) = S - F \quad (56)$$

where F is focal length. To form the optimization criterion the results of fast exact ray-tracing with Eqs. 55-56 are used. The entrance heights h, of these rays are $$h_i = NA \times F \times p_i \quad (57)$$

where $p_i$ is array of reduced rays heights at the pupil. The array is $$p = [1.0, 0.97, 0.88, 0.8, 0.7, 0.6, 0.5, 0.4, 0.05] \quad (58)$$

For criterion of optimization C is taken the sum shown in the Eq. (59):

$$C = \sum_{i=1}^{9} \sum_{j=1}^{9} [p_i L_j(h_i)/\lambda_j]^2 + [L_1(h_9)] - \qquad (59)$$

$$[L_9(h_9)]^2 + [L_1(h_3)] - [L_9(h_3)]^2 + [L_1(h_1)] - [L_9(h_1)]^2$$

where $\lambda_j$ is wavelength, the first member of criterion C equation is a sum of squared lateral aberrations reduced to wavelengths and the following three members are squared chromatic longitudinal aberrations differences at the pupil reduced rays heights 1., 0.88 and 0.05. The longitudinal chromatic difference at the reduced pupil height 0.05 is a classical chromatic focus shift. Pupil points with reduced pupil height 1 and 0.88 are critical for the spherochromatism reduction. For optimization of any MC lens operating in extended wavebands, nine wavelengths was used. For the MC lenses operating with front illuminated silicon CCD the waveband 0.4 to 1.0 micrometers was used. The waveband 0.4 to 1.0 micrometers is divided on the eight segments which gives nine wavelengths for criterion calculations. This criterion demonstrated a good correlation with system modulation transfer function quality for all types of MC lenses operation in extended wavebands.

VI.1 Optimization of Four Glasses MC Lenses

In another aspect, an optical imaging system includes a monocentric optical imaging module having concentric optical surfaces that collect light in a photographic visible spectrum to form an image on a curved imaging surface that is concentric with the concentric optical surfaces of the monocentric optical imaging module, in which the monocentric optical imaging module includes an inner glass ball lens of a sphere having a low refractive index of K-GFK68, K-GFK60 or S-FPM2 and three outer glass lens elements of higher refractive indices; one or more imaging sensors each including an array of optical detectors located away from the imaging surface to receive light representing the image initially formed on the curved imaging surface and to convert the received light into detector signals; and optical waveguides coupled between the imaging surface and the one or more imaging sensors to receive light from the curved imaging surface and deliver the received light to the one or more imaging sensors.

Implementations of the optical imaging system can optionally include one or more of the following exemplary features. For example, three outer glass lens elements of higher refractive indices can include P-LASF47, K-GFK68, K-LASFN6, or N-KZFS11. For example, three outer glass lens elements of higher refractive indices can include NBFD11, K-GFK68, K-LASFN17, KZFS12 or N-K5.

In another aspect, an optical imaging system includes a monocentric optical imaging module having concentric optical surfaces that collect light in a water transmission spectrum band from 0.38 to 0.55 micrometers to form an image on a curved imaging surface that is concentric with the concentric optical surfaces of the monocentric optical imaging module, in which the monocentric optical imaging module includes an inner glass ball lens of a sphere having a low refractive index and three outer glass lens elements of higher refractive indices, one or more imaging sensors each including an array of optical detectors located away from the imaging surface to receive light representing the image initially formed on the curved imaging surface and to convert the received light into detector signals, and optical waveguides coupled between the imaging surface and the one or more imaging sensors to receive light from the curved imaging surface and deliver the received light to the one or more imaging sensors.

Implementations of the optical imaging system can optionally include one or more of the following exemplary features. For example, three outer glass lens elements of higher refractive indices include TAFD30, N-LAF21, LASF35, or K-GIR79.

In another aspect, an optical imaging system includes a monocentric optical imaging module having concentric optical surfaces that collect light in a transmission spectrum band from infrared 0.9 to 1.5 microns to form an image on a curved imaging surface that is concentric with the concentric optical surfaces of the monocentric optical imaging module, in which the monocentric optical imaging module includes an inner glass ball lens of a sphere having a low refractive index and three outer glass lens elements of higher refractive indices; one or more imaging sensors each including an array of optical detectors located away from the imaging surface to receive light representing the image initially formed on the curved imaging surface and to convert the received light into detector signals; and optical waveguides coupled between the imaging surface and the one or more imaging sensors to receive light from the curved imaging surface and deliver the received light to the one or more imaging sensors.

Implementations of the optical imaging system can optionally include one or more of the following exemplary features. For example, three outer glass lens elements of higher refractive indices include M-FDS2, K-GIR79, K-PSFN215, or N-SF4.

In another aspect, a method for designing a monocentric optical imaging module having concentric optical surfaces that collect light to form an image on a curved imaging surface that is concentric with the concentric optical surfaces of the monocentric optical imaging module, in which the monocentric optical imaging module includes an inner glass ball lens of a sphere having a low index and three outer glass lens elements of higher refractive indices, in which the method includes: determining surface radii of the inner glass ball and three outer glass lens elements for combinations of glass materials for the inner glass ball and the three outer glass lens elements to minimize monochromatic and chromatic aberrations; the local optimization method will come somewhere inside the thin pancake shaped area of low criterion value solutions, then at a second step optimization search will follow over the main ravine of the cost function which direction was determined from the minimal absolute Eigen vector of the Hesse matrix at the initial minimum cost function point and locating with number of local optimizations the points over this ravine inside pancake shaped area of low value of cost function; then, at a third step, locating minimums over secondary ravines originated from the primary ravine of cost function with the same method of traveling over directions of secondary eigen vectors of the points over primary ravine with the local optimizations from these points. By investigating the pancake area of low cost function value with the square net of ravines the method reliably located the area of lowers cost function value and find location absolute minimum for each particular glasses combination.

Figure 40:
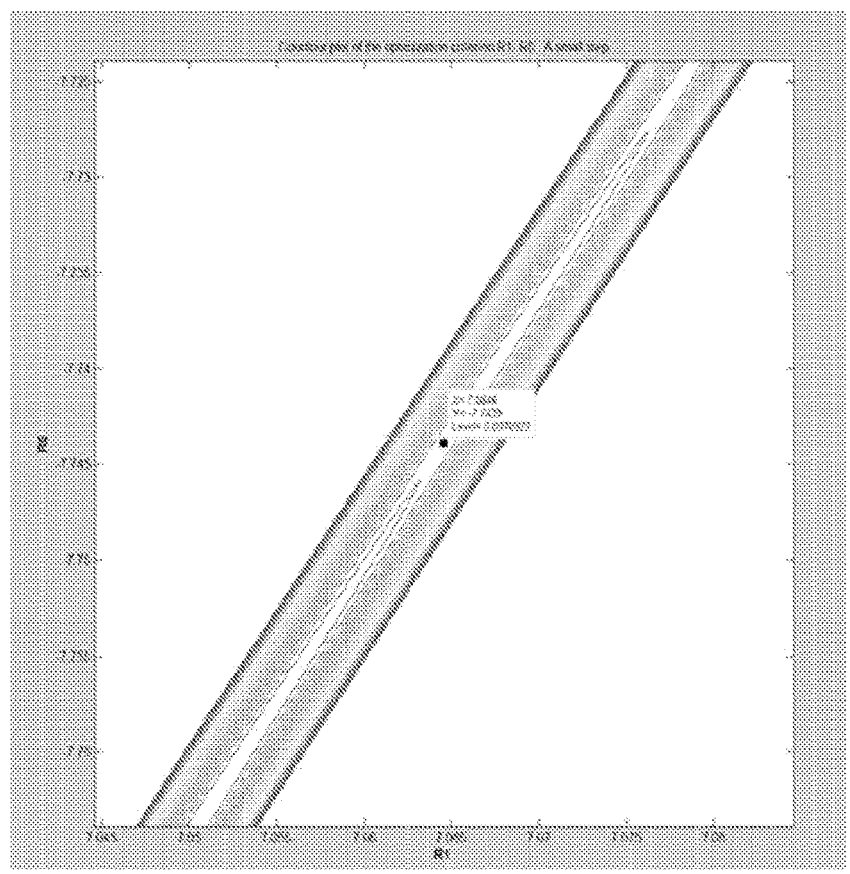
FIG. 40 shows a two dimensional graph of an exemplary four glass monocentric lens optimization criterion.
Figure 41:
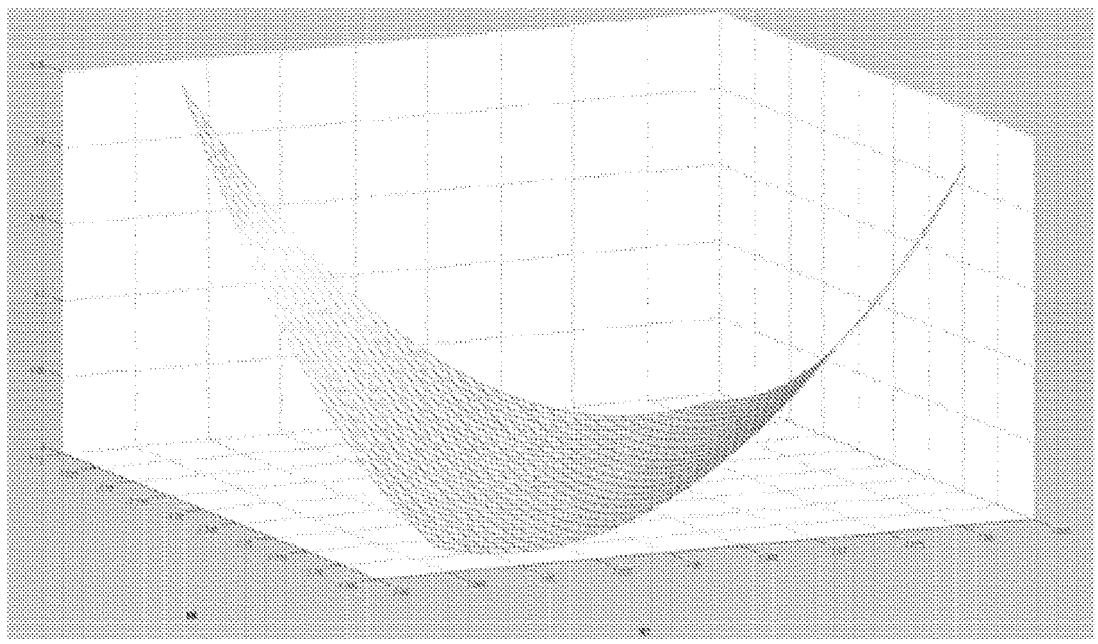
FIG. 41 shows a three dimensional countur chart of the exemplary four glass monocentric lens optimization in the R1-R6 section of the optimization space.

The starting point for four glass systematic search is to use the core from multiple two glass top candidates as seeds for further optimization. The more promising glass K-GFK68 was chosen as a basic core glass for systematic solution search. Other glasses were replaced in all possible combinations. For each glasses combination the search of minimum of criterion C (Eq. 59) was performed and the optimized system giving the minimum value of criterion C was found. For example, with the chosen glass combination, 5 radii were optimized. Actually, for example, there are seven radiuses in the optical scheme including the image surface radius (FIG. 38). But the third radius is equal to the negative value of the second radius because the central ball lens supposed to be monocentric and the image surface radius is bounded to the focus. Attempts to optimize four glasses architecture to the minimum of criterion C with ZEMAX software shows the number of linear combinations between optimization parameters or in the other words lines and surfaces in the optimization space over which the criterion does not change or changes very slow. Such areas are multidimensional ravines or saddle type stationary areas. For each glasses combination the minimum of the criterion C is located at different position in the radiuses space. Nevertheless all glasses combinations have the very common shape of solutions area in the 5D radiuses space. For every glasses combinations if we will draw the contour surfaces with the equal values of criterion C the minimum will looks as a thin pancake in the 5D radiuses space. This thin pancake is pierced with net of saddle type ravines areas. The optimization of such kind of functions creates problems for the universal methods of optimization such gradient or Newtonians methods used in commercial lens design software. Optimization methods are demonstrating the low convergence speed and usually are stuck in the saddle type ravines still not reaching the minimum. The behavior of the gradient method in such cases is illustrated in FIG. 39. On the graphical illustration 4201 of gradient method behavior in the general case of the normal minimums shape the gradient descend direction at any step is directed in the orthogonal to the criterion contour line and straight descend is continued up to the point when it reaches another contour line at low value of criterion, e.g., of which the direction of descent will be tangential. The process converges fast enough to the minimum in the several steps. In the case of degraded (stretched) minimum with the strong linear dependence between optimization parameters which is shown in the graph 4202 the gradient method begins to oscillate. Some methods include the use of conjugated gradients. It was shown that apexes of segmented lines in the gradient method are located around the line showing the direction to the minimum and after several steps we can create this medium line by using least square method. The move along this line will facilitate the fast descend to the minimum. While method of conjugated gradients can help in number of degraded minimums cases, the exemplary situation is more sophisticated and cannot be illustrated with two dimensional graphics. In the exemplary case, all points inside five dimensional thin pancake minimum area saddle like points. At every point we have Hesse matrix having one zero Eigen value and Eigen vector demonstrating strong linear dependence between the first and last radiuses. This saddle type nature of the area of minimum is another reason that conventional optimization methods are stuck at different points inside pancake depending on initial optimization point. In this situation even method of conjugated gradients failed. The optimization of this lenses architecture required development of special methods. This special optimization method will be illustrated on the example of MC lens with the following glass combination: P-LASF47, K-GFK68, K-LASFN6, N-KZFS11. This exemplary glasses combination demonstrated excellent performance. The exemplary search for the near minimum begins with a gradient descent to the closest local minimum from the average radii solution for this architecture. The optimization of this glasses combination begins from the some average radiuses combination—(7, 2.9, −2.9, −4.2, −4.5, −7.8, −12), where in parentless are shown radiuses of the architecture of FIG. 28 in mm's. The local gradient descent method quickly came to the point with array of radiuses M1=(7.06457, 2.95860, −2.95860, −4.16102, −4.46400, −7.74390), which again are shown in mm's, and criterion value at this point is C=0.00709. The contour lines graphs of the criterion C (Eq. (59) in the plane section of radiuses R1-R6 of the 5 dimensional space is shown in FIG. 40. The minimum area is thin long strip, which is the section of five dimensional thin pancake. The minimum point M1 is shown with information box 3202. From the FIG. 40 is clear that this is footprint of the single minimum finally located somewhere at the area of R1 having lower value out of the frames of this figure. We used the Hesse matrix Eigen vectors to find direction of the strip. The five Eigen values of the Hesse matrix at this point are: −0.01024, 0.25782, 0.91727, 25.44 and 21148.91. Note that radius number three does not participate in optimization because it is equal to the negative value of the second radius. Two Eigen vectors having smallest Eigen values are: $E_1$=(−0.6007, 0.00309, −0.00223, 0.00967, −0.79988) and $E_2$=(0.31650, 0.12960, −0.50686, −0.75252, −0.24462), where Eigen vectors directionally cosines are related to the radiuses R1, R2, R4, R5 and R6 accordingly. The section of criterion C shows that the main ravine is related to the Eigen vector $E_1$. In FIG. 40 the angle of this ravine with the axis of first radius R1 measured with protractor is 54.5°. The directional cosine of the Eigen vector $E_1$ with the axis of the first radius is −0.6007 shows the angle 53.07°. This is pretty good estimation taking into consideration that estimation of the direction of slightly nonlinear ravine was made at the small local zone around of point M1. In this local zone the increments for the numerical derivatives test were only 0.0005 mm. It is a general situation inside optimization space for this architecture that the minimal Eigen vector $E_1$ shows the direction which demonstrates close to complete linear dependence between the first and last radiuses of the MC lens. We will name this ravine as the main virtual ravine. By knowing that gradient methods are descending in the direction orthogonal to the contours of equal C values it is not surprising that gradient methods from any initial point are coming to the main virtual ravine but to the different location over this ravine depend on the location of initial point. The 3D graph of the criterion C with dependence on the first and last radiuses is shown in FIG. 41. The value of the criterion function C in the direction orthogonal to the ravine is quickly reaches value of 0.4 with just such small step in radiuses space as 0.02 mm. We will use the main ravine as an entrance area into pancake space. We will find several entrance points into pancake stepping over ravine. The main ravine is slightly nonlinear. So to find new entrances into pancake we need to travel over this straight line which defined by the first Eigen vector direction at the point of the founded minimum and make number of local optimizations, which will quickly come to the actual ravine bottoms. Following over the direction of Eigen vector $E_1$ we made 17 steps with 0.05 increments in the radiuses space (8 steps in the direction of lower first radius and 8 steps in opposite direction) and making the gradient descent from each point we obtains the array of minimums shown in the Table 9. In the Table 9 is shown the central ten minimums (ravine bottom points) of this scan. The minimum M1 over the main ravine have number 9 in the Table 9.

TABLE 9

The array of local minimums located over the main ravine.

| | 5 | 6 | 7 | 8 | 9 | 10 | 11 | 12 | 13 | 14 |
|---|---|---|---|---|---|---|---|---|---|---|
| $C_{initial}$ | 0.0132 | 0.0089 | 0.0074 | 0.0071 | 0.0071 | 0.0071 | 0.0075 | 0.0092 | 0.0135 | 0.022 |
| r1 | 6.9453 | 6.9753 | 7.0052 | 7.0351 | 7.0646 | 7.0095 | 7.1252 | 7.1554 | 7.1855 | 7.2157 |
| r2 | 2.959 | 2.959 | 2.959 | 2.959 | 2.959 | 2.959 | 2.958 | 2.959 | 2.956 | 2.957 |
| r3 | −2.959 | −2.959 | −2.959 | −2.959 | −2.959 | −2.959 | −2.959 | −2.963 | −2.956 | −2.957 |
| r4 | −4.162 | −4.162 | −4.161 | −4.161 | −4.161 | −4.161 | −4.161 | −4.161 | −4.161 | −4.161 |
| r5 | −4.462 | −4.462 | −4.463 | −4.463 | −4.464 | −4.464 | −4.465 | −4.465 | −4.466 | −4.466 |
| r6 | −7.904 | −7.864 | −7.824 | −7.784 | −7.744 | −7.704 | −7.664 | −7.624 | −7.584 | −7.544 |
| $C_{final}$ | 0.0072 | 0.0071 | 0.0071 | 0.0071 | 0.0071 | 0.0071 | 0.0072 | 0.0073 | 0.0075 | 0.0078 |

Table 9 shows that minimums are located over deep slightly curved ravine with the strong linear dependence between the first and last radiuses. The local gradient optimization initiated from the points of this line just make the short descent to this ravine bottom points. Each local minimum located over this main ravine has minimum value eigen vector which is close to be collinear to the vector $E_1$ at the point M1. For example eigen values at the minimum point number 14 in the Table 8 are: (0.0095, 0.252, 1.174, 25.29, 21129.5) and the first eigen vector is: (−0.6245, 0.00681, −0.00823, −0.00390, −0.78094). The scalar product of this vector with vector $E_1$ at the point M1 will be 0.996. So the main ravine is very slightly curved. The body of pancake shaped minimum located over the 3D sphera into 5D space and this sphera is orthogonal to the ravine shown in FIG. 40. The directions of the minimum increment of the criterion C at each bottom point over ravine is direction of the second eigen vector while the first one is still directed over ravine. Finally from each minimum at this ravine we investigated the tunnels into pancake located over the lines of eigen vectors having the eigen value next on the first eigen vectors. This vectors orthogonal to the local main eigen vector. The method of pancake structure investigation is the same. With the step of 0.05 mm we initiated local gradient descents. Actually we investigated thin pancake of criterion C with number of local gradient discents initiated from the dense square net of initial optimization points. The global minimum for this system was found over the tunnel initiated at the bottom point number 7 located at the main ravine (Table 9). At this bottom point at the main ravine the array of eigen vectors values are—(0.01185, 0.2590, 0.95738, 25.048, and 21154.01). Eigen vector number one is: (−0.58954, 0.00163; −0.00098, 0.0129, − 0.8077). First eigen vector is very close to be collinear to the vector $E_1$ at the point M1. Eigen vector number two is: (0.312, 0.1518, −0.51805 −0.7442, −0.2389). An exemplary strategy included making the search over tunnel associated with secondary Eigen vector. The search was made with 0.05 mm step in the radiuses space. Finally at the tunnel line associated with eigen vector number two we found the minimum number 3. This minimum has the value of the criterion C equal to 0.00387. The array of radiuses at this minimum is: 7.06749, 2.9897, −2.9897, −4.26439, −4.61223, −7.87162. Radiuses are in mm's. This point with the minimum value of the criterion C is actually the same type saddle point as others inside pancake. Eigen values at this point are—(− 0.00726, 0.13978, 0.63353, 21.93178, 17845.4). In the area surrounding this global minimum the values of criterion C are still low. So we actually have to speak about area of solutions rather than about single global minimum solution. For example the minimum founded at another secondary tunnel inside pancake initiated from the minimum number 8 (Table 7) at the 3 steps with short gradient optimization has value 0.00388. The array of radiuses in mm's are: (7.09812, 2.98535, −2.98535, −4.26195, −4.61452, −7.83257). The minimum number 3 from the minimum number 6 (Table 9) has criterion value of 0.00393. The array of radiuses in mm's are: (7.03748, 2.99069, −2.99069, −4.26517, −4.61138, −7.91104). So this area of low value of criterion C is substantially large area inside an exemplary pancake proximately covering patch with 0.06 mm size across in the radiuses space. We substituted the array of radiuses at the point with C=0.00387 into ZEMAX software. The optical prescription is shown in the Table 10.

TABLE 10

The optical prescription of the optimal solution.

| | Radius | Thickness | GLASS | Semi-Diam. |
|---|---|---|---|---|
| OBJ | Infinity | Infinity | | |
| 1 | 7.06749 | 4.07771 | P-LASF47 | 6.75 |
| 2 | 2.98978 | 2.98978 | K-GFK68 | 2.96 |
| 3 | Infinity | 2.98978 | K-GFK68 | 2.2053 |
| 4 | −2.98978 | 1.2746 | K-LASFN6 | 2.95 |
| 5 | −4.2644 | 0.34785 | | 4.09 |
| 6 | −4.61224 | 3.2594 | N-KZFS11 | 4.37 |
| 7 | −7.8716 | 4.1278 | | 7.14 |
| 8 | −11.9995 | | | 11 |

Figure 42:
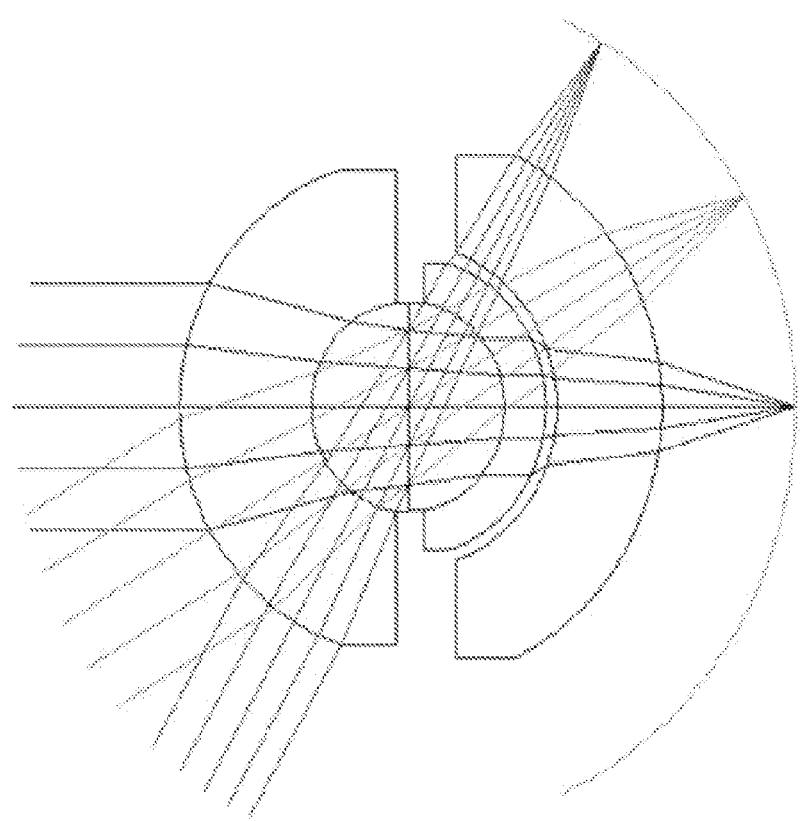
FIG. 42 shows an optical layout diagram of an exemplary four glass semi-monocentric lens which operates in the extended waveband of 400 to 1000 nm.
Figure 43:
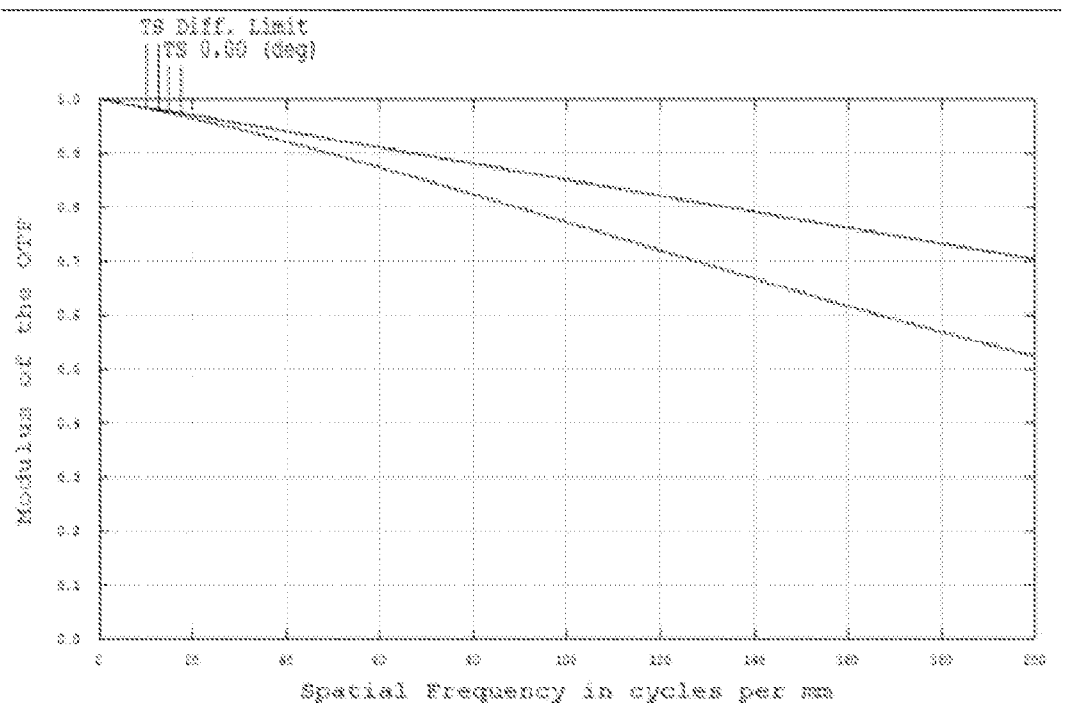
FIG. 43 shows a data plot of the MTF of an exemplary four glass monocentric lens operating in the extended waveband of 400 to 1000 nm with uniform sensitivity of the sensor.

The optical layout of the lens is shown in the FIG. 42 and optical transfer function in the FIG. 43. We loaded the sensitivity of the front illuminated CCD in the ZEMAX file of Table 10. We constructed ZEMAX merit function as a function keeping at minimum radiuses of point spread functions at all nine wavelength (operators REAR), maximizing MTF at frequencies 100, 160 and 200 lp/mm and keeping focal length at 12 mm (operator EFFL). Substitution of the sensitivity of the front illuminated CCD and quick reoptimization with ZEMAX gave the optical prescription shown in the Table 11.

TABLE 11

The optitical prescription of the 12 mm focus MC lens operating with front illuminated CCD.

| | Radius | Thickness | GLASS | Semi-Diam. |
|---|---|---|---|---|
| OBJ | Infinity | Infinity | | |
| 1 | 7.04107 | 4.08409 | P-LASF47 | 6.75 |
| 2 | 2.95699 | 2.95699 | K-GFK68 | 2.96 |
| 3 | Infinity | 2.95699 | K-GFK68 | 2.2036 |
| 4 | −2.95699 | 1.26003 | K-LASFN6 | 2.95 |
| 5 | −4.21702 | 0.35134 | | 4.09 |
| 6 | −4.56835 | 3.30232 | N-KZFS11 | 4.37 |
| 7 | −7.87067 | 4.12587 | | 7.14 |
| 8 | −11.99654 | | | 11 |

Figure 44:
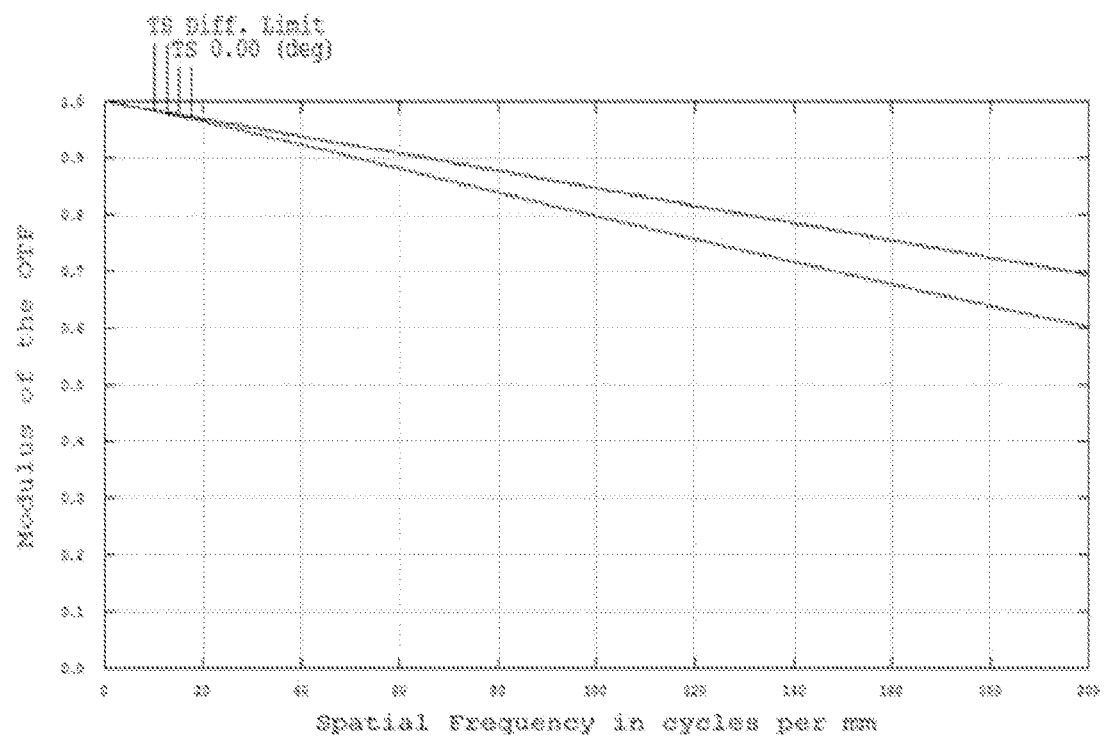
FIG. 44 shows a data plot of the MTF of an exemplary four glass monocentric lens which operates without any band pass filters with the front illuminated CCDs.

The image quality is practically diffractional. The MTF of the lens is shown in the FIG. 44. At the 200 lp/mm the lens has 90% level of resolution from diffractional limit.

The back illuminated CCD are sensitive down to the 200 nm wavelength. We found that achromatization in the band of 200 nm to 1050 nm is out of ability of the four glass air gap architecture. So to avoid of the use of expensive coatings we decided to cut off the UV spectrum by using the mounting meniscus made from the Schott GG435 absorptive glass. The optical prescription of the MC lens operating with the back illuminatedx CCD is shown in the Table 12, where the GG435 color glass is simulated with close by refraction index properties N-K5 glass.

TABLE 12

The optitical prescription of the 12 mm focus MC lens operating with back illuminated CCD.

|  | Radius | Thickness | GLASS | Semi-Diam. |
|---|---|---|---|---|
| OBJ | Infinity | Infinity |  |  |
| 1 | 6.86592 | 3.92922 | NBFD11 | 6.75 |
| 2 | 2.93671 | 2.93671 | K-GFK68 | 2.96 |
| 3 | Infinity | 2.93671 | K-GFK68 | 2.2036 |
| 4 | −2.93671 | 1.27547 | K-LASFN17 | 2.95 |
| 5 | −4.21218 | 0.36698 |  | 4.09 |
| 6 | −4.57916 | 2.33722 | KZFS12 | 4.31 |
| 7 | −6.91638 | 3.07425 |  | 6.3 |
| 8 | −9.99063 | 2.0000 | N-K5 | 8.8 |
| 9 | −11.99063 |  |  | 10.4 |

Figure 45:
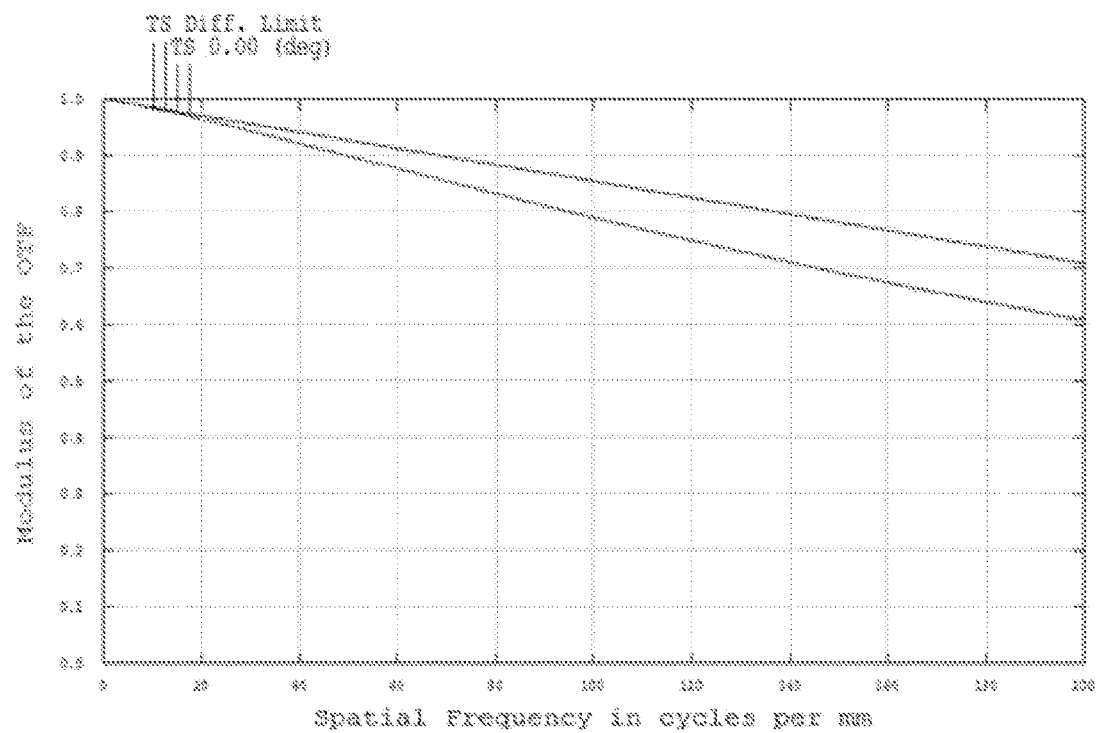
FIG. 45 shows a data plot of the MTF of an exemplary four glass monocentric lens which operates with the back illuminated CCDs.
Figure 46:
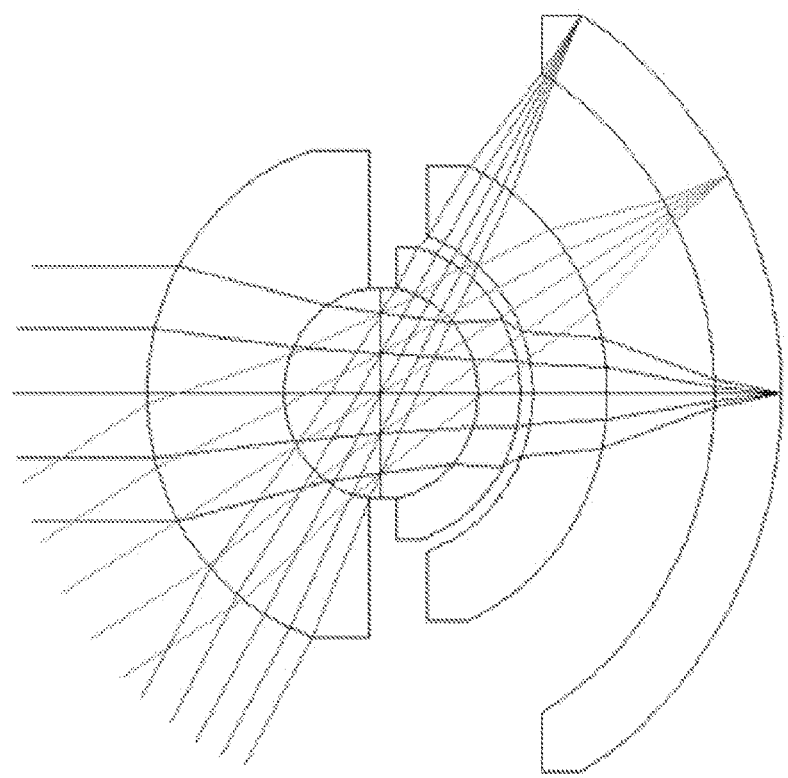
FIG. 46 shows an optical layout diagram of an exemplary four glass semi-monocentric lens which operates with the back illuminated CCDs.

The MTF of the lens is shown in the FIG. 45. The image quality is practically diffractional. The optical layout of the lens is shown in the FIG. 46.

Both lenses have the core glass K-GFK68 with a very high coefficient of thermal expansion, TCE=12.9, while surrounding glasses have low TCE coefficients. For example for front illuminated CCD scheme shown in the Table 10 P-LASF47 glass has TCE=6.04 and K-LASFN6 glass has TCE=5.9. For example, normally the TCE difference less than 1.5 for cemented surfaces can be recommended for out door optics. Recently, for example, Norland Products Inc. offered extremely low psi modulos NOA 76 optical cement which can be used for glass pairs with such high CTE differences. ZEMAX thermal modeling of the schemes shown in Tables 10, 11 with 10 microns thick NOA 76 optical cement shows that lenses can operate in a wide temperature range of −20° C. to +50° C. without image quality degradation, just ±0.02 mm back focal length adjustment is required. Because MC lens originally designed to be able for refocusing (Section II) this procedure does not rise a problem.

Additional families of solutions for the MC lenses operating in the extended spectrum band of back and front illuminated CMOS receivers can be found with OHARA S-FPM2 glass core ball lens.

VI.2 Compact Underwater MC Lens Imager

Water in the natural reservoirs like ocean nor lakes water contains a lot of organic and nonorganic particles and actually are the high scattering media. So the light is fast attenuated and for the imaging at effective distances underwater optics has to have high light collection power. The underwater optics has to operate in specific optical band shifted to the soft UV spectrum. So the desired operational waveband for underwater optics is from 0.3 to 0.6 micrometers. Back illuminated CCDs are sensible down to wavelength 0.2 micrometers so principally such imager operating with whole water transmission band are possible. Additional problem that underwater optics are affected by high pressure on the front lens. Classical wide field optics based on the fish-eye or Topogon shemes have the front meniscus. Finally this high pressure resistance requirements makes classical underwater optics bulky. For example, contemporary underwater objectives, e.g., like Gidrorussar 11 and 12, have thick cemented doublet in as a front lens and combines Topogon scheme with Petzval projection lens for distortion compensation and image flattering that makes them complicated and expensive. They can achieve minimum F# of 2. with a 90° overall field. The MC underwater lens optimized in spectrum band 0.38 to 0.55 microns and have image space F#1.79 and can operate with 120 degrees field. The optical prescription of the four glass with air gap MC lens is shown in the Table 13.

TABLE 13

The optical prescription of the underwater MC lens.

|  | Radius | Thickness | GLASS | Semi-Diam. |
|---|---|---|---|---|
| OBJ | Infinity | Infinity | SEAWATER |  |
| 1 | 6.04301 | 3.48922 | TAFD30 | 5.7 |
| 2 | 2.55379 | 2.55379 | N-LAF21 | 2.52 |
| STO | Infinity | 2.55379 | N-LAF21 | 1.86186 |
| 4 | −2.55379 | 1.45045 | LASF35 | 2.51 |
| 5 | −4.00424 | 0.15550 |  | 2.52 |
| 6 | −4.15974 | 2.61865 | K-GIR79 | 3.95 |
| 7 | −6.77840 | 5.26988 |  | 6.25 |
| IMA | −12.04828 |  |  | 10.43 |

Figure 47:
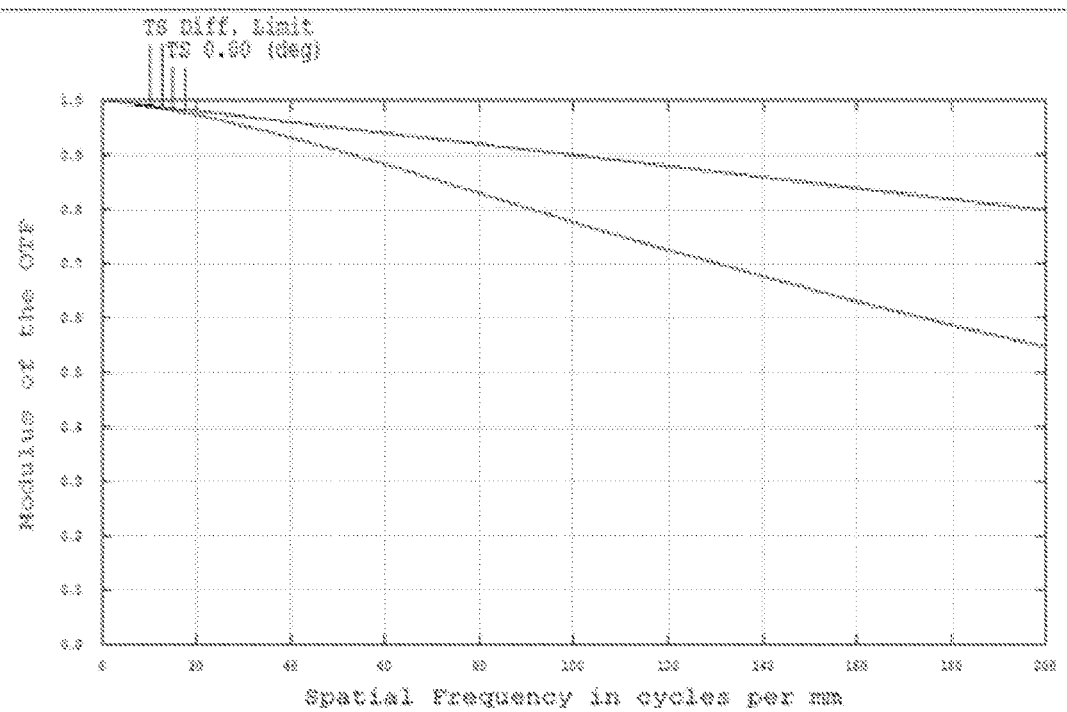
FIG. 47 shows a data plot of the MTF performance of an exemplary monocentric underwater lens.

The MTF of the underwater MC lens is shown in the FIG. 47. The MTF have 70% value from the diffraction limited MTF. Such wide field, high light gathering power and high pressure resistance because of the use of cemented ball lens as a front lens makes MC underwater lens highly competitive.

VI.3 Compact Short Wave IR MC Lens Imager

Traditional approach to the night vision devices architecture is based on the of image intensifiers which operates at the star and moon light spectrum in the waveband of 0.7 to 0.9 micrometers. Generation III image intensifiers have circular image input area 18 mm in diameter which perfectly fit to MC 16 mm focus fiber bundle flat output. The required resolution of optics to match the tubes resolution is 70 lp/mm. While conventional optics for night vision devises have 40° field and operates with F#1.2 for a maximum light collection the four glass MC lens can overstep this requirements. The optical prescription of the MC lens for night vision goggles was found as result of the systematic similar to the shown in the Section V.1. The optical prescription of the night vision lens operating with the Gen. III tubes is shown in the Table 14.

TABLE 14

The optical prescription of the MC lens for the Gen III image intensifier based Night vision googles.

|  | Radius | Thickness | GLASS | Semi-Diam. |
|---|---|---|---|---|
| OBJ | Infinity | Infinity |  |  |
| 1 | 12.213 | 7.2 | K-PSFN173 | 11.73 |
| 2 | 5.014 | 5.014 | K-GIR79 | 4.97 |
| STO | infinity | 5.014 | K-GIR79 | 3.672 |
| 5 | −5.014 | 2.766 | K-PSFN173 | 4.97 |
| 6 | −7.780 | 0.265 |  | 7.36 |
| 7 | −8.045 | 5.490 | KZFS12 | 7.5 |
| 8 | −13.535 | 2.438 |  | 12 |
| IMA | −15.972 |  |  | 12.8 |

The lens designed to operate in the waveband 0.5 to 0.9 microns which covers the whole spectrum band of Gen III GaAsP photocathode. But this lens can certainly operate in the standard 0.7 to 0.9 microns waveband as well. The F# of the lens is 1.2 so it will provide excellent light gathering power over wide 120 degrees field which 3 times overpass the field of the standard optics. With this field MC lens provides 100 lp/mm resolution. The lens is light weight 40 g only.

Recent research shows that Skylight glow in the SWIR band provides reliable imaging at night time even in the absence of star light. This night sky glow is due from chemical luminescence in the upper atmosphere. The glow is result of the emission of hydroxyl radicals transitioning from exited rotational and translational states to lower energy states and emitting SWIR photons in the process. During the day time the UV photons strike water molecules and initiate production of hydrogen and ozone. At night, the hydrogen and ozone recombines. The molecules then transition to a low energy state and emit SWIR light. The process reliably continues for all night providing high level of the SWIR illumination at the ground level which comparable with the full Moon illumination. It is important that SWIR illumination can penetrate the clouds so the night vision in SWIR band does not depend on the weather conditions. For example, wide choices of SWIR cameras are available from Sensor Unlimited Corp. For example, Sensor Unlimited SWIR CCDs are uncooled and available in several formats: 640 to 512 or 1280 to 1024 pixels. The pitch is 15 μm and it will be reduced in the near future. SWIR cameras are as compact as contemporary visible cameras and the use of SWIR sensors in MC lens assembly does not show up any problems so far. The systematic search of the SWIR lens results in the optical prescription shown in the Table 15.

TABLE 15

The optical prescription of the MC SWIR lens.

| | Radius | Thickness | GLASS | Semi-Diam. |
|---|---|---|---|---|
| OBJ | Infinity | Infinity | | |
| 1 | 9.64853 | 6.08158 | M-FDS2 | 9.23 |
| 2 | 3.56694 | 3.56694 | K-GIR79 | 3.54 |
| STO | infinity | 3.56694 | K-GIR79 | 2.7875 |
| 5 | −3.56694 | 2.13160 | K-PSFN215 | 3.54 |
| 6 | −5.69694 | 0.20974 | | 5.4 |
| 7 | −5.90828 | 4.27312 | N-SF4 | 5.55 |
| 8 | −10.18140 | 1.79011 | | 9.05 |
| IMA | −11.97151 | | | 10.36 |

Figure 48:
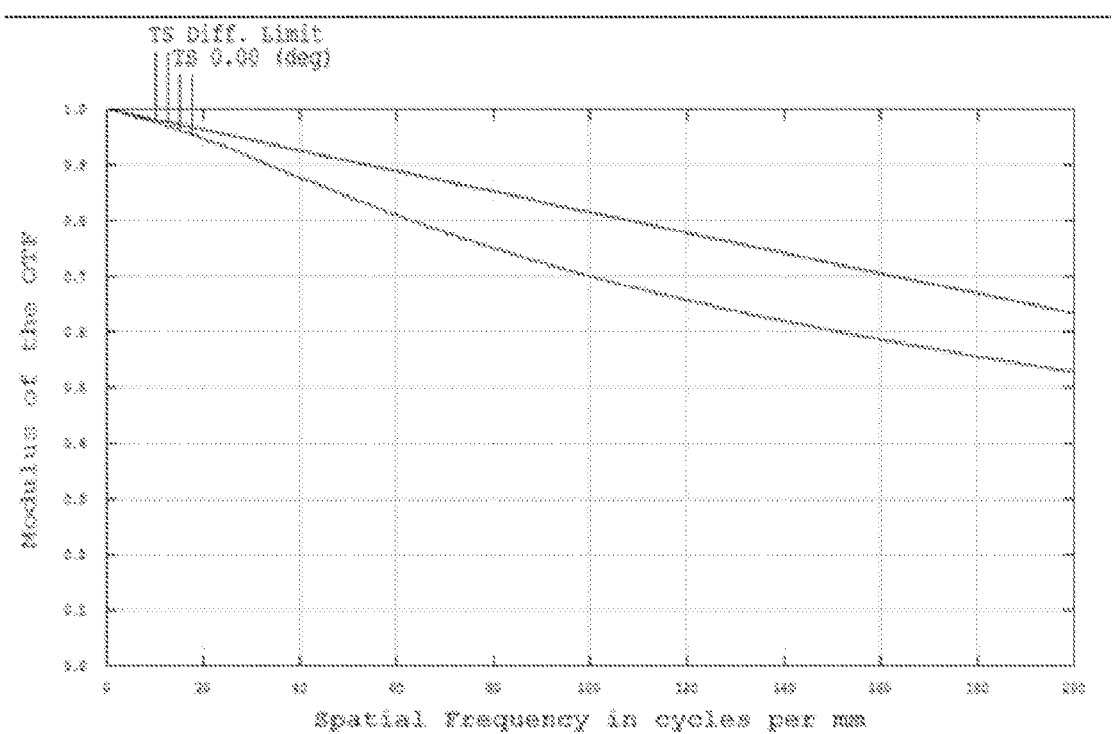
FIG. 48 shows a data plot of the MTF performance of an exemplary monocentric near infrared lens.
Figure 49:
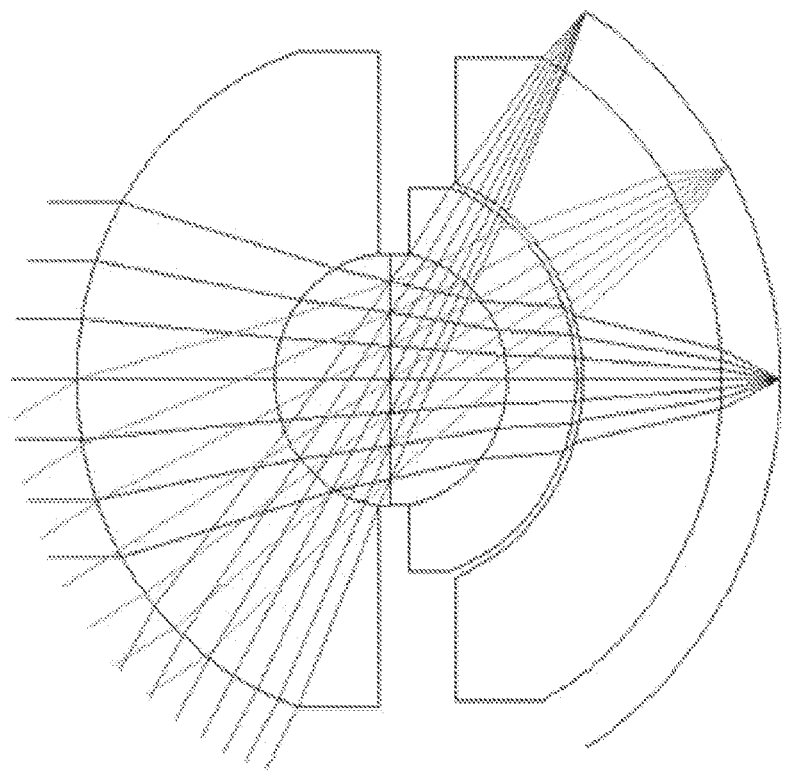
FIG. 49 shows an optical layout diagram of an exemplary monocentric SWIR lens.

The lens has focal length 12 mm, operational waveband 0.9 to 1.5 um and F#1.19 so it will provide an excellent light gathering power. The MTF is shown in the FIG. 48. SWIR MC lens provides close to the diffractional resolution at 200 lp/mm and hence can operate with CCDs having 2.5 microns pixel pitch. Contemporary SWIR sensors like 1280 by 1024 Sensor Unlimited have 15 microns pitch. So MC optics will provide advanced imaging even for next generation SWIR cameras. The layout of the lens is shown in the FIG. 49. Lens weight is only 15 g so it can state the fair competition for the existing wearable night vision optics.

VII. Monocentric Lens with a "Virtual" Stop as a Unique Solution for High Gain Panoramic Imagers with Uniform Field Illumination VII.1 Introduction Imagers that require the combination of wide field of view, high angular resolution, and large light collection present a difficult challenge in optical systems design. For example, conventionally fish-eye and Tessars objectives are used in wide field of view imagers. Both schemes are suffering of low gain (ratio between entrance pupil and lens diameters) and significant reduction of resolution and image illumination at the edge of the field. For example, the vital modification of the front components in Tessar scheme can result in double fold growth of entrance pupil at the edge of the field. The disclosed technology can result in the developing of the Russar lenses family widely used in the professional, underwater and aero photography. Nevertheless Russar lenses are still suffering from the cosine in power three filed illumination reduction. The problem of resolution and field illumination reduction toward the edge of the field in the panoramic imagers can be solved with implementation of monocentric lenses (MC). MC lenses use only hemispherical or spherical surfaces that share a single center of curvature. This symmetry yields zero coma and astigmatism over hemispherical image surface and on that surface provides a field of view limited only by vignetting from the central aperture stop. The challenge of optical design of MC lenses operating in different wavebands from soft UV to the MWIR was addressed in the above sections. In the above section of this patent document, an effective way of systematic monocentric lenses design was described, e.g., which found low aberration solutions for a panoramic lenses having 1 arc minutes resolution over up to 160 degrees field. The last left over problem of such imagers was the reduction of image illumination due to cosine projection of the aperture stop on the input beams over the field. While this cosine image illumination reduction (in the case of general landscape imaging) is significant better rather than in best Russar lenses where this image illumination reduction follows by cosine in power three low this is still a problem which has to be solved. For example, some techniques can use MC lenses without the physical aperture stop at the center and use fiber bundles-tapers with restricted numerical aperture to cut off aberrated rays. Such imagers operating with the "virtual" aperture stop will have high resolution uniform illumination over whole field of view. In this report the property of the "virtual" stop aberrated light filtering are considered in details.

VII.2 Monocentric Lens Operating with "Virtual" Aperture Stop

Table 4 shows the optical prescription of exemplary top solution of two glass MC lens operating in 0.47-0.65 micron waveband, having 12 mm focus and F#=1.715. In FIG. 28 is show the layout of the lens operating with the "virtual" stop over +/−80 degrees field. Or in other words this lens has not physical aperture stop located at the center. Rays having back aperture exceeding the designed NA are filtered out within the receiver assembly. Such receiving assembly can be array of finite NA aperture fiber bundles-tapers with attached CCD imager. The layout 201 of the MC imager operating with "virtual" stop is shown in FIG. 2. Fiber bundles plays an important role of delivering image from the spherical image surface to the conventional CCD's receivers and filtering out aberrated light coming through the optical paths out of rotated on the field angle "virtual" stop located at the center of MC lens. In FIG. 28 are shown MTF of this lens calculated with ZEMAX with supposition that image is formatted at the spherical image surface and only rays within back NA aperture 0.292 are reaching the image. The "virtual" stop operation mode solves two important problems. At the first it eliminates the cosine compression of the imaging beams at the high field angles which was considered as an inevitable "evil" for all wide field lenses operating with the physical aperture stop. Such beams compression results in significant reduction of the illumination and image quality degradation at the edge of the field. To manufacture the physical aperture stop we need to split the central ball lens in halves, put mask on the one part and cement two parts. The refraction index of the central ball lens is 1.81. The optical cements have low refraction index. This results in total internal reflection at the border of glass-cement for the high field angles. So the implementation of "virtual" stop is the only operational way for top MC lenses solutions having high central ball refraction index. Because of the importance of the "virtual" stop mode for the developing of the panoramic imagers having the uniform image illumination and quality over the wide field of view it optical property has to be detailed investigated. At the exemplary first step, the MC lens themselves can be investigated. An issue to be addressed is what angles with the normal to the image surface the imaging rays, coming within the "virtual" stop, and stray light rays, coming from outside "virtual" stop, are coming. One question includes if they are separated or mixed. For example, if they are separated, that creates a good basis on which the actual "virtual" stop imager can be built. For the delivery of rays from the spherical image surface to CCDs, fiber bundles can be used with restricted numerical aperture, fiber tapers or other devices which restricts rays numerical aperture. The second question is how good are real receivers assemblies in providing light filtering.

At the first step of investigation we will consider all rays coming directly to the image surface over designed optical path within area at the center of lens where the rotated "virtual" aperture stop will create the beam with NA=0.292 as the imaging rays. All other rays will be stray light rays. That can be rays coming to the image surface directly but at the area out of "virtual" aperture stop. It can be rays created by secondary reflexes at the MC lens surfaces and coming to the image surface over more sophisticated optical path rather than designed for imaging rays. For example, the reflections on the MC lens surfaces in the front half of the lens may not be considered. These rays will go back into the object space. Surfaces in the back half of MC lens will have actual reflection-refraction properties. Internal ball lens will be uncoated and external has AC with 0.5% reflection. The MC lens has physical aperture stop up to the central ball which exceeds in size the "virtual" aperture stop. The manufacturing of this external physical stop which exceeds in size "virtual" does not create any technological problems because the outer shell of the ball lens will be in any case manufactured as two separated meniscus and will leave the space out of the central ball to mount this stop. These meniscuses will be cemented with the central ball lens to prevent mechanical failure due to the temperature deformations. In the lens shown in FIG. 28 the aperture stop to the central ball has radius 3.7915 mm. FIG. 22 shows a diagram depicting monocentric lens real ray trace variables.

In FIG. 22, the ray which is incoming with height h and coming to the image point I can be the imaging ray or stray ray depend on the height h (inside the entrance pupil or out of entrance pupil). The rays reflected at the point D are all stray rays.

Consider the direct rays to the image point I. For example, it was found invariant $\varphi_1 = \varphi'_4$. This is Eq. (22) in this patent document. The angle between the direct ray and the normal to the image surface with radius OI=F (F is focus of the MC lens) is the angle $\varphi_5$. So from triangle ODI and sine theorem, one will have $$F/\sin(\varphi'_4) = R1/\sin(\varphi_5) \tag{60}$$

Because $$\sin(\varphi'_4) = \sin(\varphi_1) = h/R1 \tag{61}$$

one will get $$\sin(\varphi_5) = h/F \tag{62}$$

It means the linear dependence of the sine of the angle between output rays and the normal to the image surface on the input height. In other words it means that all rays having input height within the "virtual" entrance pupil will have angles with the normal to the image surface less than output aperture related to this size of pupil and wise versa. So, what was proved was the opportunity for the perfect stray light filtering with the use of the bundles-tapers providing the ideal filtering of the rays having incident angle at the image surface exceeding lens NA. Computer simulation in FRED confirms this conclusion.

There can be several candidates for the actual ray filters, which can be delivered to the CCD plane receivers.

(1.) Tapers constructed from the fibers having NA=1. The output of the taper is connected to the CCD. The input side of the taper is larger than output. So from Lagrange invariant the NA of the input side is less than output. The face facets of the fibers will be orthogonal to the image surface of the MC lens. So all rays having angles with the normal to the image surface larger than designed NA will be filtered out. Such tapers are produced by Schott Corp.

(2.) Fiber bundles with desired NA. At this time such bundles have low efficiency and excessive internal cross talk. Nevertheless they can be considered as candidates for the rays filters because in the future the technology can be improved.

(3.) The microoptics arrays mounted in the front of delivery bundles. They will works on the principals of the ideal rays filters described above.

(4.) The selective, sensitive to the ray incident angles, dielectric coatings.

The quality of such filters will be the subject of extended research efforts which will require application the vector diffraction formalism and fibers mode theory to the rays propagation.

VII.3 Section VII Summary

This section gives a strong theoretical foundation for ability of monocentric lenses to operate with the "virtual" aperture stop. It has been shown that panoramic imagers with "virtual" stop monocentric lens will have the uniform field illumination and will be free of reduction of resolution toward the edge of the field.

VIII. Monocentric Lens Focusing Ability and all in Focus Imaging

Conventional imaging cameras can image one object plane at an ideal focus while other planes at other ranges will be defocused depending on the distance to the optimal plane. By axially moving the detector with reference to the imaging optics this ideally focused plane will change its position in the object space. The image formation in the ideally focused plane conventionally considered as a convolution of the space invariant point spread function (PSF) and an ideal geometrical image of the object. So the Fourier transform (FT) of the image in the local invariant image plane zone, where the space invariant of the PSF is valid, is the product of the FT of the geometrical object image and FT of the PSF, namely the modulation transform function (MTF). This explains the blurring of the image with degradation of PSF (growing wider). With degradation of the PSF due to diffraction and aberrations (including defocus) the MTF value is reduced at higher frequencies and hence influences the image FT. The loss of high frequencies result in image quality degradation, particularly defocus blur. However by knowing the PSF the image can be computationally deconvoluted and restored in quality up to the certain level. Certainly, for example, we cannot retrieve lost image harmonics located out of the finite spectrum of PSF (MTF borders). But inside the frequency range where the MTF has non zero values improvements are possible.

For example, if we will axially move the detector during exposure time the accumulated all in focus PSFs from the point sources located at different distances and at different field points will not change. Hence the PSF will be axially space invariant and the image will be a 3D convolution of the ideal geometrical image of the object with this 3D PSF. Such images can be deconvoluted in the same way as 2D blurred images. So generally we can avoid time consuming focusing on the object of interest. We can just make an axial scan of the detector during the frame exposure time and deconvolute the image.

In the Section III, it was proved that the monocentric lens can be refocused on plane objects by reimaging them onto a spherical intermediate image surface with a fixed radius. Thus we will have everything in focus imaging option which will be very attractive for the MC imagers applications. Normally we have two stages of operational algorithm for target detection and recognition. At the first stage the target has to be detected, then lens has to be focused on the object. For a well-focused target the recognition can be made. With all in focus option the detection and recognition can be done in one stage.

IX. Monocentric Lens Specific Advanced Applications

Various existing surveillance systems are designed to combine high light gathering power with a high resolution over omnidirectional field of view. Examples of such systems are submarines, armed vehicle, vehicle mounted goggle mapping systems and unmanned ground and marine vehicles photonic masts.

X. Exemplary Optical Imaging Systems, Devices, and Methods of Fabrication

Exemplary systems, devices, and methods described below can be implemented for capturing and forming large high quality images using monocentric optical imaging.

In a first example, an optical imaging system includes (i) an image forming optical system including substantially monocentric optical surfaces capable of forming an image onto a substantially spherical intermediate image surface, (ii) a unit of optical waveguide structures with waveguide input faces disposed in proximity to the substantially spherical intermediate input image surface, and with waveguide output faces disposed on a substantially planar output image surface, and (iii) a substantially planar optical sensor array (e.g., on a focal plane) disposed to detect light from the optical waveguide structures.

In some implementations of the optical imaging system, for example, the detected signal can be digitally processed to reduce the apparent blurring of the image signal resulting from an approximately equal optical crosstalk between adjacent waveguides, e.g., via deconvolution with a uniform kernel to reduce the effect of a constant known blurring amount. For example, the digital processing of the signal can be configured to be spatially variant across the aperture of the detected image to reduce the apparent blurring of the image signal resulting from a spatially variant optical crosstalk between adjacent waveguides, e.g., via deconvolution with a spatially variant kernel to reduce the effect of a non-uniform but predictable or measured blurring amount.

In some implementations of the optical imaging system, for example, the optical imaging system can include, in addition to a first waveguide array and substantially planar image sensor, one or more adjacent waveguide array and planar image sensors, where the waveguide input surfaces are disposed with a minimal spacing so that the image formed on the substantially spherical image surface is conducted in nearly contiguous regions onto two or more substantially planar image sensor arrays.

In some implementations of the optical imaging system, for example, the image forming optical system is modified to direct light to couple into the waveguides over a wider range of angles using a uniform two-dimensional light angle diffusor structure. For example, an output surface of the monocentric optical surface and/or the spherical intermediate image surface can include light directing structures to optically couple the light into the waveguides. In some examples, a light diffusor can be implemented, e.g., by roughening the input face of the waveguide or the spherical intermediate image surface of the image forming optical system.

In some implementations of the optical imaging system, for example, the output face of the image forming optical system can be configured to direct light to couple into the waveguides over a wider range of angles using a substantially concentric light angle diffusor structure, e.g., such that light diffusion can occur only in the radial direction which can avoid excess losses, thereby increasing the optical imaging system angle range more efficiently than, for example, a random diffusor. For example, the light diffusor can be structured to include substantially concentric grooves or ridges on the waveguide input surface and/or the spherical intermediate image surface of the image forming optical system. For example, the disclosed technology includes methods of structuring the substantially concentric grooves or ridges including by embossing surface relief features into an isotropic layer.

In some implementations of the optical imaging system, for example, the system can include a diffractive structure positioned proximate to the waveguide input face and including features that are smaller than the waveguide core, e.g., which can be used to direct the waveguide input signal towards the physical axis of the waveguide.

In some implementations of the optical imaging systems, for example, the optical waveguide structures can be configured such that each waveguide core has a non-cylindrical core cross section which decreases the dependence of waveguide emission angle on the angle and location of waveguide input light signal, e.g., such as grooved or wavy shaped waveguide cores to increase transmission uniformity and suppress stray light.

In some implementations of the optical imaging systems, for example, the individual waveguides within the optical waveguide structures can be shaped to align each input waveguide core with the center of symmetry of the substantially monocentric image forming system, and to taper from a larger core area to a smaller core area, e.g., to preferentially transmit light incident on the waveguide input face within a limited angle range relative to the waveguide input face.

In some implementations, for example, the the optical imaging system can be focused by axial translation of some or all of the substantially monocentric optical surfaces relative to a fixed unit of optical waveguide structures. For example, the optical imaging system can further include two or more aspheric optical elements operate to provide a controlled focus adjustment by lateral translation and/or rotation.

In a second example, an imaging system includes (i) a primary image forming optical system which forms an image on a first image surface, and (ii) a unit of optical waveguide structures with the waveguide input faces disposed in proximity to the first image surface and with the waveguide output faces disposed on an output image surface, in which the optical waveguide structures suppress stray light energy by preferentially transmitting light incident on the waveguide input face within a limited angle range.

In some implementations of the imaging system, for example, the structure of the waveguide is configured to taper from a larger core area to a smaller core area, e.g., to restrict the range of light angles transmitted with low loss from the waveguide input face to the waveguide output face. In some implementations of the imaging system, for example, the structure of the waveguide is configured to taper down from a larger core area to a smaller core area, and taper up from a smaller core area to a larger core area, e.g., to restrict the range of light angles transmitted with low loss from the waveguide input face to the waveguide output face, and to control the divergence angle of light emission from the output face of the waveguide. For example, the unit of optical waveguide structures can be configured as an optical fiber bundle which has been tapered to control the input and output angle transmission properties of the individual waveguides within the fiber bundle.

In a third example, a method to fabricate a unit of multiple waveguide structures for substantially monocentric imaging systems includes forming an array of substantially parallel optical waveguides that is first tapered to form a narrow waist, then shaped to form a substantially spherical depression on an input face, such that the waveguide core near the waveguide input faces are oriented to approximately align with the center of symmetry of the substantially monocentric imaging system.

In a fourth example, a method to fabricate a unit of multiple waveguide structures for substantially monocentric imaging systems includes forming an array of substantially parallel optical waveguides that is deformed by heat or pressure to create internal structures where the waveguide cores near the input face are approximately aligned with the center of symmetry of the substantially monocentric imaging system, and the waveguide cores near the output faces are approximately perpendicular to the substantially planar output face. In some implementations of the method, for example, the method can further include removing material to form a substantially spherical surface on the input face, and a substantially planar surface on the output face.

In a fifth example, a method to fabricate a unit of multiple waveguide structures for substantially monocentric imaging systems includes forming an array of substantially parallel optical waveguides with substantially planar input and output faces that is first shaped by removing material from the input and/or output face, then deformed by heat or pressure to create internal structures where the waveguide cores near the input face are approximately aligned with the center of symmetry of the substantially monocentric imaging system, and the waveguide cores near the output faces are approximately perpendicular to the substantially planar output face. In some implementations of the method, for example, the method can further include removing material to form a substantially spherical surface on the Input face, and a substantially planar surface on the output face.

In a sixth example, a method to fabricate arrays of waveguide-coupled focal planes includes attaching an array of substantially parallel optical waveguides with substantially planar input and output faces to an an array of focal planes fabricated on a shared semiconductor substrate, followed by removing material from the input waveguide array face to form substantially spherical depressions which are aligned with some or all of the focal planes, such that the combination of waveguides and sensor can be singulated by dicing into discrete focal planes with attached multiple waveguide structures.

In a seventh example, a method to fabricate arrays of waveguide-coupled focal planes includes attaching an array of focal planes fabricated on a shared semiconductor substrate to an array of optical waveguides with a substantially planar output face and an array of spherical depressions which are aligned with some or all of the focal planes, such that the combination of waveguides and sensor can be singulated by dicing into discrete focal planes with attached multiple waveguide structures.

Additionally, the exemplary systems, devices, and methods described below can also be implemented for capturing and forming large high quality images using monocentric optical imaging.

In one example, an optical imaging system can include a primary optical imaging system including one or more optical elements with substantially concentric and substantially spherical surfaces which form an image on a substantially spherical image surface, a secondary optical system including multiple closely spaced optical waveguides with Input apertures near to the substantially spherical image surface, such that at least a portion of the light collected by the primary optical imaging system is coupled into the waveguides and guided to the output of the waveguides, and one or more substantially planar optical detector arrays arranged to receive and detect at least a portion of the light emitted from the output of the waveguides.

In some implementations of the optical imaging system, for example, each of the secondary optics subsections can be configured as a plurality of fiber tapers-receivers assemblies in which fiber tapers provide light filtering by the use of fiber transmission characteristics, and the physical shape of the fiber, to deliberately discriminate between desired signal and noise in imaging systems, and selectively block light from reaching the sensor by cutting out all rays coming to the intermediate spherical image surface with the incident angles exceeding the designed numerical aperture, to deliver the corrected wide field image formed on the intermediate spherical surface to the optical detectors, e.g., such as flat CCD, CMOS or FPA receivers, e.g., thereby providing a "virtual" aperture stop. In some implementations of the optical imaging system, for example, each of the secondary optics subsections can be configured as a plurality of fiber bundles receivers assemblies where the fiber bundles delivers the corrected monocentric lens portions of the wide field image formed on the intermediate spherical surface to the optical detectors, e.g., such as flat CCD, CMOS, or FPA receivers.

For example, the fiber tapers of the optical imaging system can be configured as dual taper fiber bundle to impose stray light stripping and independently control the light emission angle from the exit face of the fiber, e.g., for optimal image sensing. In some implementations of the optical imaging system, for example, the fiber bundles head can be fabricated by producing tapers with the heat stretching, cutting hourglass taper in half to have two flat ends, polishing the wide end to sphere orthogonal to the principal rays of MC lens. Techniques for fabricating the fiber bundles include the orientation of the fibers to be substantially aligned with the direction of signal incidence (e.g., chief ray angle). In some implementations of the optical imaging system, for example, techniques produce fiber bundles to redirect the angle of incident light to become substantially aligned with the direction of fiber orientation can include using a locally space-variant optically patterned reflective, refractive, or diffractive surface. In some implementations of the optical imaging system, for example, the monocentric lens has no the physical aperture stop, and each of secondary optics can include a plurality of fiber tapers receivers assemblies and the restricted tapers NA provides stray light filtering said the lens operates with the "virtual" aperture stop.

In some implementations of the optical imaging system, for example, the system can further include an electrical signal processor that combines individual images from the imaging sensors into a single image. In some implementations of the optical imaging system, for example, at least a portion of the primary optics section can provide a substantially spherical reference surface for alignment of the input surface of the secondary optical subsection. In some implementations of the optical imaging system, for example, the primary optics section can include spherical or hemispherical elements. In some implementations of the optical imaging system, for example, at least a portion the secondary optics section can provide lateral mechanical registration of the individual remaining elements of the secondary sections and detector systems. In some implementations of the optical imaging system, for example, the image can be formed at multiple discrete image regions, each image region corresponding to a field of view captured by a combination of the monocentric primary optics section and a secondary optics subsection. In some implementations of the optical imaging system, for example, the system can further include a plurality of image sensing elements positioned at the multiple discrete image regions and configured to sense images formed at each of the multiple discrete image regions. In some implementations of the optical imaging system, for example, each of the secondary optical systems and substantially planar optical detector arrays can fit within a conical volume radiating from the common point of origin of the primary optics section. In some implementations of the optical imaging system, for example, the input face of the optical waveguides or the last surface of the primary imaging system can be structured with refractive, diffractive, or scattering features to control the angle of light coupling into the waveguides. In some implementations of the optical imaging system, for example, the input face of the optical waveguides or the last surface of the primary imaging system can be structured with radially symmetric features to direct the light from the primary imaging system to be approximately coaxial with the waveguide axis.

In some implementations of the optical imaging system, for example, the focal plane can be configured so that large angle light is absorbed or reflected (e.g., not detected), and use of the focal plane's restrictions on light transmission angle to act as a stray light filter, or virtual iris, in the optical imaging system.

In some implementations of the optical imaging system, for example, the size of an exemplary color CMOS sensor pixel can be configured to a quarter of the individual fiber diameter at the bundle-taper output, e.g., thereby providing double resolution of the color image reading fiber bundle-taper resolution.

In some implementations of the optical imaging system, for example, the fiber tapers are configured as hourglass tapers with the head of taper providing substantially perfect monocentric lens output light coupling and with the curved input part and substantially perfect stray light filtering with the hourglass part, e.g., in which both parts can be produced from high numerical aperture fibers preferably with NA=1. In some implementations, techniques are provided for fabricating fiber bundles where the orientation of the fibers is substantially aligned with the direction of signal incidence (e.g., chief ray angle), and where the transmission characteristics of the overall structure can be controlled to limit stray light.

In some implementations of the optical imaging system, for example, the monocentric lens can operate in photographic visible spectrum band and can be composed from two different glasses in which the outer glass can be a high index flint glass and the inner ball lens glass can be low index crown glass; or, for example, in which glass combinations can provide diffraction quality aberrations correction, e.g., as exemplified in the Table 3; or, for example, in which glass combinations can be constructed by using glass substitutions of glass combinations, e.g., as exemplified in Table 3, in which substitution glasses are within ±0.03 range of value of ND and within ±0.2 range of Abbe number from glasses shown in the Table 3.

In some implementations of the optical imaging system, for example, the monocentric lens can operate in the whole spectrum band of the exemplary front illuminated silicon CCD and be composed from four different glasses, and in which the inner ball lens glass includes low index crown glass K-GFK68, K-GFK60 or S-FPM2, and/or possible glass combinations of outer shell glasses can be those that are shown in the Table 10, e.g., but not restricted by these exemplary combinations, and in which the exemplary monocentric lens has as an inherent feature the asymmetric air gap and separated from ball lens meniscus and altogether providing diffraction quality aberrations correction.

In some implementations of the optical imaging system, for example, the monocentric lens can operate the spectrum band of the exemplary back illuminated silicon CCD and be composed from four different glasses, and in which the inner ball lens glass includes low index crown glass K-GFK68, K-GFK60 or S-FPM2, and/or possible glass combinations of outer shell glasses can be those that are shown in the Table 11 and/or 12, e.g., but not restricted by these exemplary combinations, and in which the exemplary monocentric lens has as an inherent feature the asymmetric air gap and separated from ball lens meniscus altogether providing diffraction quality aberrations correction while the mounting fiber bundles-tapers meniscus, e.g., which can be made from GG435 Schott glass or other colored glasses and provides cut of spectrum filtering particularly down of wavelength 435 nm or anywhere between 425 nm and 475 nm.

In some implementations of the optical imaging system, for example, the monocentric lens can operate in the water transmission spectrum band 0.38 to 0.55 micrometers and can have water as a first medium and the central ball assembly that can be composed from four different glasses with asymmetric air gap located after the central ball assembly and the outer glass of the central ball assembly including high index flint glass while the inner ball lens glass is low index crown glass with a minor difference in Abbe number between the first and a second glass and strong difference in Abbe number between second and third glass such as those exemplified in the Table 13, e.g., but not restricted to that prescription, and/or other glasses combination following shown above glasses combinations rules that are possible.

In some implementations of the optical imaging system, for example, the monocentric lens can operate in the short wave infrared 0.9 to 1.5 microns transmission spectrum and can be composed from four different glasses, in which the outer glass of ball lens assembly can include high index flint glass and inner ball lens glass including low index crown glass with a strong difference in Abbe number between the first and a second glass and strong difference in Abbe number between second and third glass and asymmetric air gap separating the ball lens assembly and last meniscus such as those exemplified in the Table 15, e.g., but not restricted to that prescription, and/or other glasses combination following shown above glasses combinations rules that are possible.

In another example, a method of a systematic search of two glass monocentric lens optimal aberration correction solution can include, at a first step, for every particular glasses combination optimizing the first concentric radius for minimum third order spherical aberration while keeping the second concentric radius bounded to the first radius and focus length; then, at a second step, optimizing the first radius by mean of minimalizing monochromatic and chromatic aberrations of exact raytraced, e.g., with monocentric architecture methods.

In another example, a method of a systematic search of four glass with asymmetric air gap monocentric lens optimal aberration correction solution can include, at a first step, for every particular glasses combination optimizing the first, second, third and fourths concentric radius by keeping the fives radius bounded to the given focal length. Radiuses can be optimized for minimum of monochromatic and chromatic aberrations of exact raytraced, e.g., with monocentric architecture methods. The local optimization method can come somewhere inside the thin pancake shaped area of low criterion value solutions. Then, the method can include, at a second step, performing an optimization search that will follow over the main ravine of the cost function which direction was determined from the minimal absolute Eigen vector of the Hesse matrix at the initial minimum cost function point and locating with number of local optimizations the points over this ravine inside pancake shaped area of low value of cost function. Then, the method can include, at a third step, locating minimums over secondary ravines originated from the primary ravine of cost function with the same method of traveling over directions of secondary Eigen vectors of the points over primary ravine with the local optimizations from these points. For example, by investigating the pancake area of low cost function value with the square net of ravines the method reliably located the area of lowers cost function value and find location absolute minimum for each particular glasses combination.

In some examples, a refocusable monocentric objective assembly including an monocentric lens system of the disclosed technology can be configured with an air image surface or a spherical image surface located on the outer side of a mounting meniscus, a linear motor for the controllable axial shift of the ball lens assembly regarding receiver assembly, a digital controller for image contrast analysis and generating the driving signal to the focusing executive said mechanics that altogether provides fast autofocusing on the chosen by operator object of interest or automatically on the object which prevail in the size on the imaged scene.

In some examples, a compact (e.g., 4.75 mm in size) refocusable monocentric imaging lens including a central ball lens including optical glass and an outer concentric lens including an optical plastic, e.g., which can be used in the cellular applications.

In some examples, a two stage low-cost mass-production fabrication technique to produce an exemplary compact refocusable imager assembly can include, at a first stage, the use of rolling or molding technology for manufacturing of the central glass ball lens and embossing this central ball lens into optical plastic outer shell together with housing armature used for attachment of the optical assembly to the objective housing at a second stage.

In some examples, a compact photonics mast constructed of the monocentric lenses can include 0.5 arc minutes resolution over omnidirectional field with 70 degrees elevation or hemispherical field of view and operating in visible, SWIR, MWIR and LWIR wavebands concurrently or in any combinations of those wavebands. In some examples, a compact photonics mast constructed of the monocentric lenses can include 0.5 arc minutes resolution over omnidirectional field with 70 degrees elevation or hemispherical field of view and operating in visible, SWIR and MWIR wavebands concurrently or in visible or SWIR waveband, or just only in visible band, and having close loop connection to an operator located inside armed vehicle who is equipped with a head tracker and consequently receiving from him the direction to the area of interest and real time downloading the foveated image of this local field to the head mounted display having restricted field of view and creating an impression of "transparent armor".

In some examples, a compact UAV imager constructed of the monocentric lenses can include 0.5 arc minutes resolution and having a back loop connection with a ground operator to receive the direction of the instant interest and real time download the foveated high resolution imaging through a restricted capacity communication channel. In some examples, a compact light weight wearable imager constructed of the monocentric lens can include operating in SWIR waveband to provide via head mounted display the night vision ability to the dismounted warrior at the outdoor field environment under night glow illumination. In some examples, a compact light weight wearable imager constructed of the monocentric lens can include operating in NIR waveband to provide the night vision ability at the outdoor and indoor environment via image intensifier and head mounted display or via classical night vision devices equipped image intensifier and eyepieces. In some examples, a compact light weight wearable imager constructed of the monocentric lenses can include operating one lens in NIR waveband and the second lens in SWIR waveband to provide via head mounted display the night vision ability at the outdoor and indoor environment concurrently. In some examples, a compact light weight wearable imager constructed of the monocentric lenses can include operating in MWIR waveband to provide via head mounted display real time muzzle flashes detection and projectiles tracking ability to dismounted warriors or law enforcement personnel. In some examples, a compact light weight wearable imager constructed of the monocentric lenses can include operating in LWIR waveband to provide via head mounted display or via compact photonic mast the real time long wave infrared thermal imaginaries to dismounted warriors, armed vehicle personnel or law enforcement personnel.

In some examples, a compact persistent surveillance system including monocentric lenses of the disclosed technology can be operated in visible, NIR and SWIR optical wavebands or in any combinations of waveband and can be equipped with video controller to automatically select objects of interest, e.g., like a moving objects but not restricted to such requirements, and able to download the compressed high definition imageries to the data storage device for a distinguishable time or to download real-time foveated high resolution and definition imageries to the operator.

In some examples, a light weight Gigapixel-capacity photo camera or camcorder can include the disclosed optical imaging monocentric lens. In some examples, a compact high resolution imager constructed from the monocentric lens can include, mounted at the back of a car or track, delivering of an image around the back hemisphere space behind the vehicle to the dash board or head up display. In some examples, a wearable augmented reality system constructed from the monocentric lens can include a wide field of view head mounted display and computer controller which delivers through computational optics procedures to a dismounted warrior, law enforcement personnel, or whoever is in need imageries of a battle field scene or potentially dangerous environment, including but not restricted to, the zoomed images of objects of interest, automatically selected threats, all in focus imageries over whole depth of field, inhaled color imageries for camouflaged objects detection and other information. In some examples, a wearable augmented reality system constructed from the monocentric lens can include, operating in the SWIR spectrum waveband, a wide field of view head mounted display and computer controller which delivers to provide a fire fighter with computational optics imagery of the surroundings in the low visibility conditions of the smoke and fire, including but not restricted to, the zoomed images of objects of interest, all in focus imageries over whole depth of field, maps of the building interior and other information. In some examples, a compact and light weight camera constructed from the monocentric lens can include mounting on a sportsmen's head to deliver real time imaginary for the broadcasting during sport completions or to the trainers and advisors for sportsmen performance analyzing or his or her personal records. In some examples, an unattended ground sensor or buoys equipped with compact and light weight omnidirectional photonic mast constructed from monocentric lenses can include persistent surveillance which delivers a real time imagery or accumulate and periodically downloads these imageries of the environment to the operational team through a restricted capacity communication channel. In some examples, a compact and light weight camera including a monocentric lens system of the disclosed technology can be mounted on K-9 dogs that can be used during a criminal scene search or rescue operation, e.g., into areas like debris or narrow tubes in which human personnel have restricted access to deliver a real time imagery of the environment to the operational team through a restricted capacity communication channel.

In some examples, a refocusable monocentric objective assembly can include a monocentric lens system including air image surface or spherical image surface located on the outer side of the mourning meniscus, the linear motor for the controllable axial shift of the ball lens assembly regarding receiver assembly, digital controller for image contrast analysis and generating the driving signal to the focusing executive said mechanics that altogether provides fast auto-focusing on the chosen by operator object of interest or automatically on the object which prevail in the size on the imaged scene.

In some examples, refocusable monocentric objective assembly can include a receiver assembly that is mounted on the basic negative menus lens or spherical image surface that can be located in the air and objective monocentric optics that include the rotational Alvarez lens for correction of variable over refocusing band spherical aberration and concurrently correction of associated with this spherical aberration field astigmatism, which is due to the vignetting at the objective fields points. In some implementations, for example, the assembly can include Alvarez lens having two concentric meniscuses with aspherical deformation providing compensation of variable spherical aberrations over close to hemispherical field of view by rotating meniscuses in one plane in opposite direction on prescribed angles associated with value of compensated aberrations at the associated focusing distance.

In some examples, a method to demonstrate the focusing possibility of a monocentric lens or lenses, which can be applied to the all possible scaled up and down embodiments of lenses and lead to the design of the associated modified variable rotational Alvarez lens correctors different from exemplary variable spherical aberration corrector. For example, while the variable spherical aberrations correctors can be sufficient for the exemplary monocentric lenses embodiments having focal length in the frames of 3 to 12 mm and refocus distances from infinity distance to the distance of 50 mm, other exemplary sophisticated correctors can be designed based on the aberrations correction method for the architecture of the lenses having focus larger or less, e.g., as compared to other examples previously described, or for the focusing ranges closer than other examples previously described.

In some examples, an imager can include a monocentric lens and mechanism to provide focusing using axial translation of the monocentric lens during the optical exposure, which is capable of acquiring an image that can be digitally processed to extend the depth of focus, or to remove artifacts in the image from defects or seams which would be visible in the directly sensed in-focus image.

In some examples, an imager can include a monocentric lens and mechanism to provide focusing using axial translation of the monocentric lens during the optical exposure, which is capable of acquiring an image that can be digitally processed to get sharp images of the objects located within the whole range of refocusing, e.g., "all in focus" imaging.

Implementations of the subject matter and the functional operations described in this patent document can be implemented in various systems, digital electronic circuitry, or in computer software, firmware, or hardware, including the structures disclosed in this specification and their structural equivalents, or in combinations of one or more of them. Implementations of the subject matter described in this specification can be implemented as one or more computer program products, i.e., one or more modules of computer program instructions encoded on a tangible and non-transitory computer readable medium for execution by, or to control the operation of, data processing apparatus, The computer readable medium can be a machine-readable storage device, a machine-readable storage substrate, a memory device, a composition of matter effecting a machine-readable propagated signal, or a combination of one or more of them. The term "data processing apparatus" encompasses all apparatus, devices, and machines for processing data, including by way of example a programmable processor, a computer, or multiple processors or computers. The apparatus can include, in addition to hardware, code that creates an execution environment for the computer program in question, e.g., code that constitutes processor firmware, a protocol stack, a database management system, an operating system, or a combination of one or more of them.

A computer program (also known as a program, software, software application, script, or code) can be written in any form of programming language, including compiled or interpreted languages, and it can be deployed in any form, including as a stand-alone program or as a module, component, subroutine, or other unit suitable for use in a computing environment. A computer program does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application specific integrated circuit).

Processors suitable for the execution of a computer program include, by way of example, both general and special purpose microprocessors, and any one or more processors of any kind of digital computer. Generally, a processor will receive instructions and data from a read only memory or a random access memory or both. The essential elements of a computer are a processor for performing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices. Computer readable media suitable for storing computer program instructions and data include all forms of nonvolatile memory, media and memory devices, including by way of example semiconductor memory devices, e.g., EPROM, EEPROM, and flash memory devices. The processor and the memory can be supplemented by, or incorporated in, special purpose logic circuitry.

While this patent document contains many specifics, these should not be construed as limitations on the scope of any invention or of what may be claimed, but rather as descriptions of features that may be specific to particular embodiments of particular inventions. Certain features that are described in this patent document in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. Moreover, the separation of various system components in the embodiments described in this patent document should not be understood as requiring such separation in all embodiments.

Only a few implementations and examples are described and other implementations, enhancements and variations can be made based on what is described and illustrated in this patent document.

What is claimed is:

1. An optical imaging system, comprising:
a monocentric optical imaging module including one or more optical elements having concentric surfaces to collect light and form an image on a curved image surface;
one or more curved and tapered optical waveguide bundles each comprising a plurality of optical waveguides that are optically coupled to the monocentric optical imaging module at different locations to receive different portions of the collected light at the curved image surface, respectively, wherein each optical waveguide bundle includes an input optical waveguide bundle facet to receive light from the curved image surface and an output optical waveguide facet to output light;
one or more imaging sensors to receive light from the one or more curved and tapered optical waveguide bundles and to detect the received light, the one or more imaging sensors configured to produce a representation of the image on the curved image surface of the monocentric optical imaging module; and
a textured surface structure over the input optical waveguide facet associated with optical waveguides of each curved and tapered optical waveguide bundle to enhance optical coupling from the curved imaging surface into the plurality of optical waveguides,
wherein at least one of the one or more curved and tapered optical waveguide bundles has a curved input facet, and principal rays of the monocentric optical imaging module input to the plurality of optical waveguides are substantially aligned with an axis of a corresponding optical waveguide to facilitate propagation of light through each optical waveguide in producing a substantially uniform divergence of the light that is output from each of the one or more curved and tapered optical waveguide bundles.

2. The system as in claim 1, wherein:
the optical waveguides in each curved and tapered optical waveguide bundle include first optical waveguide portions that are bent at different bending angles, respectively, at the curved image surface of the monocentric optical imaging module.

3. The system as in claim 1, wherein:
the textured surface structure includes a layer of micro prisms.

4. The system as in claim 1, wherein
the textured surface structure includes one or more of the following:
a diffraction grating layer;
a locally spatially varying optically patterned layer;
a locally spatially varying optically patterned reflective layer;
a locally spatially varying optically patterned refractive layer; or
a locally spatially varying optically patterned diffractive layer.

5. The system as in claim 1, wherein:
each curved and tapered optical waveguide bundle has a tapered exterior profile between the monocentric optical imaging module and a corresponding imaging sensor.

6. The system as in claim 1, wherein:
each curved and tapered optical waveguide bundle includes a waveguide section having a cross section in the tapered waveguide core to decrease along a direction directed from the curved image surface to the one or more imaging sensors.

7. The system as in claim 1, wherein:
the monocentric optical imaging module includes an optical aperture stop that transmits a restricted portion of light incident on the monocentric imaging module at small incident angles to pass through the monocentric optical imaging module while blocking light at large incident angles.

8. The system as in claim 1, wherein:
the monocentric optical imaging module includes two or more lenses having concentric spherical surfaces.

9. The system as in claim 1, comprising:
an array of the curved and tapered optical waveguide bundles coupled to the curved imaging surface of the monocentric imaging module at different locations, each optical waveguide bundle of the array capturing a part of the image on the curved imaging surface and different optical waveguide bundles capturing different parts of the image on the curved imaging surface, respectively;
an array of the imaging sensors respectively coupled to the different optical waveguide bundles, one imaging sensor per optical waveguide bundle; and
a microprocessor coupled to the imaging sensors to combine individual images from the array of imaging sensors into a single composite image representing the image on the curved imaging surface of the monocentric imaging module.

10. The system as in claim 9, wherein:
the microprocessor is configured to reduce image blurring caused by optical crosstalk of the guided light between adjacent optical waveguide bundles.

* * * * *